United States Patent
John Wilson et al.

(10) Patent No.: US 11,240,684 B2
(45) Date of Patent: Feb. 1, 2022

(54) BEAM SWITCHING ROBUSTNESS IN UNLICENSED RADIO FREQUENCY SPECTRUM BAND

(71) Applicant: QUALCOMM Incorporated, San Diego, CA (US)

(72) Inventors: Makesh Pravin John Wilson, San Diego, CA (US); Tao Luo, San Diego, CA (US); Xiaoxia Zhang, San Diego, CA (US); Yan Zhou, San Diego, CA (US); Vinay Chande, San Diego, CA (US); Arumugam Chendamarai Kannan, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 76 days.

(21) Appl. No.: 16/719,564

(22) Filed: Dec. 18, 2019

(65) Prior Publication Data

US 2020/0205013 A1 Jun. 25, 2020

Related U.S. Application Data

(60) Provisional application No. 62/784,327, filed on Dec. 21, 2018.

(51) Int. Cl.
*H04W 16/28* (2009.01)
*H04W 16/14* (2009.01)
(Continued)

(52) U.S. Cl.
CPC .......... *H04W 16/28* (2013.01); *H04L 5/0055* (2013.01); *H04W 16/14* (2013.01); *H04W 74/02* (2013.01); *H04W 80/02* (2013.01)

(58) Field of Classification Search
CPC .... H04W 16/28; H04L 5/0055; H04L 5/0082; H04L 5/0048; H04L 5/0023; H04B 7/088; H04B 7/0695

See application file for complete search history.

(56) References Cited

U.S. PATENT DOCUMENTS 10,231,208 B2 * 3/2019 Agiwal ............... H04W 68/025
2018/0083753 A1 3/2018 Nagaraja et al.
(Continued)

FOREIGN PATENT DOCUMENTS

WO WO-2017221202 A1 12/2017

OTHER PUBLICATIONS

Source: Ericsson; Title: Analysis of beam indication signaling options; date: Oct. 9-13, 2017; NPL: 3GPP TSG RAN WG1, R1-1718743; pp. 1-14; (Year: 2017).*
(Continued)

*Primary Examiner* — Fahmida S Chowdhury
(74) *Attorney, Agent, or Firm* — Danai Nelisile Mhembere; Holland & Hart LLP

(57) ABSTRACT

Methods, systems, and devices for wireless communications are described. A base station may determine a degradation of a communication beam associated with a user equipment (UE). The base station may transmit a first signal identifying a beam switch occasion for the UE. The UE may receive a second signal identifying the beam switch occasion based on an outcome of the contention-based procedure. In some cases, the UE may transmit a third signal acknowledging the beam switch occasion during an acknowledgment opportunity based on the second signal, and may perform a beam switch during the beam switch occasion based on transmitting the third signal.

104 Claims, 27 Drawing Sheets

(51) Int. Cl.
*H04W 80/02* (2009.01)
*H04W 74/02* (2009.01)
*H04L 5/00* (2006.01)

(56) References Cited

U.S. PATENT DOCUMENTS

2019/0116007 A1* 4/2019 Yi ................ H04W 56/00
2019/0319686 A1* 10/2019 Chen, IV ............. H04W 48/20
2020/0244337 A1* 7/2020 Yuan ................ H04W 72/0466
2020/0374960 A1* 11/2020 Deenoo ................ H04W 72/14

OTHER PUBLICATIONS

Ericsson: "Analysis of Beam Indication Signalling Options", 3GPP Draft, 3GPP TSG RAN WG1 Meeting #90bis, R1-1718743 Analysis of Beam Indication Signalling Options, 3rd Generation Partnership Project (3GPP), Mobile Competence Centre, 650, Route Des Lucioles, F-06921 Sophia-Antipolis Cedex, vol. RAN WG1. No. Prague, CZ, Oct. 9, 2017-Oct. 13, 2017, Oct. 8, 2017 (Oct. 8, 2017), XP051341913, 14 Pages, Retrieved from the Internet: URL:http://www.3gpp.org/ftp/Meetings_3GPP_SYNC/RAN1/Docs/ [retrieved on Oct. 8, 2017] figures 2-8 sections 2.1.2 and 2.1.3.

Interdigital Inc: "On LBT for Beam-Based Transmission for NR-U", 3GPP Draft, 3GPP TSG RAN WG1 Meeting #92bis, R1-1804885 on LBT for Beam-Based Transmission for NR-U, 3rd Generation Partnership Project (3GPP), Mobile Competence Centre, 650, Route Des Lucioles, F-06921 Sophia-Antipolis Cedex, FRA , vol. RAN WG1, No. Sanya, China; Apr. 16, 2018-Apr. 20, 2018, Apr. 15, 2018 (Apr. 15, 2018), XP051427148, 6 Pages, Retrieved from the Internet: URL: http://www.3gpp.org/ftp/Meetings%5F3GPP%5FSYNC/RAN1/Docs/, [retrieved on Apr. 15, 2018], Chapters 1, 2.

International Search Report and Written Opinion—PCT/US2019/067559—ISAEPO—dated May 19, 2020.

Partial International Search Report—PCT/US2019/067559—ISA/EPO—dated Mar. 16, 2020.

Qualcomm Incorporated: "Control Channel Multi-Beam Operation", 3GPP Draft, 3GPP TSG RAN WG1 #90, R1-1713420 Multi-Beam Control Operation, 3rd Generation Partnership Project (3GPP), Mobile Competence Centre, 650, Route Des Lucioles, F-06921 Sophia-Antipolis Cedex, France, vol. RAN WG1, No. Prague, Czech Republic, Aug, 21, 2017-Aug. 25, 2017, Aug. 20, 2017 (Aug. 20, 2017), XP051316222, Retrieved from the Internet: URL: http://www.3gpp.org/ftp/Meetings_3GPP_SYNC/RAN1/Docs/, [retrieved on Aug. 20, 2017], Chapters 1, 2.

* cited by examiner

BEAM SWITCHING ROBUSTNESS IN UNLICENSED RADIO FREQUENCY SPECTRUM BAND

CROSS REFERENCE

The present Application for Patent claims the benefit of U.S. Provisional Patent Application No. 62/784,327 by JOHN WILSON et al., entitled "BEAM SWITCHING ROBUSTNESS IN UNLICENSED RADIO FREQUENCY SPECTRUM BAND," filed Dec. 21, 2018, assigned to the assignee hereof, and expressly incorporated herein.

INTRODUCTION

The following relates to wireless communications, and more specifically to beam switching robustness.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Some modes of communication may enable communication between devices (e.g., between a base station and a UE) over unlicensed (i.e., shared) radio frequency spectrum bands. Shared radio frequency spectrum bands may be used opportunistically by devices associated with different networks or non-network associated devices. Devices may contend for access to the shared radio frequency spectrum band using listen-before-talk (LBT) procedures, in which a device may monitor the shared radio frequency spectrum band to confirm that another device is not transmitting using the medium before initiating a transmission.

In wireless communications systems, a base station and a UE may communicate using a variety of channels. However, in some situations a beam used to transmit the transmissions in a channel may degrade. In some cases, the beam may degrade to a point that the beam (e.g., the beam configuration) may no longer be reliable to support transmissions on that channel. In some aspects, a base station may determine that a beam has degraded and may instruct a UE to switch beams. Beam switching management techniques, however, may be improved.

SUMMARY

A method of wireless communication is described. The method may include receiving a first signal identifying a beam switch occasion for a UE and receiving a second signal identifying the beam switch occasion for the UE based on receiving the first signal. The method may include transmitting a third signal acknowledging the beam switch occasion during an acknowledgment opportunity based on the second signal. The method may further include performing a beam switch during the beam switch occasion based on transmitting the third signal.

An apparatus for wireless communication is described. The apparatus may include a processor and memory coupled to the processor. The processor and memory may be configured to receive a first signal identifying a beam switch occasion for a UE and receive a second signal identifying the beam switch occasion for the UE based on receiving the first signal. The processor and memory may further be configured to transmit a third signal acknowledging the beam switch occasion during an acknowledgment opportunity based on the second signal and perform a beam switch during the beam switch occasion based on transmitting the third signal.

Another apparatus for wireless communication is described. The apparatus may include means for receiving a first signal identifying a beam switch occasion for a UE and receiving a second signal identifying the beam switch occasion for the UE based on receiving the first signal. The apparatus may include means for transmitting a third signal acknowledging the beam switch occasion during an acknowledgment opportunity based on the second signal and performing a beam switch during the beam switch occasion based on transmitting the third signal.

A non-transitory computer-readable medium storing code for wireless communication is described. The code may include instructions executable by a processor to receive a first signal identifying a beam switch occasion for a UE. The code may further include instructions executable by the processor to receive a second signal identifying the beam switch occasion for the UE based on receiving the first signal and transmit a third signal acknowledging the beam switch occasion during an acknowledgment opportunity based on the second signal. Additionally, the code may include instructions executable by the processor to perform a beam switch during the beam switch occasion based on transmitting the third signal.

In some examples of the method, apparatuses, and non-transitory computer-readable medium described herein, the second signal identifying the beam switch occasion for the UE includes a retransmission of the first signal identifying the beam switch occasion for the UE. In some examples of the method, apparatuses, and non-transitory computer-readable medium described herein, the second signal identifying the beam switch occasion for the UE includes an indicator associated with the first signal identifying the beam switch occasion for the UE.

Some examples of the method, apparatuses, and non-transitory computer-readable medium described herein may further include operations, features, means, or instructions for operating in an unlicensed radio frequency spectrum band and performing a contention-based procedure in response to receiving the first signal. Some examples of the method, apparatuses, and non-transitory computer-readable medium described herein may further include operations, features, means, or instructions for identifying the acknowledgment opportunity based on the outcome of the contention-based procedure. In some examples, transmitting the third signal acknowledging the beam switch occasion may be based on identifying the acknowledgment opportunity.

In some examples of the method, apparatuses, and non-transitory computer-readable medium described herein, identifying the acknowledgment opportunity further may include operations, features, means, or instructions for determining that the UE may not be clear to transmit the third signal acknowledging the beam switch occasion during a second acknowledgment opportunity. In some cases, the second acknowledgment opportunity occurs prior than the acknowledgment opportunity.

Some examples of the method, apparatuses, and non-transitory computer-readable medium described herein may further include operations, features, means, or instructions for operating in an unlicensed radio frequency spectrum band and performing a contention-based procedure in response to receiving the first signal. Some examples of the method, apparatuses, and non-transitory computer-readable medium described herein may further include operations, features, means, or instructions for transmitting a fourth signal including a negative acknowledgment of the beam switch occasion during a second acknowledgment opportunity based on the first signal and the contention-based procedure. In some cases, receiving the second signal may be based on transmitting the fourth signal including the negative acknowledgment.

Some examples of the method, apparatuses, and non-transitory computer-readable medium described herein may further include operations, features, means, or instructions for operating in an unlicensed radio frequency spectrum band. Some examples of the method, apparatuses, and non-transitory computer-readable medium described herein may further include operations, features, means, or instructions for performing a contention-based procedure in response to receiving the first signal and transmitting a fourth signal acknowledging the beam switch occasion during a second acknowledgment opportunity based on the first signal and the contention-based procedure. In some examples, the fourth signal may be transmitted prior to receiving the second signal and performing the beam switch during the beam switch occasion based on transmitting the fourth signal.

Some examples of the method, apparatuses, and non-transitory computer-readable medium described herein may further include operations, features, means, or instructions for identifying an indicator associated with the second signal. Some examples of the method, apparatuses, and non-transitory computer-readable medium described herein may further include operations, features, means, or instructions for determining the beam switch occasion based on a value of the indicator associated with the second signal.

Some examples of the method, apparatuses, and non-transitory computer-readable medium described herein may further include operations, features, means, or instructions for determining that the beam switch occasion may occur at a predefined time interval after transmitting the fourth signal, based on the value of the indicator associated with the second signal. In some examples, the second signal may be zero. Some examples of the method, apparatuses, and non-transitory computer-readable medium described herein may further include operations, features, means, or instructions for determining that the beam switch occasion may occur at a predefined time interval after transmitting the third signal, based on the value of the indicator associated with the second signal being one.

In some examples of the method, apparatuses, and non-transitory computer-readable medium described herein, the predefined time interval may be greater than or equal to three milliseconds. In some examples of the method, apparatuses, and non-transitory computer-readable medium described herein, the first signal includes a medium access control (MAC) layer control element. Some examples of the method, apparatuses, and non-transitory computer-readable medium described herein may further include operations, features, means, or instructions for receiving from a base station, a request for a transmission configuration indicator (TCI) state information associated with multiple channels and transmitting a report including the TCI state information to the base station. In some cases, performing the beam switch during the beam switch occasion may be based on the report.

In some examples of the method, apparatuses, and non-transitory computer-readable medium described herein, the TCI state information associated with the multiple channels includes at least one of a TCI state information associated with a control resource set (CORESET), a TCI state information associated with a physical downlink shared channel (PDSCH), a spatial relation information associated with a physical uplink shared channel (PUSCH) or a physical uplink control channel (PUCCH), or a combination thereof. In some examples of the method, apparatuses, and non-transitory computer-readable medium described herein, transmitting the report may include operations, features, means, or instructions for transmitting the report via a MAC layer control element.

A method of wireless communication is described. The method may include receiving a first signal identifying a beam switch occasion for a UE. The method may include transmitting a second signal acknowledging the beam switch occasion during an available acknowledgment opportunity of a set of acknowledgment opportunities. The method may further include performing a beam switch during the beam switch occasion based on transmitting the second signal.

An apparatus for wireless communication is described. The apparatus may include a processor and memory coupled to the processor. The processor and memory may be configured to receive a first signal identifying a beam switch occasion for a UE. The processor and memory may be configured to transmit a second signal acknowledging the beam switch occasion during an available acknowledgment opportunity of a set of acknowledgment opportunities. The processor and memory may further be configured to perform a beam switch during the beam switch occasion based on transmitting the second signal.

Another apparatus for wireless communication is described. The apparatus may include means for receiving a first signal identifying a beam switch occasion for a UE. The apparatus may further include means for transmitting a second signal acknowledging the beam switch occasion during an available acknowledgment opportunity of a set of acknowledgment opportunities. The apparatus may further include means for performing a beam switch during the beam switch occasion based on transmitting the second signal.

A non-transitory computer-readable medium storing code for wireless communication is described. The code may include instructions executable by a processor to receive a first signal identifying a beam switch occasion for a UE. The code may include instructions executable by the processor to transmit a second signal acknowledging the beam switch occasion during an available acknowledgment opportunity of a set of acknowledgment opportunities. The code may include instructions executable by the processor to further perform a beam switch during the beam switch occasion based on transmitting the second signal.

Some examples of the method, apparatuses, and non-transitory computer-readable medium described herein may further include operations, features, means, or instructions for monitoring the unlicensed radio frequency spectrum band using a contention-based procedure. Some examples of the method, apparatuses, and non-transitory computer-readable medium described herein may further include operations, features, means, or instructions for identifying the available acknowledgment opportunity based on the monitoring. In some cases, transmitting the second signal acknowledging the beam switch occasion may be based on identifying the available acknowledgment opportunity.

In some examples of the method, apparatuses, and non-transitory computer-readable medium described herein, identifying the available acknowledgment opportunity further may include operations, features, means, or instructions for determining that the UE may not be clear to transmit the second signal acknowledging the beam switch occasion during a first acknowledgment opportunity of the set of acknowledgment opportunities. In some cases, the first acknowledgment opportunity occurs prior than the available acknowledgment opportunity.

Some examples of the method, apparatuses, and non-transitory computer-readable medium described herein may further include operations, features, means, or instructions for transmitting a time slot indicator associated with the available acknowledgment opportunity. In some examples, transmitting the second signal acknowledging the beam switch occasion includes transmitting the time slot indicator.

Some examples of the method, apparatuses, and non-transitory computer-readable medium described herein may further include operations, features, means, or instructions for transmitting a third signal acknowledging the beam switch occasion during a second available acknowledgment opportunity of the set of acknowledgment opportunities. In some cases, the second available acknowledgment opportunity occurs a predefined time interval after the available acknowledgment opportunity. Some examples of the method, apparatuses, and non-transitory computer-readable medium described herein may further include operations, features, means, or instructions for transmitting a time slot indicator associated with the available acknowledgment opportunity. In some cases, transmitting the third signal acknowledging the beam switch occasion includes transmitting the time slot indicator.

In some examples of the method, apparatuses, and non-transitory computer-readable medium described herein, the first signal includes MAC layer control element. In some examples of the method, apparatuses, and non-transitory computer-readable medium described herein, the beam switch occasion may be at least three milliseconds after transmitting the second signal acknowledging the beam switch occasion. Some examples of the method, apparatuses, and non-transitory computer-readable medium described herein may further include operations, features, means, or instructions for receiving from a base station, a request for a TCI state information associated with multiple channels, and transmitting a report including the TCI state information to the base station. In some cases, performing the beam switch during the beam switch occasion may be based on the report.

In some examples of the method, apparatuses, and non-transitory computer-readable medium described herein, the TCI state information associated with the multiple channels includes at least one of a TCI state information associated with a CORESET, a TCI state information associated with a PDSCH, a spatial relation information associated with a PUSCH or a PUCCH, or a combination thereof. In some examples of the method, apparatuses, and non-transitory computer-readable medium described herein, transmitting the report may include operations, features, means, or instructions for transmitting the report via a MAC layer control element.

A method of wireless communication is described. The method may include transmitting a first signal identifying a beam switch occasion for a UE and transmitting a second signal identifying the beam switch occasion for the UE based on an outcome of a contention-based procedure. In some cases, the contention-based procedure is performed at the UE based on the first signal. The method may further include receiving a third signal acknowledging the beam switch occasion during an acknowledgment opportunity based on the second signal and performing a beam switch during the beam switch occasion based on receiving the third signal.

An apparatus for wireless communication is described. The apparatus may include a processor and memory coupled to the processor. The processor and memory may be configured to transmit a first signal identifying a beam switch occasion for a UE and transmit a second signal identifying the beam switch occasion for the UE based on transmitting the first signal. In some cases, the contention-based procedure is performed at the UE based on the first signal. The processor and memory may be configured to receive a third signal acknowledging the beam switch occasion during an acknowledgment opportunity based on the second signal. The processor and memory may further be configured to perform a beam switch during the beam switch occasion based on receiving the third signal.

Another apparatus for wireless communication is described. The apparatus may include means for transmitting a first signal identifying a beam switch occasion for a UE and transmitting a second signal identifying the beam switch occasion for the UE based transmitting the first signal. The apparatus may further include means for receiving a third signal acknowledging the beam switch occasion during an acknowledgment opportunity based on the second signal. The apparatus may further include means for performing a beam switch during the beam switch occasion based on receiving the third signal.

A non-transitory computer-readable medium storing code for wireless communication is described. The code may include instructions executable by a processor to transmit a first signal identifying a beam switch occasion for a UE and transmit a second signal identifying the beam switch occasion for the UE based on transmitting the first signal. The code may include instructions executable by the processor to receive a third signal acknowledging the beam switch occasion during an acknowledgment opportunity based on the second signal. The code may further include instructions executable by the processor to perform a beam switch during the beam switch occasion based on receiving the third signal.

In some examples of the method, apparatuses, and non-transitory computer-readable medium described herein, the second signal identifying the beam switch occasion for the UE includes a retransmission of the first signal identifying the beam switch occasion for the UE. In some examples of the method, apparatuses, and non-transitory computer-readable medium described herein, the second signal identifying the beam switch occasion for the UE includes an indicator associated with the first signal identifying the beam switch occasion for the UE.

In some examples of the method, apparatuses, and non-transitory computer-readable medium described herein, the acknowledgment opportunity may be identified by the UE based on the outcome of the contention-based procedure.

Some examples of the method, apparatuses, and non-transitory computer-readable medium described herein may further include operations, features, means, or instructions for receiving a fourth signal including a negative acknowledgment of the beam switch occasion during a second acknowledgment opportunity based on the first signal and the contention-based procedure. In some cases, the fourth signal may be received prior to transmitting the second signal.

Some examples of the method, apparatuses, and non-transitory computer-readable medium described herein may further include operations, features, means, or instructions for failing to receive a fourth signal acknowledging the beam switch occasion during a second acknowledgment opportunity based on the first signal and the contention-based procedure. In some cases, the second acknowledgment opportunity occurs prior to transmitting the second signal.

Some examples of the method, apparatuses, and non-transitory computer-readable medium described herein may further include operations, features, means, or instructions for transmitting an indicator associated with the second signal. In some cases, the beam switch occasion may be based on a value of the indicator associated with the second signal. In some examples of the method, apparatuses, and non-transitory computer-readable medium described herein, the beam switch occasion may be at least three milliseconds after receiving the third signal acknowledging the beam switch occasion.

In some examples of the method, apparatuses, and non-transitory computer-readable medium described herein, the first signal includes a MAC layer control element. Some examples of the method, apparatuses, and non-transitory computer-readable medium described herein may further include operations, features, means, or instructions for transmitting to the UE, a request for a TCI state information associated with multiple channels. Some examples of the method, apparatuses, and non-transitory computer-readable medium described herein may further include operations, features, means, or instructions for receiving from the UE, a report including the TCI state information. In some cases, performing the beam switch during the beam switch occasion may be based on the report.

In some examples of the method, apparatuses, and non-transitory computer-readable medium described herein, the TCI state information associated with the multiple channels includes at least one of a TCI state information associated with a CORESET, a TCI state information associated with a PDSCH, a spatial relation information associated with a PUSCH or a PUCCH, or a combination thereof. In some examples of the method, apparatuses, and non-transitory computer-readable medium described herein, receiving the report may include operations, features, means, or instructions for receiving the report via a MAC layer control element.

A method of wireless communication is described. The method may include configuring a set of acknowledgment opportunities for a UE operating in an unlicensed radio frequency spectrum band and transmitting a first signal identifying a beam switch occasion for the UE. The method may include receiving a second signal acknowledging the beam switch occasion during an available acknowledgment opportunity of the configured set of acknowledgment opportunities. The method may further include performing a beam switch during the beam switch occasion based on receiving the second signal.

An apparatus for wireless communication is described. The apparatus may include a processor and memory coupled to the processor. The processor and memory may be configured to configure a set of acknowledgment opportunities for a UE operating in an unlicensed radio frequency spectrum band and transmit a first signal identifying a beam switch occasion for the UE. The processor and memory may be configured to receive a second signal acknowledging the beam switch occasion during an available acknowledgment opportunity of the configured set of acknowledgment opportunities. The processor and memory may further be configured to perform a beam switch during the beam switch occasion based on receiving the second signal.

Another apparatus for wireless communication is described. The apparatus may include means for configuring a set of acknowledgment opportunities for a UE operating in an unlicensed radio frequency spectrum band and transmitting a first signal identifying a beam switch occasion for the UE. The apparatus may include means for receiving a second signal acknowledging the beam switch occasion during an available acknowledgment opportunity of the configured set of acknowledgment opportunities. The apparatus may further include means for performing a beam switch during the beam switch occasion based on receiving the second signal.

A non-transitory computer-readable medium storing code for wireless communication is described. The code may include instructions executable by a processor to configure a set of acknowledgment opportunities for a UE operating in an unlicensed radio frequency spectrum band and transmit a first signal identifying a beam switch occasion for the UE. The code may include instructions executable by a processor to receive a second signal acknowledging the beam switch occasion during an available acknowledgment opportunity of the configured set of acknowledgment opportunities. The code may further include instructions executable by a processor to perform a beam switch during the beam switch occasion based on receiving the second signal.

In some examples of the method, apparatuses, and non-transitory computer-readable medium described herein, the available acknowledgment opportunity may be identified by the UE based on monitoring the unlicensed radio frequency spectrum band using a contention-based procedure. Some examples of the method, apparatuses, and non-transitory computer-readable medium described herein may further include operations, features, means, or instructions for receiving a time slot indicator associated with the available acknowledgment opportunity. In some cases, receiving the second signal acknowledging the beam switch occasion includes receiving the time slot indicator.

Some examples of the method, apparatuses, and non-transitory computer-readable medium described herein may further include operations, features, means, or instructions for receiving a third signal acknowledging the beam switch occasion during a second available acknowledgment opportunity of the set of acknowledgment opportunities. In some examples, the second available acknowledgment opportunity occurs a predefined time interval after the available acknowledgment opportunity. Some examples of the method, apparatuses, and non-transitory computer-readable medium described herein may further include operations, features, means, or instructions for receiving a time slot indicator associated with the available acknowledgment opportunity. In some examples, receiving the third signal acknowledging the beam switch occasion includes receiving the time slot indicator.

In some examples of the method, apparatuses, and non-transitory computer-readable medium described herein, the first signal includes a MAC layer control element. In some examples of the method, apparatuses, and non-transitory computer-readable medium described herein, the beam switch occasion may be at least three milliseconds after receiving the second signal acknowledging the beam switch occasion. Some examples of the method, apparatuses, and non-transitory computer-readable medium described herein may further include operations, features, means, or instructions for transmitting to the UE, a request for a TCI state information associated with multiple channels, and receiving from the UE, a report including the TCI state information. In some cases, performing the beam switch during the beam switch occasion may be based on the report.

In some examples of the method, apparatuses, and non-transitory computer-readable medium described herein, the TCI state information associated with the multiple channels includes at least one of a TCI state information associated with a CORESET, a TCI state information associated with a PDSCH, a spatial relation information associated with a PUSCH or a PUCCH, or a combination thereof. In some examples of the method, apparatuses, and non-transitory computer-readable medium described herein, receiving the report may include operations, features, means, or instructions for receiving the report via a MAC layer control element.

DETAILED DESCRIPTION

Figure 1:
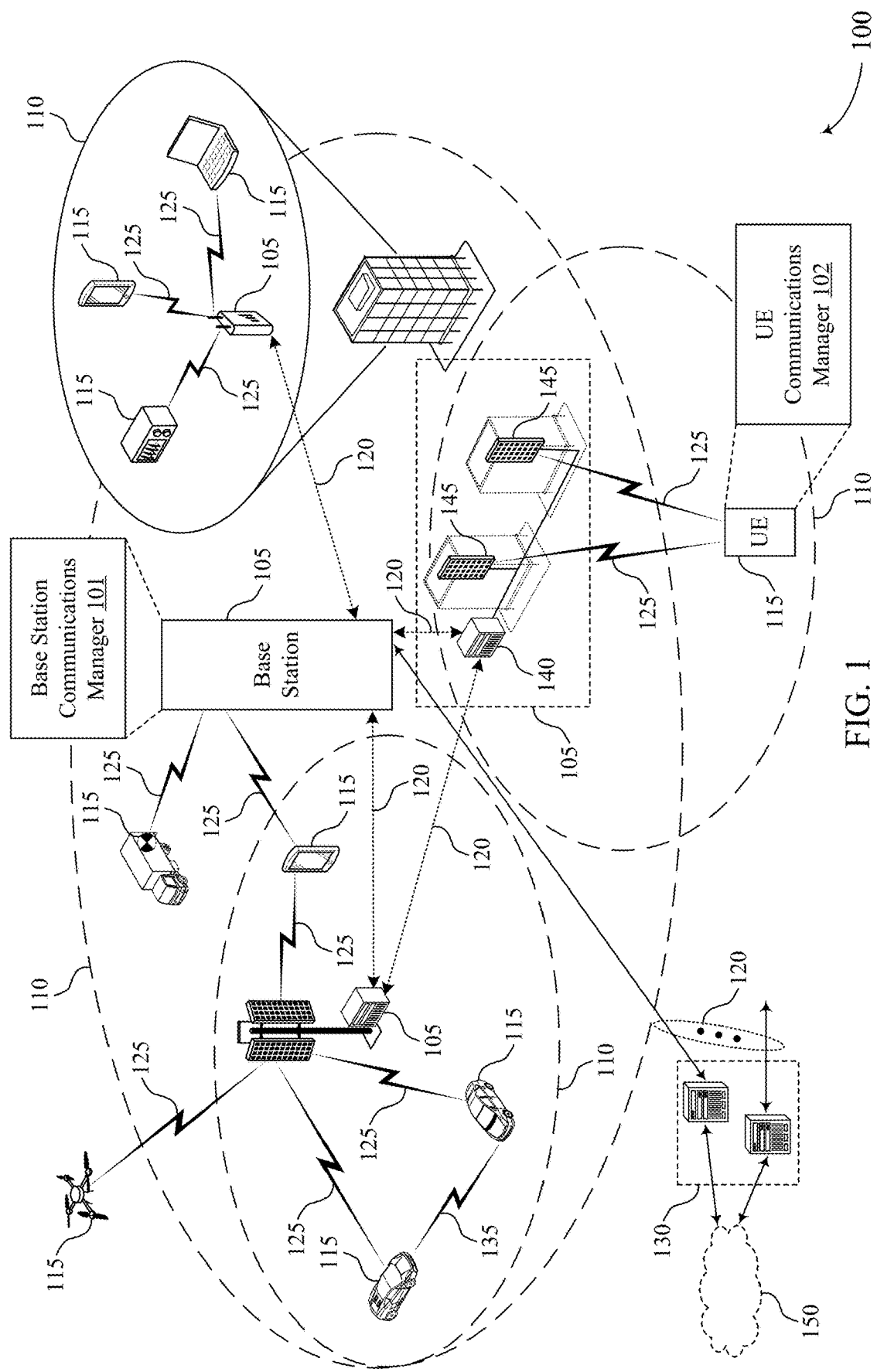
FIG. 1 illustrates an example of a system for wireless communications that supports beam switching robustness in unlicensed radio frequency spectrum band in accordance with one or more aspects of the present disclosure.

The described techniques relate to improved methods, systems, devices, and apparatuses that support beam switching robustness in unlicensed radio frequency spectrum band. A base station may determine a degradation of a communication beam associated with a UE due to, for example, blocking, noise, interference, fading, or the like. The base station may transmit, in a downlink shared data channel, a beam switch signal (such as a beam switch command) to the UE. The beam switch command may provide an indication for the UE to switch a communication beam (such as a beam associated with a control channel or a data channel). In some cases, the base station may identify a beam switch occasion in the beam switch command to the UE.

The beam switch signal may instruct the UE to switch from a current active communication beam to a new active communication beam. The UE may attempt to decode the beam switch signal. In some cases, the UE may be operating in an unlicensed radio frequency spectrum band. That is, the UE may be configured to transmit via a shared channel (e.g., a channel of an unlicensed frequency spectrum band, or a channel of a frequency spectrum band that is licensed to a primary operator but allows opportunistic access for other devices). In such cases, upon successful decoding of the beam switch signal, the UE may perform a contention-based procedure. A contention-based procedure is designed to prevent data collisions whereby multiple devices interfere with one another by communicating on the shared channel at the same (or overlapping) times on the same (or overlapping) frequencies. In an attempt to avoid such interference, the UE may perform a contention-based protocol prior to transmitting a feedback to the base station.

In some cases, the UE may not gain access to the shared channel after receiving the beam switch signal, and may fail to transmit an acknowledgement confirming the receipt of the beam switch signal. In some cases, the base station may not receive an acknowledgment after transmitting the beam switch signal. The base station may then transmit a second signal to the UE, using a transmit beam. The UE may receive the second signal via a downlink receive beam. In some cases, the second signal may be a retransmission of the beam switch signal. In some cases, the second signal may include an indicator associated with the beam switch signal (such as an identifier pointing to the beam switch signal). If the UE successfully decodes the second signal, the UE may transmit an acknowledgement to the base station, and both the base station and the UE may perform a beam switch at a time slot which is a predefined time interval after transmission of the acknowledgement.

In some cases, the base station may configure the UE with multiple feedback opportunities. Specifically, the UE may be configured with multiple feedback opportunities for transmitting an acknowledgement message to the base station. In one example, the base station may transmit, a first signal (such as a beam switch signal) to the UE. The UE may perform a contention-based procedure to determine whether the UE is clear to send an acknowledgement message during a first acknowledgement opportunity. If the shared channel is currently in use by other wireless devices, the UE may not gain access to the shared channel during the first acknowledgement opportunity. The UE may identify an available acknowledgment opportunity from the multiple feedback opportunities configured by the base station, and may transmit a feedback (such as an acknowledgement message) during the available acknowledgment opportunity. Upon successful transmission of a feedback, the UE may perform a beam switch, and switch to the new active communication beam.

By providing the UE with capability to transmit feedback related to the beam switch signal while operating in an unlicensed radio frequency spectrum band, techniques for signaling feedback may be improved. The described techniques relate to configuring the UE with the capability to transmit feedback related to the beam switch signal while operating in an unlicensed radio frequency spectrum band. Thus, the described techniques provide for beam switching robustness associated with signaling feedback. Aspects of the disclosure are initially described in the context of a wireless communications system. Aspects of the disclosure are further illustrated by and described with reference to apparatus diagrams, system diagrams, and flowcharts that relate to beam switching robustness in unlicensed radio frequency spectrum band.

FIG. 1 illustrates an example of a wireless communications system 100 that supports beam switching robustness in unlicensed radio frequency spectrum band in accordance with one or more aspects of the present disclosure. The wireless communications system 100 may include one or more base stations 105, one or more UEs 115, and a core network 130. In some examples, the wireless communications system 100 may be an LTE network, an LTE-A network, an LTE-A Pro network, or an NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T\_s=1/((\Delta f\_max \cdot N\_f))$ seconds, where $\Delta f\_max$ may represent the maximum supported subcarrier spacing, and $N\_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N\_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, in the range of 300 megahertz (MHz) to 300 gigahertz (GHz). In some examples, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

One or more of the base stations 105 may include a base station communication manager 101, which may transmit to the UE 115, a first signal identifying a beam switch occasion for the UE 115. The base station communication manager 101 may also transmit a second signal identifying the beam switch occasion for the UE 115 based on transmitting the first signal. The base station communication manager 101 may receive a third signal acknowledging the beam switch occasion during an acknowledgment opportunity based on the second signal and may perform a beam switch during the beam switch occasion based on receiving the third signal.

In some cases, the base station communication manager 101 may configure a set of acknowledgment opportunities for the UE 115 operating in an unlicensed radio frequency spectrum band. The base station communication manager 101 may transmit a first signal identifying a beam switch occasion for the UE 115 and may receive a second signal acknowledging the beam switch occasion during an available acknowledgment opportunity of the configured set of acknowledgment opportunities. In some cases, the base station communication manager 101 may perform a beam switch during the beam switch occasion based on receiving the second signal.

UEs 115 may include a UE communication manager 102, which may receive a first signal identifying a beam switch occasion for the UE 115. The UE communication manager 102 may receive a second signal identifying the beam switch occasion for the UE based on receiving the first signal. In some cases, the UE communication manager 102 may transmit a third signal acknowledging the beam switch occasion during an acknowledgment opportunity based on the second signal. The UE communication manager 102 may then perform a beam switch during the beam switch occasion based on transmitting the third signal. In some cases, the UE communication manager 102 may receive a first signal identifying a beam switch occasion for the UE 115. The UE communication manager 102 may transmit a second signal acknowledging the beam switch occasion during an available acknowledgment opportunity of a set of acknowledgment opportunities, and may perform a beam switch during the beam switch occasion based on transmitting the second signal.

Figure 2:
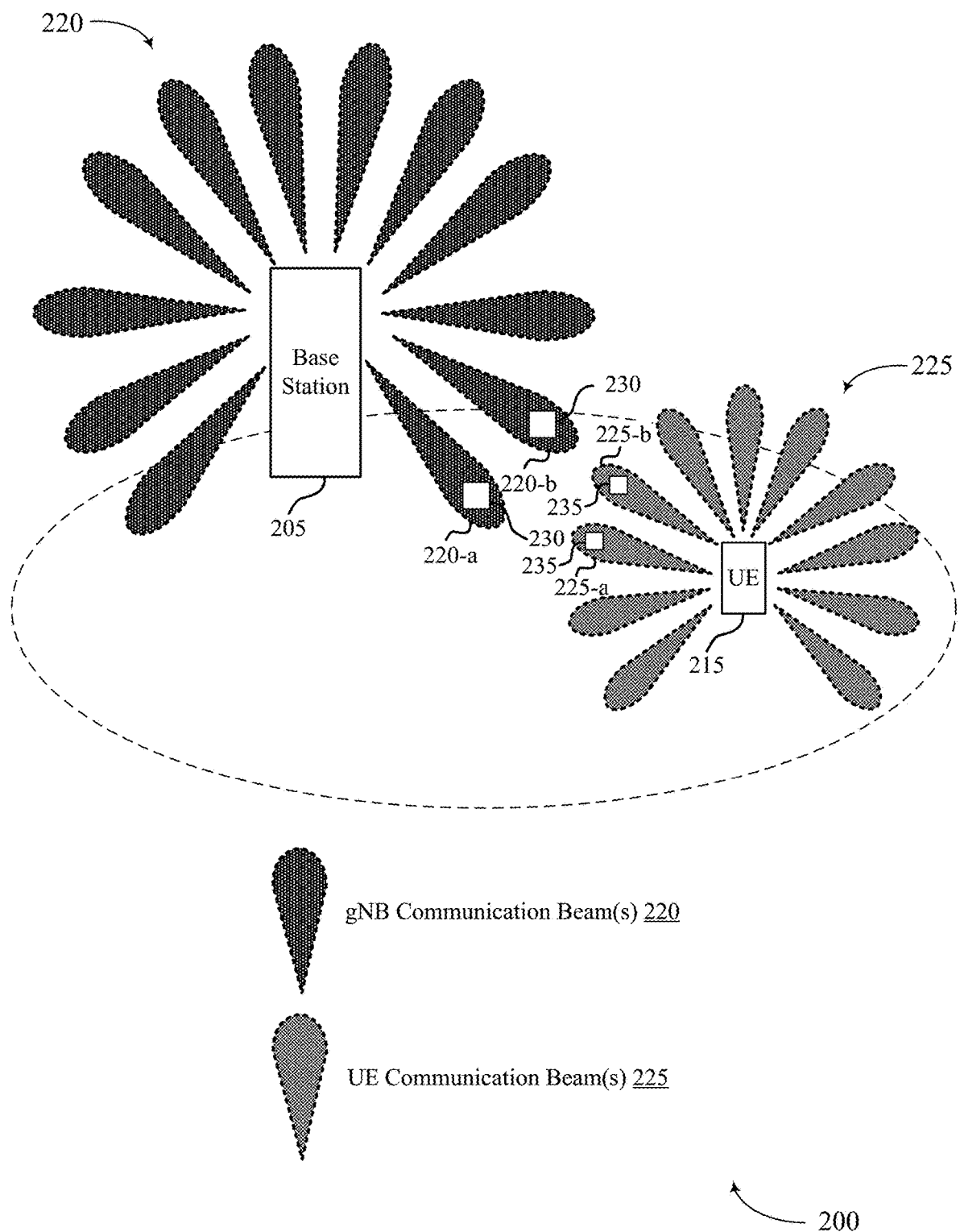
FIG. 2 illustrates an example of a wireless communications system that supports beam switching robustness in unlicensed radio frequency spectrum band in accordance with one or more aspects of the present disclosure.

FIG. 2 illustrates an example of a wireless communications system 200 that supports beam switching robustness in unlicensed radio frequency spectrum band in accordance with one or more aspects of the present disclosure. In some examples, the wireless communications system 200 may implement aspects of wireless communications system 100. The wireless communications system 200 may include a base station 205 and a UE 215, which may be examples of the corresponding devices described with reference to FIG. 1. The wireless communications system 200 may support handling feedback (acknowledgment/non-acknowledgment) signaling related to a beam switch procedure to enhance communications efficiency in an unlicensed radio frequency spectrum band. The described techniques improve conventional techniques for signaling feedback for beam switch procedures. In some cases, the wireless communications system 200 may support feedback signaling on several channels. Such channels may include a PUCCH, a physical downlink control channel (PDCCH), a PDSCH, a PUSCH, a semi-persistent channel state information reference signal (SP-CSI-RS), a semi-persistent sounding reference signal (SP-SRS), an aperiodic channel state information reference signal (AP-CSI-RS), and an aperiodic sounding reference signal (AP SRS).

The base station 205 may perform an RRC procedure (e.g., cell acquisition procedure, random access procedure, RRC connection procedure, RRC configuration procedure) with the UE 215. The base station 205 may be configured with multiple antennas, which may be used for directional or beamformed transmissions (e.g., beamformed communication beams 220). Similarly, the UE 215 may be configured with multiple antennas, which may be used for directional or beamformed transmissions (e.g., beamformed communication beams 225). In some examples, the RRC procedure may include a beam sweep procedure. As illustrated, the base station 205 and/or the UE 215 may transmit a number of beamformed communication beams 220, 225 in different directions within a coverage area.

As part of the RRC procedure, the base station 205 and the UE 215 may synchronize before the base station 205 schedules and allocates resources (e.g., time and frequency resources) for uplink and/or downlink communication between the base station 205 and the UE 215. In some cases, the base station 205 and the UE 215 may repeat the beam sweep pattern over different communication beams 220, 225 in an order which may be determined according to a given beam sweep pattern. The base station 205 and the UE 215 may have at least one active communication beam pair that is being used for wireless communications, as a result of the RRC procedure.

The base station 205 may communicate with the UE 215 on an active communication beam 220-a, and the UE 215 may communicate with the base station 205 on an active communication beam 225-a. The active communication beam may be used for transmitting transmission 230, 235 such as data and control information. The active communication beam may be a downlink receive beam and an uplink transmit beam for the UE 215, or a downlink transmit beam and an uplink receive beam for the base station 205. In some aspects, an active communication beam may change, for example, due to mobility, interference, blockage, and the like. In some cases, the base station 205 may identify a change to an active communication beam, such as due to blockage, and may transmit a beam switch signal, also referred to as a beam switch command, to the UE 215. In some cases, the beam switch signal may identify a beam switch occasion for a UE operating in an unlicensed radio frequency spectrum band.

In conventional wireless communications systems, the base station 205 can switch a downlink control beam after reception of an acknowledgement from the UE 215 that a beam switch command was successfully received. However, UEs operating in an unlicensed radio frequency spectrum band may not always have an opportunity to transmit an acknowledgement to the base station 205. For example, the base station 205 may transmit a beam switch signal to the UE 215 in a MAC layer control element on a downlink beam (e.g., PDCCH), which the UE 215 may receive on a downlink receive beam. The beam switch signal may instruct the UE 215 to switch from a current uplink control beam to a new uplink control beam (e.g., from beam 225-a to beam 225-b). The UE 215 may successfully decode the beam switch signal. In a shared spectrum, upon successful decoding, the UE 215 may perform a contention-based procedure prior to transmitting feedback for the beam switch signal. A contention-based procedure is designed to prevent data collisions whereby multiple devices interfere with one another by communicating on the shared channel at the same (or overlapping) times on the same (or overlapping) frequencies. In an attempt to avoid such interference, the UE 215 may perform a contention-based procedure prior to each transmission (such as transmission of an acknowledgement message). For instance, the UE 215 may send a transmission to reserve the shared channel before transmitting or may listen to the shared channel to confirm that the shared channel is not currently being used before transmitting.

In some cases, if the shared channel is not available, the UE 215 may fail to transmit a feedback (i.e., acknowledgement) for the beam switch signal. In some cases, the feedback may be transmitted by the UE 215, but may be lost due to certain channel conditions (such as bursty interference or high SINR). That is, the base station 205 may fail to receive the acknowledgement indicating that the UE successfully decoded the beam switch command. In either of the prior examples, the base station 205 may incorrectly believe that the UE 215 did not receive the beam switch command, thereby increasing latency. Thus, the reliability of the existing technique of switching a beam after transmitting an acknowledgement on the current beam may be improved.

Therefore, the wireless communications system 200, applying the techniques described herein, may support robust feedback signaling related to a beam switch procedure in unlicensed radio frequency spectrum band. Specifically, the techniques described herein provide for enhancing communications efficiency and reducing latency in the wireless communications system 200, while resolving existing challenges related to conventional techniques for signaling feedback for beam switch procedures.

In an example, the base station 205 may transmit, to the UE 215, a first signal (such as a beam switch signal) over a channel using a transmit beam, which the UE 215 may receive via a downlink receive beam. As previously discussed, the channel can be a control channel or a data channel. In some examples, the base station 205 may schedule a PDSCH transmission of the beam switch signal using a PDCCH. For example, the base station 205 may transmit scheduling information, via a downlink control information (DCI) on a PDCCH, including time and frequency resources for a PDSCH transmission from the base station 205 to the UE 215. In some examples, the base station 205 may transmit, to the UE 215, the beam switch signal in a MAC layer control element or in a DCI, which the UE 215 may receive via a downlink receive beam.

The beam switch signal may instruct the UE 215 to switch from a current active communication beam 225-a to a new active communication beam 225-b. The active communication beam 225-a may be a first uplink control transmit beam and the active communication beam 225-b may be a second uplink control transmit beam. The UE 215 may attempt to decode the first signal (such as the beam switch signal). If able to successfully decode the beam switch signal, the UE 215 may perform a contention-based procedure. For example, the UE 215 may perform an LBT procedure to confirm that the shared channel is not currently in use by other wireless devices. In some cases, the UE 215 may not gain access to the shared channel after receiving the first signal (such as the beam switch signal) due to the outcome of the LBT procedure. In such a case, the UE 215 may fail to transmit an acknowledgement confirming the upcoming beam switch.

In some cases, the base station 205 may not receive an acknowledgment for a threshold time period after transmitting the first signal. In such a case, the base station 205 may transmit, to the UE 215, a second signal (such as a beam switch signal) over a channel using a transmit beam. The UE 215 may receive the second signal via a downlink receive beam. In some cases, the second signal may be a retransmission of the beam switch signal. In some cases, the second signal may include an indicator associated with the first signal. For example, the second signal may include an indicator to the MAC layer control element transmitted in the first signal. The technique of transmitting an indicator of the first signal (such as the beam switch signal) instead of retransmitting the first signal may result in reducing the payload of the second signal.

If able to successfully decode the second signal, the UE 215 may transmit an acknowledgement to the base station 205. In some cases, the UE 215 may transmit the acknowledgement on the current active communication beam 225-a. The UE 215 performs a beam switch at a time slot which is a predefined time interval after transmitting the acknowledgement. For example, the UE 215 may be configured to switch to the new active communication beam 225-b, three milliseconds (or more than three milliseconds) after transmitting the acknowledgement to the base station 205. In some cases, the UE 215 may be configured to switch to the new active communication beam 225-b, less than three milliseconds after transmitting the acknowledgement to the base station 205. If unable to successfully decode the second signal, the UE 215 may transmit a negative acknowledgment on the current active communication beam 225-a. In such cases, the base station 205 may retransmit the first signal (such as a beam switch signal) to provide the UE 215 another opportunity to successfully perform a beam switch.

In another example, the base station 205 may configure the UE 215 with multiple acknowledgement opportunities. In some cases, the UE 215 may be configured with the acknowledgement opportunities during an RRC procedure. The multiple acknowledgement opportunities may provide the UE 215 with multiple slots to send an acknowledgement message to the base station 205. In this example, the base station 205 may transmit, to the UE 215, a first signal (such as a beam switch signal) over a channel using a transmit beam. The base station 205 may transmit the beam switch signal in a MAC layer control element or in a DCI. The beam switch signal may instruct the UE 215 to switch from a current active communication beam 225-a to a new active communication beam 225-b.

As previously discussed, upon successful decoding of the beam switch signal, the UE 215 may perform a contention-based procedure. For example, the UE 215 may perform the contention-based procedure to monitor the unlicensed radio frequency spectrum band. In some cases, the UE 215 may determine whether the UE 215 is clear to send an acknowledgement message during a first acknowledgement opportunity. If the shared channel is currently in use by other wireless devices, the UE 215 may not gain access to the shared channel during the first acknowledgement opportunity. The UE 215 may identify an available acknowledgment opportunity from the set of acknowledgment opportunities configured by the base station 205 based on the contention-based procedure. Upon successful transmission of an acknowledgement message during an available acknowledgement opportunity, the UE 215 may perform a beam switch, and switch to the new active communication beam 225-b.

In some examples, the base station 205 may configure the UE 215 with a set of different TCI states. Each of the TCI states may be associated with a different uplink beams. In some cases, the TCI state may indicate a communication beam including a reference signal (e.g., synchronization signal blocks (SSBs), channel state information reference signals (CSI-RSs), or tracking reference signals (TRSs)) for the UE 215 to use to perform receiver processing for demodulating and decoding data and control information to be received from base station 205. In some cases, the base station 205 may request the UE 215 for TCI state information associated with multiple channels. The UE 215 may transmit a report including the TCI state information, to the base station 205. In some cases, the TCI state information associated with the multiple channels includes at least one of a TCI state information associated with a CORESET, a TCI state information associated with a PDSCH, a spatial relation information associated with a PUSCH or a PUCCH, or a combination thereof. The technique of polling the UE 215 for latest spatial information (such as TCI state information) may enable the base station 205 to determine a beam switch occasion (i.e., a time to perform the beam switch, the new active communication beam, etc.). By providing, the UE 215 with capability to transmit feedback related to the beam switch signal while operating in an unlicensed radio frequency spectrum band, conventional techniques for signaling feedback may be improved.

Figure 3:
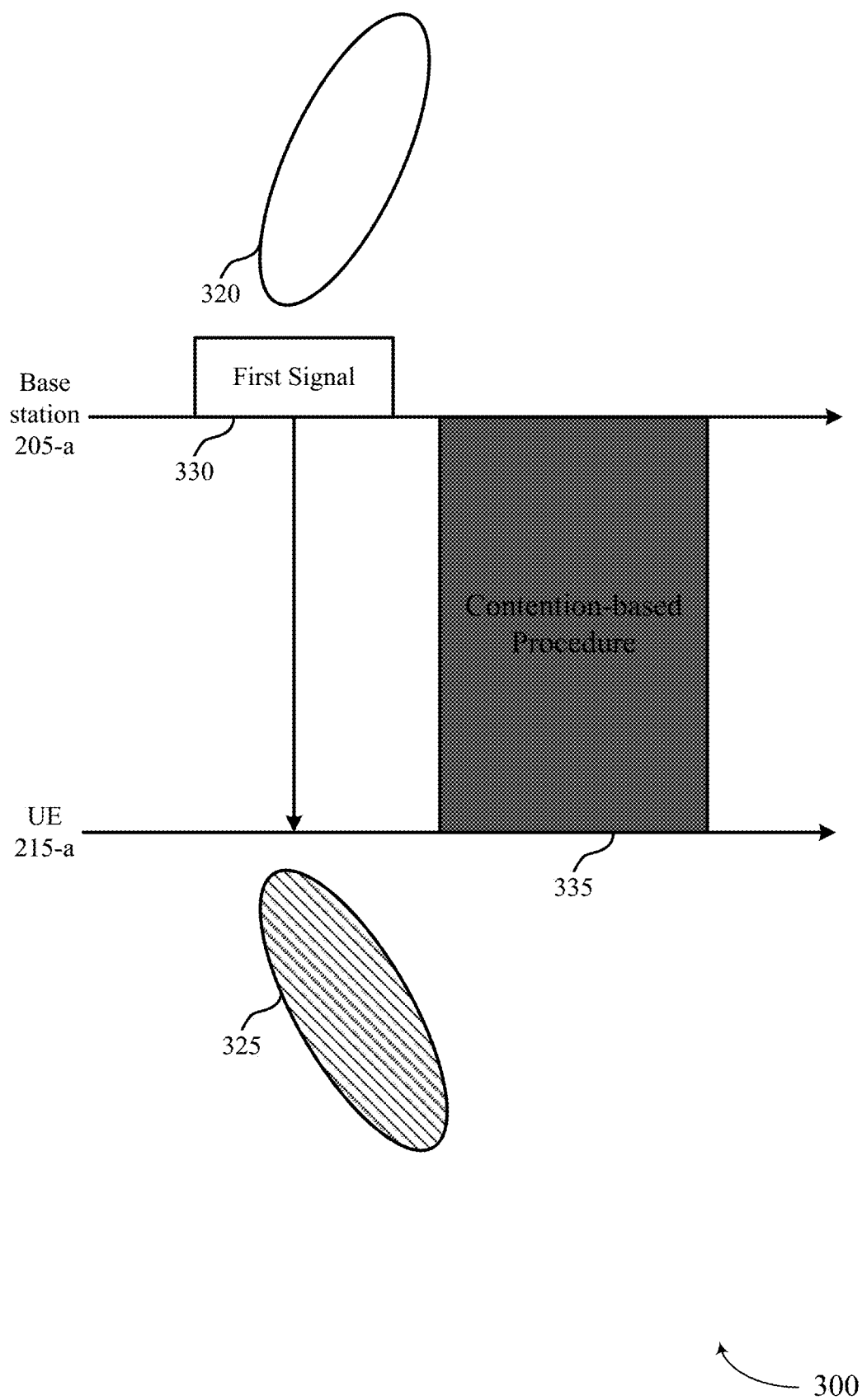
FIG. 3 illustrates an example of a timeline that supports beam switching robustness in unlicensed radio frequency spectrum band in accordance with one or more aspects of the present disclosure.

FIG. 3 illustrates an example of a timeline 300 that supports beam switching robustness in unlicensed radio frequency spectrum band in accordance with one or more aspects of the present disclosure. In some examples, the timeline 300 may implement aspects of the wireless communications systems 100 and 200. The timeline 300 may support handling feedback (acknowledgment/non-acknowledgment) signaling related to a beam switch procedure in an unlicensed radio frequency spectrum band. Such techniques to provide feedback in an unlicensed radio frequency spectrum band may enhance communications efficiency and reduce latency in a wireless communications system. The timeline 300 may include a base station 205-a and a UE 215-a, which may be examples of the corresponding devices described with reference to FIGS. 1 and 2.

The timeline 300 may illustrate an example situation where the base station 205-a determines to switch a beam associated with a channel (such as an uplink data channel or an uplink control channel) used by the UE 215-a. The timeline 300 may be expressed in multiples of a basic time unit, which may, for example, refer to a TTI. A TTI may include one or more subframes, slots, frames, or the like. Each slot may contain, for example, 14 modulation symbol periods (e.g., OFDM symbols). In some cases, a TTI or a slot may be a scheduling unit in a wireless communications system.

The base station 205-a may perform an RRC procedure with the UE 215-a to establish an initial connection. As part of the RRC procedure, the base station 205-a and the UE 215-a may synchronize before the base station 205-a schedules and allocates resources for uplink and/or downlink communication between the base station 205-a and the UE 215-a. As discussed with reference to FIG. 2, the base station 205-a and the UE 215-a may each be configured with multiple antennas, which may be used for directional or beamformed transmissions (e.g., beamformed communication beams 320 and beamformed communication beams 325). In some cases, the base station 205-a and/or the UE 215-a may transmit a number of beamformed communication beams 320, 325 in different directions within a coverage area.

After completion of the RRC procedure, the base station 205-a may communicate with the UE 215-a on an active communication beam 320, and the UE 215-a may communicate with the base station 205-a on an active communication beam 325. The active communication beams 320 and 325 may be used for transmitting data and control information. In some cases, the active communication beams may be a downlink receive beam and an uplink transmit beam for the UE 215-a, or a downlink transmit beam and an uplink receive beam for the base station 205-a. In some cases, the UE 215-a may use the active communication beam 325 to transmit a report (such as an "L1" report) to the base station 205-a. In some aspects, the base station 205-a may determine whether to initiate a beam change based on the transmitted report. Additionally or alternatively, an active communication beam (such as active communication beam 320) may change, for example, due to mobility, interference, blockage, and the like.

As depicted in the example of FIG. 3, the base station 205-a may identify a change to an active communication beam 320, and may transmit a first signal 330 (such as a beam switch signal), to the UE 215-a. That is, the base station 205-a may determine that a status of an active communication beam 320 is below an acceptable performance threshold. For example, the active communication beam may degrade due to blocking or fading, an available transmit power for the active communication beam 320 may be below a threshold (e.g., due to a maximum permissible exposure (MPE) limitations), or the like. In some cases, the first signal 330 is transmitted using the active communication beam 320. The active communication beam 320 may be a downlink transmit beam or an uplink receive beam. In the example that the active communication beam 320 is a downlink transmit beam, the beam switch signal may be transmitted in a MAC layer control element on the downlink transmit beam. In some cases, the first signal 330 may identify a beam switch occasion for the UE 215-a operating in an unlicensed radio frequency spectrum band. In some cases, the first signal may include a DCI.

According to one or more aspects of the present disclosure, the UE 215-a may receive the first signal 330 using the active communication beam 325. The UE 215-a may then decode the first signal 330 to identify an upcoming beam switch occasion. Upon successful decoding, the UE 215-a may perform a contention-based procedure 335 prior to transmitting feedback for the first signal 330 (such as the beam switch signal). In an attempt to avoid any interference in an unlicensed radio frequency spectrum band, the UE 215-a may perform the contention-based procedure 335 (such as LBT) prior to a transmission of an acknowledgement message. For example, during the contention-based procedure 335, the UE 215-a may send a transmission to reserve the shared channel before transmitting or may listen to the shared channel to confirm that the shared channel is not currently being used before transmitting. As such, a mechanism for providing feedback sooner (e.g., reducing the delay associated with the contention-based procedure 335) may be desirable.

Figure 4:
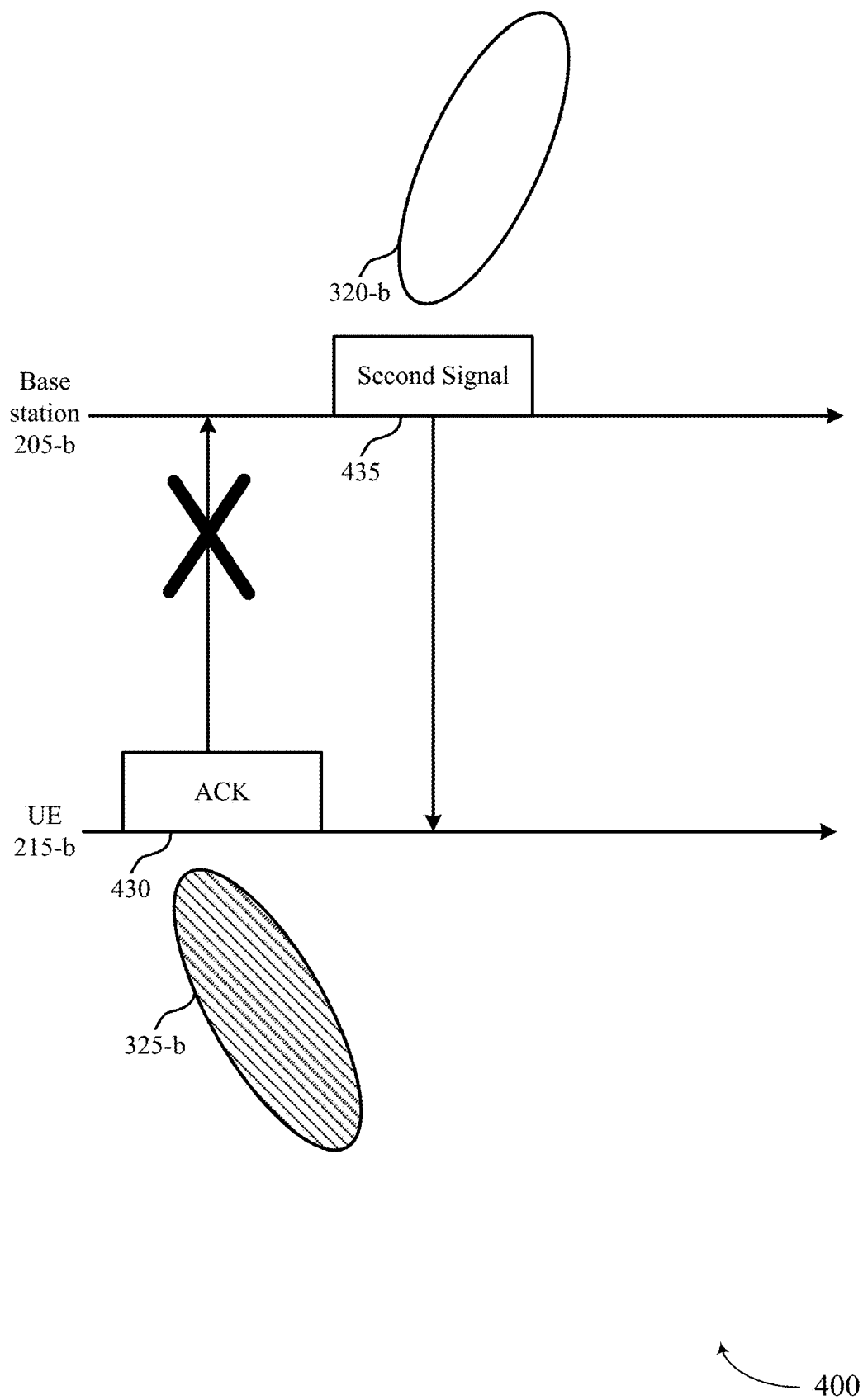
FIG. 4 illustrates an example of a timeline that supports beam switching robustness in unlicensed radio frequency spectrum band in accordance with one or more aspects of the present disclosure.

FIG. 4 illustrates an example of a timeline 400 that supports beam switching robustness in unlicensed radio frequency spectrum band in accordance with one or more aspects of the present disclosure. In some examples, the timeline 400 may implement aspects of the wireless communications systems 100 and 200. The timeline 400 may support handling feedback (acknowledgment/non-acknowledgment) signaling related to a beam switch procedure in an unlicensed radio frequency spectrum band. As one example, the timeline 400 may follow the timeline 300 as depicted in FIG. 3. The timeline 400 may include a base station 205-b and a UE 215-b, which may be examples of the corresponding devices described with reference to FIGS. 1, 2 and 3. Additionally, the active communication beams 320 and 325 may be examples of the active communication beams described with reference to FIGS. 1, 2, and 3.

The timeline 400 may illustrate an example situation where the base station 205-b determines to switch a communication beam (such as an active communication beam 320-b and an active communication beam 325-b) used by the UE 215-b. As depicted herein, the timeline 400 follows the timeline 300. In some cases, the UE 215-b may receive a first signal identifying a beam switch occasion for the UE 215-b (shown in FIG. 3) and may perform a contention-based procedure in response to receiving the first signal (shown in FIG. 3). Based on the outcome of the contention-based procedure, the UE 215-b may determine that the channel is not clear for it to transmit feedback 430. In some cases, upon performing an LBT procedure, the UE 215-b may infer that transmitting the feedback 430 (such as an acknowledgement) may interfere with other transmissions in the shared channel. In such cases, the base station 205-b may transmit a second signal 435 identifying the beam switch occasion for the UE 215-b.

In some cases, the second signal 435 may be transmitted using the active communication beam 320-b. The active communication beam 320-b may be a downlink transmit beam or an uplink receive beam. In the example that the active communication beam 320-b is a downlink transmit beam, the beam switch signal may be transmitted in a MAC layer control element on the downlink transmit beam. In some cases, the second signal 435 may be a retransmission of the first signal 330 described with reference to FIG. 3. In some cases, the second signal 435 may include an indicator of the first signal 330. For example, the second signal 435 may include a pointer pointing to the first signal 330. In some cases, the second signal 435 may indicate a beam switch occasion for the UE 215-*b* operating in an unlicensed radio frequency spectrum band.

According to one or more aspects of the present disclosure, the UE 215-*b* may receive the second signal 435 using the active communication beam 325-*b*. The UE 215-*b* may then decode the second signal 435 to identify the upcoming beam switch occasion. Upon successful decoding, the UE 215-*b* may perform a contention-based procedure (not shown). If the outcome of the contention-based procedure indicates that the UE 215-*b* is clear to transmit feedback, the UE may transmit feedback (such as an acknowledgement) for the second signal 435 (shown in FIG. 5).

Figure 5:
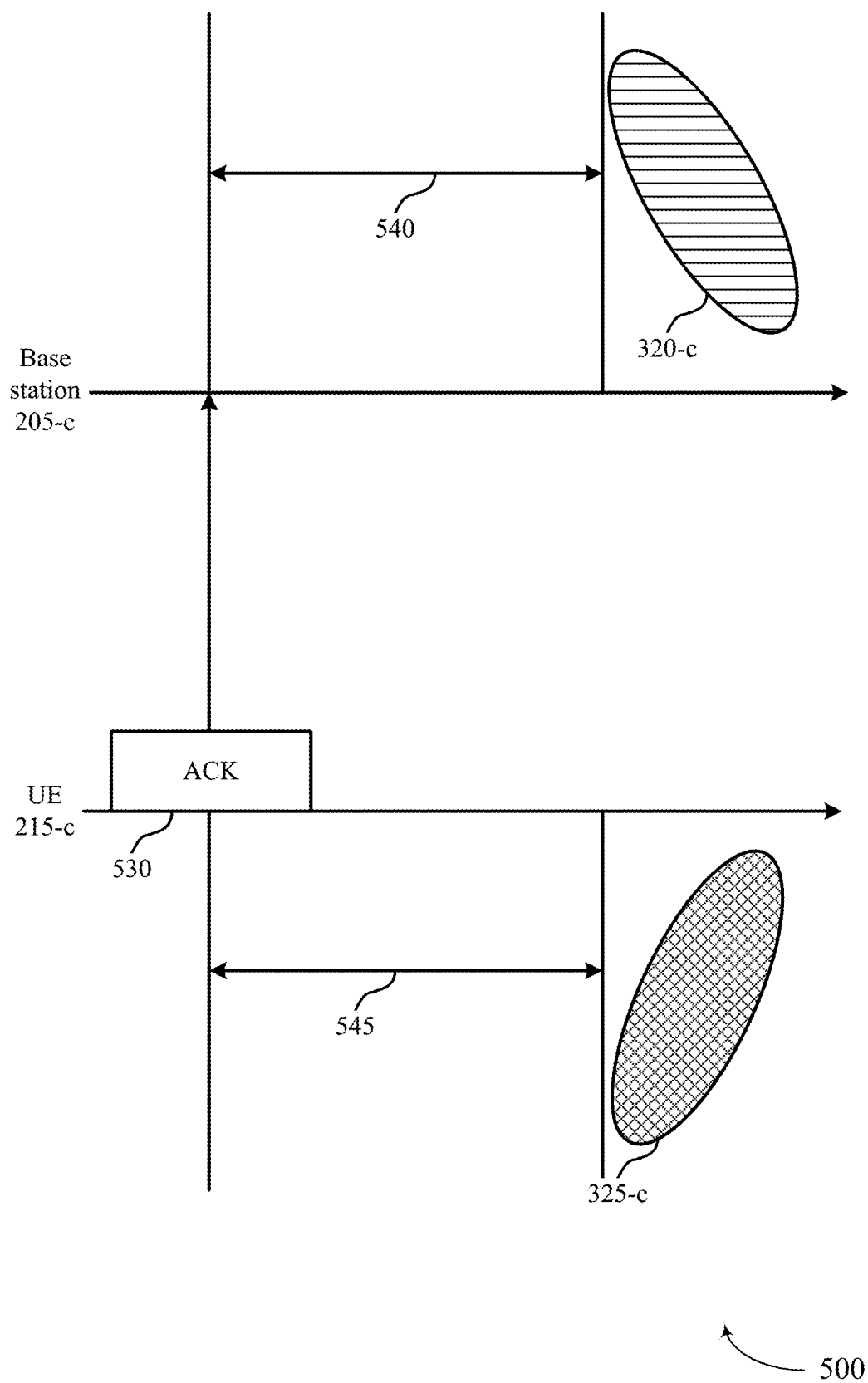
FIG. 5 illustrates an example of a timeline that supports beam switching robustness in unlicensed radio frequency spectrum band in accordance with one or more aspects of the present disclosure.

FIG. 5 illustrates an example of a timeline 500 that supports beam switching robustness in unlicensed radio frequency spectrum band in accordance with one or more aspects of the present disclosure. In some examples, the timeline 500 may implement aspects of the wireless communications systems 100 and 200. The timeline 500 may support handling feedback (acknowledgment/non-acknowledgment) signaling related to a beam switch procedure in an unlicensed radio frequency spectrum band. As one example, the timeline 500 may follow the timeline 400 as depicted in FIG. 4. The timeline 500 may include a base station 205-*c* and a UE 215-*c*, which may be examples of the corresponding devices described with reference to FIGS. 1, 2, 3 and 4. Additionally, the active communication beams 320 and 325 may be examples of the active communication beams described with reference to FIGS. 1, 2, 3, and 4.

The timeline 500 may illustrate an example situation where the base station 205-*c* determines to switch a communication beam (such as an active communication beam 320 and an active communication beam 325 as described in FIGS. 3 and 4) used by the UE 215-*c*. As depicted herein, the timeline 500 follows the timeline 400 described in FIG. 4. In some cases, the UE 215-*c* may receive a first signal identifying a beam switch occasion for the UE 215-*c*, and may perform a contention-based procedure (shown in FIG. 3). Based on the outcome of the contention-based procedure, the UE 215-*c* may determine that the channel is not clear for it to transmit feedback (shown in FIG. 4). As further depicted in FIG. 4, the base station 205-*c* may transmit a second signal (such as second signal 435) identifying a beam switch occasion for the UE 215-*c*. In some cases, the second signal may be transmitted using an active communication beam (such as active communication beam 320-*b* as described with reference to FIG. 4).

In some cases, the second signal may indicate that the base station 205-*c* is to switch to a new active communication beam 320-*c* and the UE 215-*c* is to switch to a new active communication beam 325-*c*, during the upcoming beam switch occasion. If the UE 215-*c* successfully decodes the second signal, the UE 215-*c* may perform a contention-based procedure (not shown). If the outcome of the contention-based procedure indicates that the UE 215-*c* is clear to transmit feedback 530, the UE may transmit the feedback (such as an acknowledgement) for the second signal. After transmitting the feedback 530, the UE 215-*c* may perform a beam switch at a time slot which is a predefined time interval 545 after transmitting the acknowledgement feedback 530. Similarly, the base station 205-*c* may perform a beam switch at a time slot which is a predefined time interval 540 after receiving the acknowledgement feedback 530. For example, the UE 215-*c* may be configured to switch to the new active communication beam 325-*c* and the base station 205-*c* may be configured to switch to the new active communication beam 320-*c*, three milliseconds after transmission of the acknowledgement feedback 530.

In some cases, the UE 215-*c* may be configured to switch to the new active communication beam 325-*c* and the base station 205-*c* may be configured to switch to the new active communication beam 320-*c*, more than three milliseconds after transmission of the acknowledgment feedback 530. In some cases, the UE 215-*c* may be configured to switch to the new active communication beam 325-*c* and the base station 205-*c* may be configured to switch to the new active communication beam 320-*c*, less than three milliseconds after transmission of the acknowledgement feedback 530. In an alternative scenario, if unable to successfully decode the second signal, the UE 215-*c* may transmit a negative acknowledgment on the current active communication beam 325-*b* (not shown in FIG. 5). In such cases, the base station 205-*c* may retransmit the first signal (such as a beam switch signal).

Figure 6:
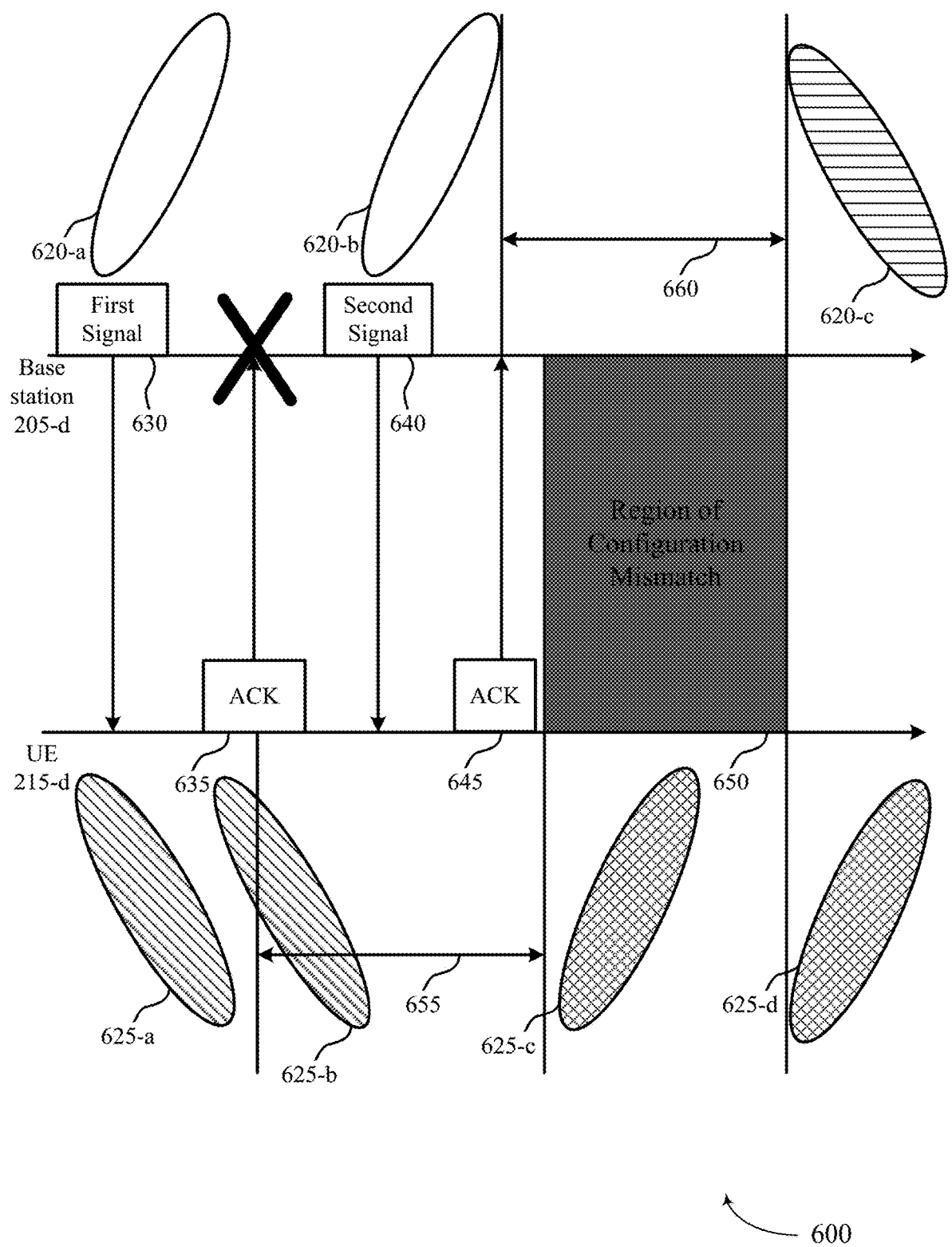
FIG. 6 illustrates an example of a timeline that supports beam switching robustness in unlicensed radio frequency spectrum band in accordance with one or more aspects of the present disclosure.

FIG. 6 illustrates an example of a timeline 600 that supports beam switching robustness in unlicensed radio frequency spectrum band in accordance with one or more aspects of the present disclosure. In some examples, the timeline 600 may implement aspects of the wireless communications systems 100 and 200. The timeline 600 may support handling feedback (acknowledgment/non-acknowledgment) signaling related to a beam switch procedure in an unlicensed radio frequency spectrum band. The timeline 600 may include a base station 205-*d* and a UE 215-*d*, which may be examples of the corresponding devices described with reference to FIGS. 1, 2, 3, 4 and 5. Additionally, the active communication beams 620 may be examples of the active communication beams 320, and the active communication beams 625 may be examples of the active communication beams 325 described with reference to FIGS. 1, 2, 3, 4, and 5.

The base station 205-*d* may perform an initial RRC procedure with the UE 215-*d* to establish a connection. After connection establishment, the base station 205-*d* and/or the UE 215-*d* may transmit a number of beamformed communication beams 620, 625 in different directions within a coverage area. In some cases, the base station 205-*d* may identify a change to an active communication beam 620 (such as 620-*a*), and may transmit a first signal 630 (such as a beam switch signal), to the UE 215-*d*. The base station 205-*d* may determine that a status of an active communication beam 620-*a* is below an acceptable performance threshold, and may determine to switch the active communication beam 620-*a* to a new active communication beam 620-*c*. In some cases, the first signal 630 is transmitted using the active communication beam 620-*a*. The base station 205-*d* may transmit the first signal 630 (such as a beam switch signal) in a MAC layer control element on a downlink transmit beam (such as active communication beam 620-*a*). In some cases, the first signal 630 may identify a beam switch occasion for the UE 215-*d* operating in an unlicensed radio frequency spectrum band.

According to one or more aspects of the present disclosure, the UE 215-*d* may receive the first signal 630 using the active communication beam 625-*a*, and may decode the first signal 630 to identify the beam switch occasion. Upon successful decoding, the UE 215-*d* may perform a contention-based procedure (not shown) prior to transmitting feedback for the first signal 630. If the UE 215-*d* determines that the channel is clear for the UE 215-*d* to transmit feedback, the UE 215-*d* may transmit feedback 635 (such as an acknowledgement) to the base station 205-*d*. After transmitting the feedback 635, the UE 215-*d* may perform a beam switch at a time slot which is a predefined time interval 655 after transmitting the feedback 635 (such as an acknowledgement). For example, the UE 215-*d* may be configured to switch to the new active communication beam 625-*c*, three milliseconds after transmission of the feedback 635. In some cases, the UE 215-*d* may be configured to switch to the new active communication beam 625-*c*, more than three milliseconds after transmission of the feedback 635. In some cases, the UE 215-*d* may be configured to switch to the new active communication beam 625-*c*, less than three milliseconds after transmission of the feedback 635.

In some cases, due to interference or low SINR, the base station 205-*d* may fail to receive the feedback 635 from the UE 215-*d*. In such cases, the base station 205-*d* may transmit a second signal 640 identifying the beam switch occasion for the UE 215-*d*. In some cases, the second signal 640 may be transmitted using the active communication beam 620-*b*. In some examples, the second signal 640 may be a retransmission of the first signal 630. In some instances, the second signal 640 may include an indicator of the first signal 630. The UE 215-*d* may receive the second signal 640 and may transmit feedback 645 (such as an acknowledgement) for the second signal 640. The base station 205-*d* may receive the feedback 645 and may perform a beam switch at a time slot which is a predefined time interval 660 after receiving the feedback 645. Because the UE 215-*d* performs the beam switch after transmitting the feedback 635 of the first signal 630, and the base station 205-*d* performs the beam switch after receiving the feedback 645 of the second signal 640, there exists a region of configuration mismatch 650 between the base station 205-*d* and the UE 215-*d*. A mechanism for reducing the region of configuration mismatch 650 may be desirable.

Figure 7:
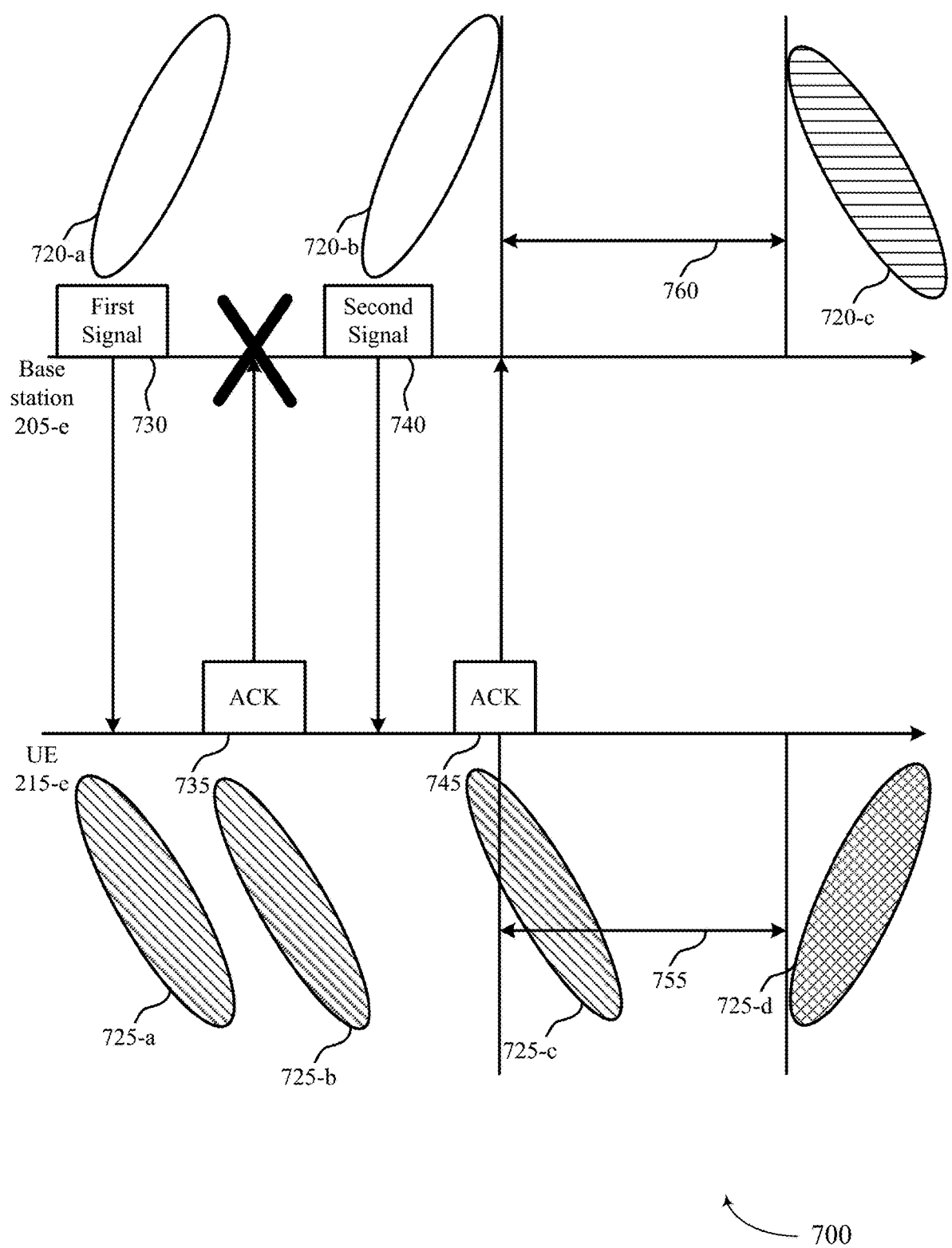
FIG. 7 illustrates an example of a timeline that supports beam switching robustness in unlicensed radio frequency spectrum band in accordance with one or more aspects of the present disclosure.

FIG. 7 illustrates an example of a timeline 700 that supports beam switching robustness in unlicensed radio frequency spectrum band in accordance with one or more aspects of the present disclosure. In some examples, the timeline 700 may implement aspects of the wireless communications systems 100 and 200. The timeline 700 may support handling feedback (acknowledgment/non-acknowledgment) signaling related to a beam switch procedure in an unlicensed radio frequency spectrum band. The timeline 700 may include a base station 205-*e* and a UE 215-*e*, which may be examples of the corresponding devices described with reference to FIGS. 1, 2, 3, 4, 5, and 6. Additionally, the active communication beams 720 may be examples of the active communication beams 320 and 620, and the active communication beams 725 may be examples of the active communication beams 325 and 625 described with reference to FIGS. 1, 2, 3, 4, 5, and 6.

As described with reference to FIGS. 3 through 6, a base station 205-*e* may establish a connection with a UE 215-*e*. The base station 205-*e* and/or the UE 215-*e* may transmit a number of beamformed communication beams 720, 725 in different directions within a coverage area. In some cases, the base station 205-*e* may determine a beam switch occasion for the UE 215-*e*. In some cases, the beam switch occasion may be based on a change to an active communication beam 720. The base station 205-*e* may transmit a first signal 730 (such as a beam switch signal), to the UE 215-*e*. In some cases, the first signal 730 may be transmitted using the active communication beam 720-*a*. In some cases, the base station 205-*e* may transmit the first signal 730 in a MAC layer control element. The UE 215-*e* may receive the first signal 730 using the active communication beam 725-*a*, and may decode the first signal 730 to identify the beam switch occasion. Upon successful decoding, the UE 215-*e* may perform a contention-based procedure (not shown), and transmits feedback 735 (such as an acknowledgement) if the UE 215-*e* determines that the channel is clear based on the contention-based procedure. After transmitting the feedback 735, according to conventional systems, the UE 215-*e* may be configured to perform a beam switch at a time slot which is a predefined time interval after transmitting the feedback 735. According to one example, the UE 215-*e* may be configured to switch to a new active communication beam, three milliseconds after transmission of the feedback 735 (not shown in FIG. 7). In some examples, the UE 215-*e* may be configured to switch to a new active communication beam, more than three milliseconds after transmission of the feedback 735. Alternatively, the UE 215-*e* may be configured to switch to a new active communication beam, less than three milliseconds after transmission of the feedback 735.

In some cases, due to bursty interference, the base station 205-*e* may fail to receive the feedback 735 from the UE 215-*e*. In such cases, the base station 205-*e* may transmit a second signal 740 identifying the beam switch occasion for the UE 215-*e*. In some cases, the second signal 740 may be transmitted using the active communication beam 720-*b*. In some examples, the second signal 740 may be a retransmission of the first signal 730, or may include an indicator of the first signal 730. To address the configuration mismatch described with reference to FIG. 6, according to one or more aspects of the present disclosure, the base station 205-*e* may set a value of an indicator (such as a Reset flag) included in the second signal 740. The UE 215-*e* may receive the second signal 740 and may determine that the beam switch occasion is to occur at a predefined time interval 755 after transmitting feedback 745, based on the value of the indicator being one. That is, if the base station 205-*e* sets the value of the indicator in the second signal 740 to be one, the UE 215-*e* may determine that the beam switch occasion is to occur at a predefined time interval 755 after transmitting the feedback 745 instead of after transmitting the feedback 735. More specifically, even if the UE 215-*e* transmits feedback 735, the UE 215-*e* does not perform a beam switch after transmission of the feedback 735.

Upon receiving the second signal 740, the UE 215-*e* may transmit the feedback 745 (such as an acknowledgement) for the second signal 740, and may perform the beam switch, a predefined time interval 755 after transmitting the feedback 745 of the second signal 740. In some cases, the base station 205-*e* may receive the feedback 745 and may perform a beam switch at a time slot which is a predefined time interval 760 after receiving the feedback 745. For example, the UE 215-*e* may be configured to switch to the new active communication beam 725-*d* and the base station 205-*e* may be configured to switch to the new active communication beam 720-*c*, three milliseconds after transmission of the feedback 745 for the second signal 740. In some examples, the UE 215-*e* may be configured to switch to the new active communication beam 725-*d* and the base station 205-*e* may be configured to switch to the new active communication beam 720-*c*, more than three milliseconds after transmission of the feedback 745 for the second signal 740. Alternatively, the UE 215-*e* may be configured to switch to the new active communication beam 725-*d* and the base station 205-*e* may be configured to switch to the new active communication beam 720-c, less than three milliseconds after transmission of the feedback 745 for the second signal 740.

Figure 8:
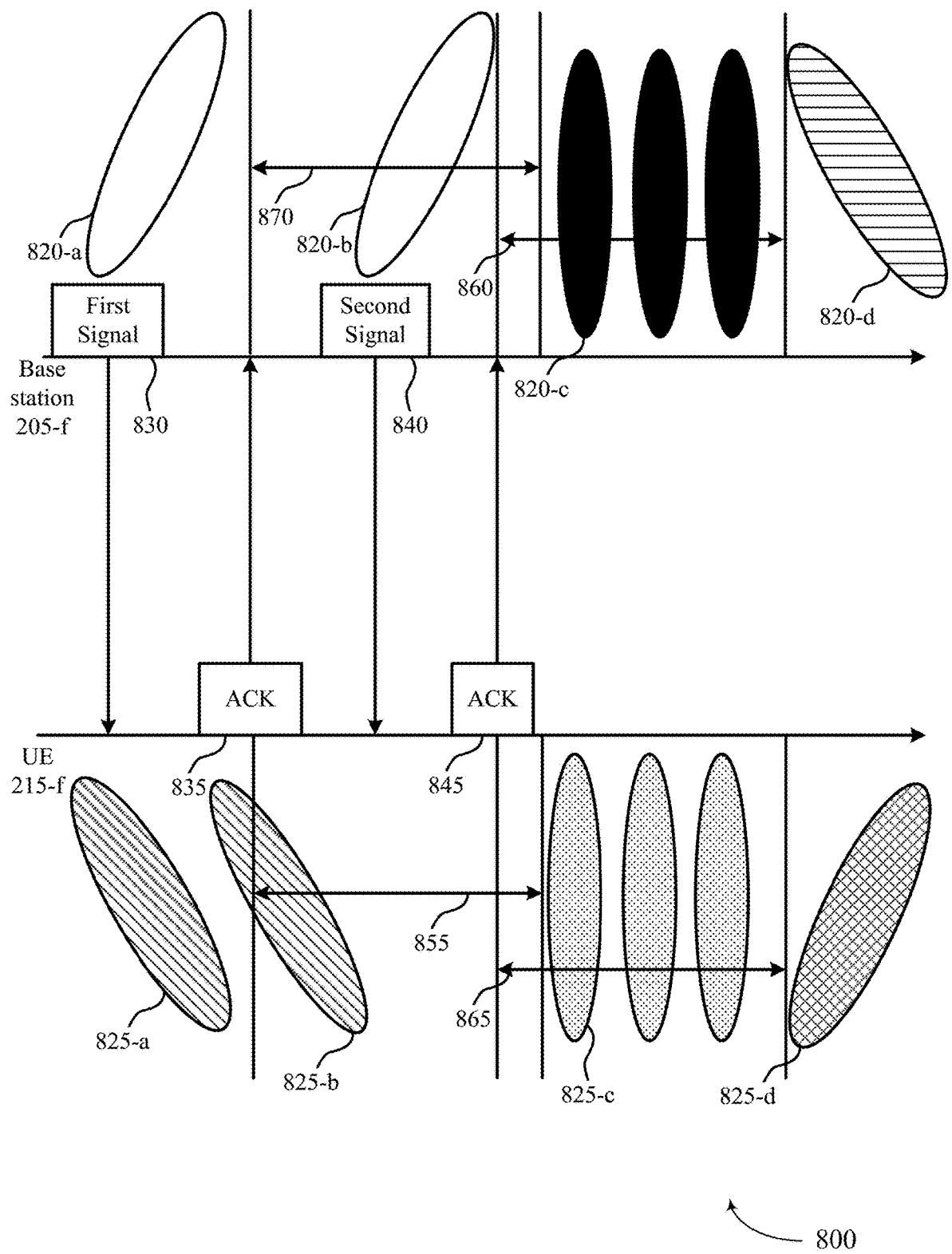
FIG. 8 illustrates an example of a timeline that supports beam switching robustness in unlicensed radio frequency spectrum band in accordance with one or more aspects of the present disclosure.

FIG. 8 illustrates an example of a timeline 800 that supports beam switching robustness in unlicensed radio frequency spectrum band in accordance with one or more aspects of the present disclosure. In some examples, the timeline 800 may implement aspects of the wireless communications systems 100 and 200. The timeline 800 may support handling feedback (acknowledgment/non-acknowledgment) signaling related to a beam switch procedure in an unlicensed radio frequency spectrum band. The timeline 800 may include a base station 205-f and a UE 215-f, which may be examples of the corresponding devices described with reference to FIGS. 1, 2, 3, 4, 5, 6, and 7. Additionally, the active communication beams 820 may be examples of the active communication beams 320, 620, and 720, and the active communication beams 825 may be examples of the active communication beams 325, 625, and 725 described with reference to FIGS. 1, 2, 3, 4, 5, 6, and 7.

As described with reference to FIGS. 3 through 7, a base station 205-f may establish a connection with a UE 215-f. The base station 205-f and/or the UE 215-f may transmit a number of beamformed communication beams 820, 825 in different directions within a coverage area. In some cases, the base station 205-f may transmit a first signal 830 (such as a beam switch signal), to the UE 215-f, that indicates a beam switch occasion for the base station 205-f and the UE 215-f. In some cases, the first signal 830 may be transmitted using the active communication beam 820-a. In some cases, the base station 205-f may transmit the first signal 830 in a MAC layer control element. The UE 215-f may receive the first signal 830 using the active communication beam 825-a, and may decode the first signal 830 to identify the beam switch occasion. The UE 215-f may then perform a contention-based procedure (not shown), and transmit feedback 835 (such as an acknowledgement) based on the outcome of the contention-based procedure. After transmitting the feedback 835, the UE 215-f may perform a beam switch at a time slot which is a predefined time interval 855 after transmitting the feedback 835. According to one example, the UE 215-f may be configured to switch to a new active communication beam 825-c, at least three milliseconds after transmission of the feedback 835. In some examples, the UE 215-f may be configured to switch to a new active communication beam 825-c, more than three milliseconds after transmission of the feedback 835. In some cases, the base station 205-f may receive the feedback 835 and may perform a beam switch at a time slot which is a predefined time interval 870 after receiving the feedback 835. For example, the UE 215-f may be configured to switch to the new active communication beam 825-c and the base station 205-f may be configured to switch to the new active communication beam 820-c, at least three milliseconds after transmission of the feedback 835 for the first signal 830. In some examples, the UE 215-f may be configured to switch to the new active communication beam 825-c and the base station 205-f may be configured to switch to the new active communication beam 820-c, more than three milliseconds after transmission of the feedback 835 for the first signal 830.

In some cases, the base station 205-f and the UE 215-f may be deployed in a high-speed environment. In such cases, the base station 205-f may transmit a second signal 840 identifying the beam switch occasion for the UE 215-f. In some cases, the second signal 840 may be transmitted using the active communication beam 820-b. In some examples, the second signal 840 may be a retransmission of the first signal 830, or may include an indicator of the first signal 830. According to one or more aspects of the present disclosure, the base station 205-f may set a value of an indicator (such as a Reset flag) included in the second signal 840. The UE 215-f may receive the second signal 840 and may determine that another beam switch occasion is to occur at a predefined time interval 865 after transmitting a feedback 845. In some cases, the UE 215-f may determine the beam switch occasion based on the value of the indicator being zero. That is, if the base station 205-f sets the value of the indicator (such as Reset flag) in the second signal 840 to be zero, the UE 215-f may determine that a second beam switch occasion is to occur at a predefined time interval 865 after transmitting the feedback 845. In this example, the UE 215-f may perform a first beam switch after transmitting the feedback 835 for the first signal 830, and may perform a second beam switch after transmitting the feedback 845 for the second signal 840.

Upon receiving the second signal 840, the UE 215-f may transmit the feedback 845 (such as an acknowledgement) for the second signal 840, and may perform the beam switch a predefined time interval 865 after transmitting the feedback 845 of the second signal 840. In some cases, the base station 205-f may receive the feedback 845 and may perform a beam switch at a time slot which is a predefined time interval 860 after receiving the feedback 845. For example, the UE 215-f may be configured to switch to the new active communication beam 825-d and the base station 205-f may be configured to switch to the new active communication beam 820-d, at least three milliseconds after transmission of the feedback 845 for the second signal 840. In some cases, the UE 215-f may be configured to switch to the new active communication beam 825-d and the base station 205-f may be configured to switch to the new active communication beam 820-d, more than three milliseconds after transmission of the feedback 845 for the second signal 840.

Figure 9:
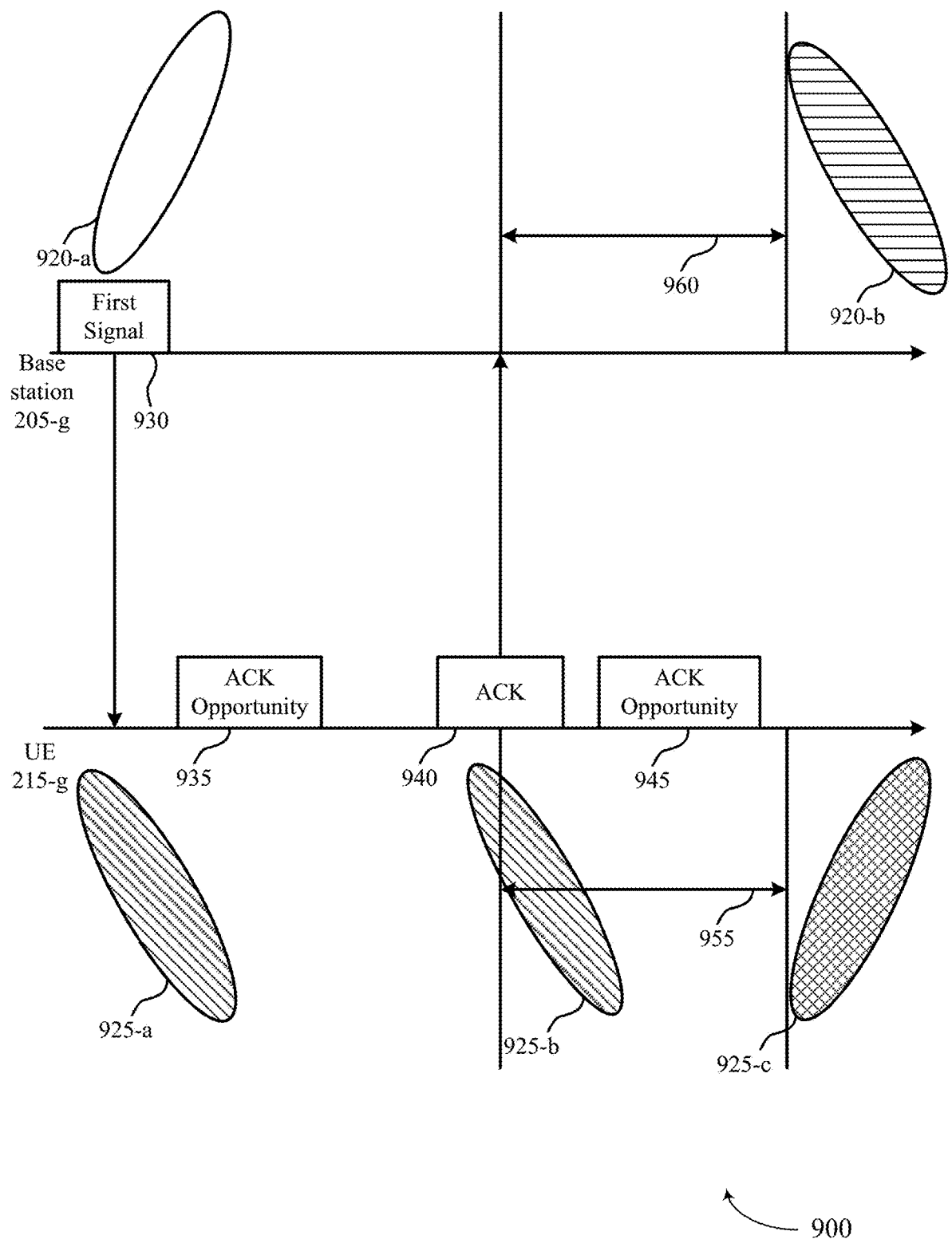
FIG. 9 illustrates an example of a timeline that supports beam switching robustness in unlicensed radio frequency spectrum band in accordance with one or more aspects of the present disclosure.

FIG. 9 illustrates an example of a timeline 900 that supports beam switching robustness in unlicensed radio frequency spectrum band in accordance with one or more aspects of the present disclosure. In some examples, the timeline 900 may implement aspects of the wireless communications systems 100 and 200. The timeline 900 may support handling feedback (acknowledgment/non-acknowledgment) signaling related to a beam switch procedure in an unlicensed radio frequency spectrum band. The timeline 900 may include a base station 205-g and a UE 215-g, which may be examples of the corresponding devices described with reference to FIGS. 1, 2, 3, 4, 5, 6, 7, and 8. Additionally, the active communication beams 920 may be examples of the active communication beams 320, 620, 720, and 820, and the active communication beams 925 may be examples of the active communication beams 325, 625, 725, and 825 described with reference to FIGS. 1, 2, 3, 4, 5, 6, 7, and 8.

According to one or more aspects of the present disclosure, a base station 205-g may configure a UE 215-g with multiple acknowledgement opportunities (such as acknowledgement opportunity 935 and acknowledgement opportunity 945). In some cases, the UE 215-g may be configured with the acknowledgement opportunities during an RRC procedure. The multiple acknowledgement opportunities (such as acknowledgement opportunity 935 and acknowledgement opportunity 945) may provide the UE 215-g with multiple slots to send an acknowledgement message to the base station 205-g. The timeline 900 may illustrate an example situation where the base station 205-g determines to switch a communication beam (such as an active communication beam 925-a) used by the UE 215-g. In some cases, the UE 215-g may receive a first signal 930 identifying a beam switch occasion for the UE 215-*g*, and may perform a contention-based procedure (not shown).

As previously discussed, based on the outcome of the contention-based procedure, the UE 215-*g* may determine whether to transmit feedback to the base station 205-*g*. In some cases, the UE 215-*g* may determine whether the channel is clear for the UE 215-*g* to send an acknowledgement message during a first acknowledgement opportunity 935. If the channel is not clear for transmission, the UE 215-*g* may not gain access to the shared channel during the first acknowledgement opportunity 935. In such cases, the UE 215-*g* may wait for the next available acknowledgement opportunity. The UE 215-*g* may identify an available acknowledgment opportunity from the set of acknowledgment opportunities configured by the base station 205-*g* based on the contention-based procedure. If the outcome of the contention-based procedure indicate that the UE 215-*g* is clear to transmit, the UE 215-*g* may transmit a feedback 940 (such as an acknowledgement), for the first signal 930 using the active communication beam 925-*b*. After transmitting the feedback 940, the UE 215-*g* may perform a beam switch at a time slot which is a predefined time interval 955 after transmitting the feedback 940, and the base station 205-*g* may perform a beam switch at a time slot which is a predefined time interval 960 after receiving the feedback 940. For example, the UE 215-*g* may be configured to switch to the new active communication beam 925-*c* and the base station 205-*g* may be configured to switch to the new active communication beam 920-*b*, three milliseconds after transmission of the acknowledgement feedback 940. In some cases, the UE 215-*g* may be configured to switch to the new active communication beam 925-*c* and the base station 205-*g* may be configured to switch to the new active communication beam 920-*b*, at least three milliseconds after transmission of the acknowledgement feedback 940. In some cases, the UE 215-*g* may be configured to switch to the new active communication beam 925-*c* and the base station 205-*g* may be configured to switch to the new active communication beam 920-*b*, more than three milliseconds after transmission of the acknowledgement feedback 940.

Figure 10:
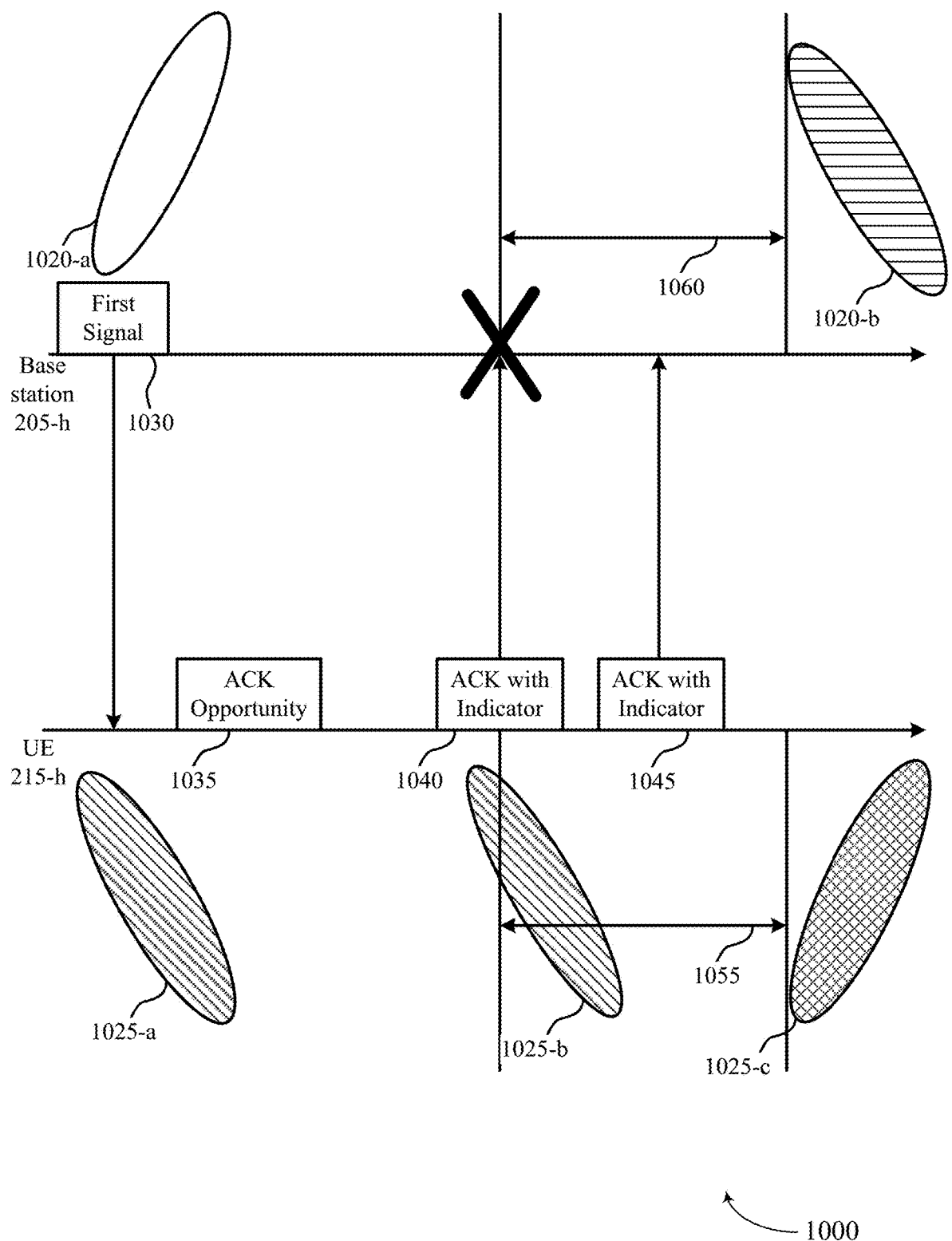
FIG. 10 illustrates an example of a timeline that supports beam switching robustness in unlicensed radio frequency spectrum band in accordance with one or more aspects of the present disclosure.

FIG. 10 illustrates an example of a timeline 1000 that supports beam switching robustness in unlicensed radio frequency spectrum band in accordance with one or more aspects of the present disclosure. In some examples, the timeline 1000 may implement aspects of the wireless communications systems 100 and 200. The timeline 1000 may support handling feedback (acknowledgment/non-acknowledgment) signaling related to a beam switch procedure in an unlicensed radio frequency spectrum band. The timeline 1000 may include a base station 205-*h* and a UE 215-*h*, which may be examples of the corresponding devices described with reference to FIGS. 1, 2, 3, 4, 5, 6, 7, 8, and 9. Additionally, the active communication beams 1020 may be examples of the active communication beams 320, 620, 720, 820, and 920, and the active communication beams 1025 may be examples of the active communication beams 325, 625, 725, 825, and 925 described with reference to FIGS. 1, 2, 3, 4, 5, 6, 7, 8, and 9.

According to one or more aspects of the present disclosure, a base station 205-*h* may configure a UE 215-*h* with multiple acknowledgement opportunities (such as acknowledgement opportunity 1035). In some cases, the UE 215-*h* may be configured with the acknowledgement opportunities during an RRC procedure. As described in FIG. 10, the base station 205-*h* may determine to switch a communication beam (such as an active communication beam 1025-*a*) used by the UE 215-*h*. In some cases, the UE 215-*h* may receive a first signal 1030 identifying a beam switch occasion, and may perform a contention-based procedure (not shown) to determine whether the UE 215-*h* is allowed to transmit feedback for the first signal 1030.

Based on the outcome of the contention-based procedure, the UE 215-*h* may determine whether to transmit a feedback to the base station 205-*h*. In some cases, the UE 215-*h* may determine that the channel is not clear for transmission. In such a case, the UE 215-*h* may not gain access to the shared channel during the first acknowledgement opportunity 1035. The UE 215-*h* may wait for the next available acknowledgement opportunity, and may transmit a feedback 1040 (such as an acknowledgement), for the first signal 1030 using the active communication beam 1025-*b*. According to one or more aspects of the present disclosure, the UE 215-*h* may transmit an indicator along with the acknowledgment in the feedback 1040. For example, the UE 215-*h* may transmit an indicator indicating a slot index of the acknowledgment opportunity. In some cases, the base station 205-*h* may fail to receive the feedback 1040. After transmitting the feedback 1040, the UE 215-*h* may continue to look for additional acknowledgement opportunities. In some cases, upon determining that a channel is free for transmission, the UE 215-*h* may transmit a second feedback 1045. In some cases, the second feedback 1045 may include an acknowledgement and an indicator associated with the feedback 1040. That is, the indicator in the feedback 1045 may indicate the slot index for the acknowledgement transmitted in the feedback 1040.

The base station 205-*h* may receive the feedback 1045 and may determine a timing when the feedback 1045 was transmitted by the UE 215-*h*. In some cases, the base station 205-*h* may determine the timing for the feedback 1040 based on the indicator included in the feedback 1045. The UE 215-*h* may perform a beam switch at a time slot which is a predefined time interval 1055 after transmitting the feedback 1040, and the base station 205-*h* may perform a beam switch at a time slot which is a predefined time interval 1060 after the feedback 1040. For example, the UE 215-*h* may be configured to switch to the new active communication beam 1025-*c* and the base station 205-*h* may be configured to switch to the new active communication beam 1020-*b*.

Figure 11:
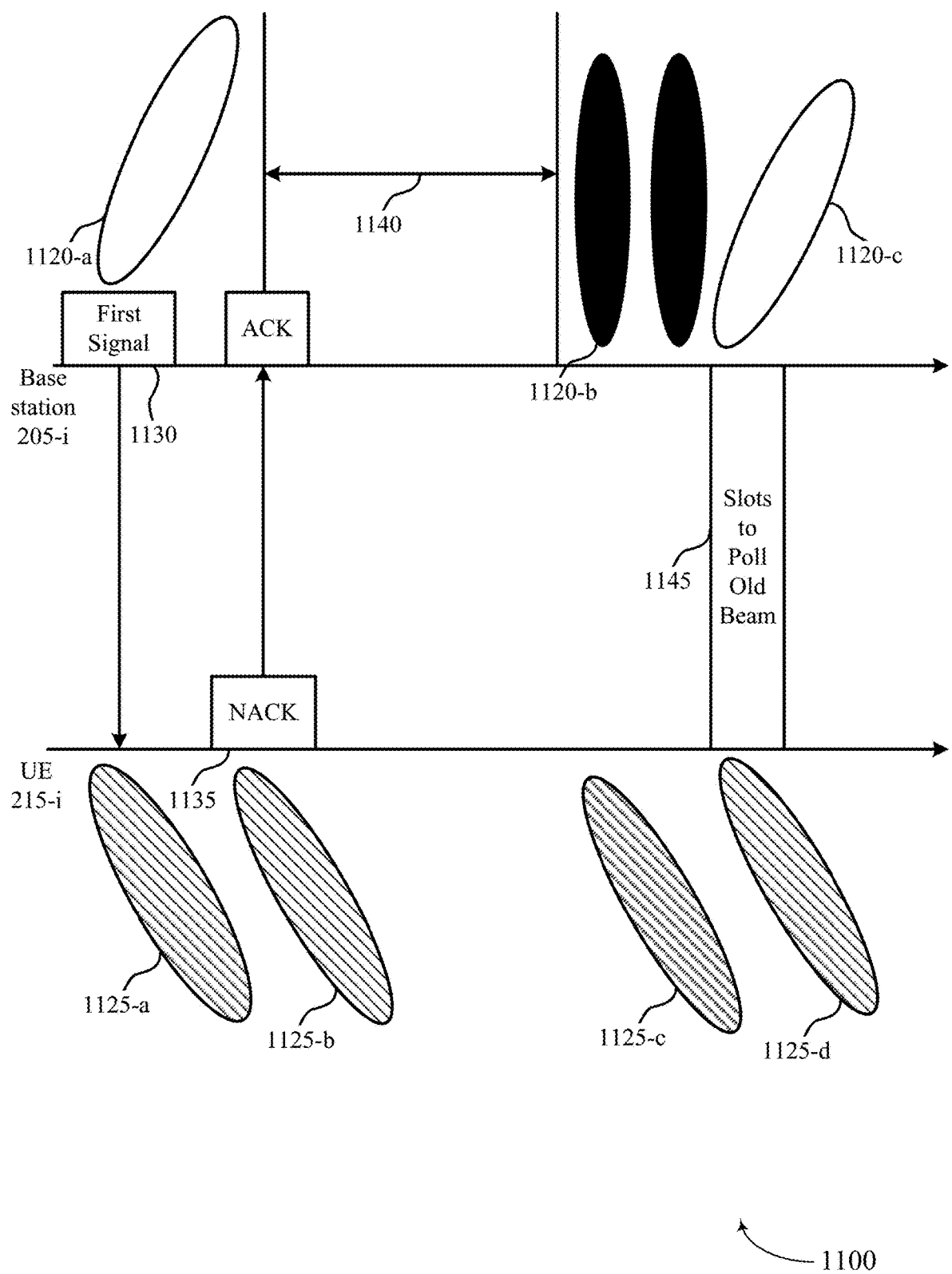
FIG. 11 illustrates an example of a timeline that supports beam switching robustness in unlicensed radio frequency spectrum band in accordance with one or more aspects of the present disclosure.

FIG. 11 illustrates an example of a timeline 1100 that supports beam switching robustness in unlicensed radio frequency spectrum band in accordance with one or more aspects of the present disclosure. In some examples, the timeline 1100 may implement aspects of the wireless communications systems 100 and 200. The timeline 1100 may support handling feedback (acknowledgment/non-acknowledgment) signaling related to a beam switch procedure in an unlicensed radio frequency spectrum band. The timeline 1100 may include a base station 205-*i* and a UE 215-*i*, which may be examples of the corresponding devices described with reference to FIGS. 1, 2, 3, 4, 5, 6, 7, 8, 9, and 10. Additionally, the active communication beams 1120 may be examples of the active communication beams 320, 620, 720, 820, 920, and 1020, and the active communication beams 1125 may be examples of the active communication beams 325, 625, 725, 825, 925, and 1025 described with reference to FIGS. 1, 2, 3, 4, 5, 6, 7, 8, 9, and 10.

According to one or more aspects of the present disclosure, a base station 205-*i* may establish a connection with a UE 215-*i*. For example, the base station 205-*i* and the UE 215-*i* may establish a connecting via RRC, and may transmit a number of beamformed communication beams 1120, 1125 in different directions within a coverage area. In some cases, the base station 205-*i* may determine a beam switch occasion for the UE 215-*i*. The UE 215-*i* may be operating in an unlicensed radio frequency spectrum band. In some cases, the base station 205-*i* may transmit a first signal 1130 (such as a beam switch signal), to the UE 215-*i*, that indicates the beam switch occasion for the base station 205-*i* and the UE 215-*i*. In some cases, the first signal 1130 may be transmitted using the active communication beam 1120-*a*. In some cases, the base station 205-*i* may transmit the first signal 1130 in a MAC layer control element. The UE 215-*i* may receive the first signal 1130 using the active communication beam 1125-*a*, and may attempt to decode the first signal 1130 to identify the beam switch occasion.

In some cases, the UE 215-*i* may fail to decode the first signal 1130. The UE 215-*i* may then perform a contention-based procedure (not shown), and transmit a feedback 1135 (such as a negative acknowledgement) based on the outcome of the contention-based procedure. In some cases, the UE 215-*i* may transmit the feedback 1135 using the active communication beam 1125-*b*. In some cases, the base station 205-*i* may interpret the feedback 1135, as an acknowledgment instead of a negative acknowledgment. In some cases, the base station 205-*i* may perform a beam switch at a time slot which is a predefined time interval 1140 after receiving the feedback 1135 (i.e., based on interpreting the negative acknowledgement as an acknowledgement). The base station 205-*i* may be configured to switch to a new active communication beam 1120-*b*. The UE 215-*i* may not perform a beam switch and may continue to remain in the active communication beam 1125-*c*. In some cases, the base station 205-*i* may be provided with slots 1145 (such as time slots) to poll the previous active communication beam associated with the UE 215-*i*. In the example of FIG. 11, the base station 205-*i* may use the slots 1145 to poll the previous active communication beam 1125-*d* using the communication beam 1120-*c*.

Figure 12:
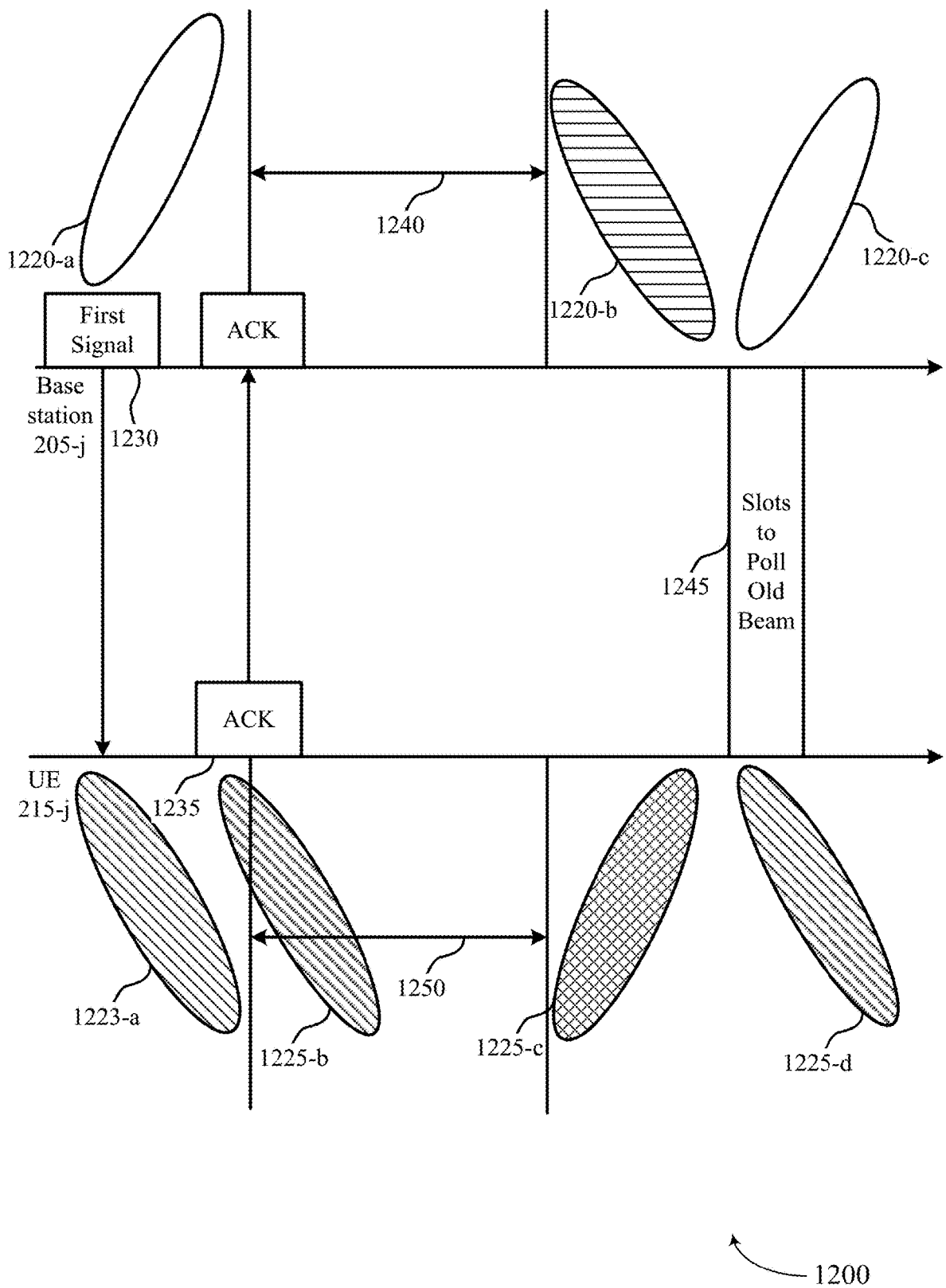
FIG. 12 illustrates an example of a timeline that supports beam switching robustness in unlicensed radio frequency spectrum band in accordance with one or more aspects of the present disclosure.

FIG. 12 illustrates an example of a timeline 1200 that supports beam switching robustness in unlicensed radio frequency spectrum band in accordance with one or more aspects of the present disclosure. In some examples, the timeline 1200 may implement aspects of the wireless communications systems 100 and 200. The timeline 1200 may support handling feedback (acknowledgment/non-acknowledgment) signaling related to a beam switch procedure in an unlicensed radio frequency spectrum band. The timeline 1200 may include a base station 205-*j* and a UE 215-*j*, which may be examples of the corresponding devices described with reference to FIGS. 1, 2, 3, 4, 5, 6, 7, 8, 9, 10, and 11. Additionally, the active communication beams 1220 may be examples of the active communication beams 320, 620, 720, 820, 920, 1020, and 1120, and the active communication beams 1225 may be examples of the active communication beams 325, 625, 725, 825, 925, 1025, and 1125 described with reference to FIGS. 1, 2, 3, 4, 5, 6, 7, 8, 9, 10, and 11.

According to one or more aspects of the present disclosure, a base station 205-*j* may establish a connection (such as an RRC connection) with a UE 215-*j*, and may transmit a number of beamformed communication beams 1220, 1225 in different directions within a coverage area. In some cases, the base station 205-*j* may determine a beam switch occasion for the UE 215-*j*. The base station 205-*j* may transmit a first signal 1230 indicating a beam switch occasion, to the UE 215-*j*. In some cases, the first signal 1230 may be transmitted using the active communication beam 1220-*a*. The UE 215-*j* may receive the first signal 1230 using the active communication beam 1225-*a*, and may attempt to decode the first signal 1230 to identify the beam switch occasion. In some cases, the UE 215-*j* may successfully decode the first signal 1230.

The UE 215-*j* may perform a contention-based procedure, and transmit a feedback 1235 (such as an acknowledgement) based on the outcome of the contention-based procedure. In some cases, the UE 215-*j* may transmit the feedback 1235 using the active communication beam 1225-*b*. In some cases, the base station 205-*j* may receive the feedback 1235. In some cases, the UE 215-*j* may perform a beam switch at a time slot which is a predefined time interval 1250 after receiving the feedback 1235 the base station 205-*j* may perform a beam switch at a time slot which is a predefined time interval 1240 after receiving the feedback 1235. For example, the base station 205-*j* may be configured to switch to a new active communication beam 1220-*b* and the UE 215-*j* may be configured to switch to a new active communication beam 1225-*c*. In some cases, the base station 205-*j* may be provided with slots 1245 to poll the previous active communication beam associated with the UE 215-*j*. In some cases, the slots may be predefined and may be provided by the network. In the example of FIG. 12, the base station 205-*j* may use the slots 1245 to poll the previous active communication beam 1225-*d* using the communication beam 1220-*c*.

Figure 13:
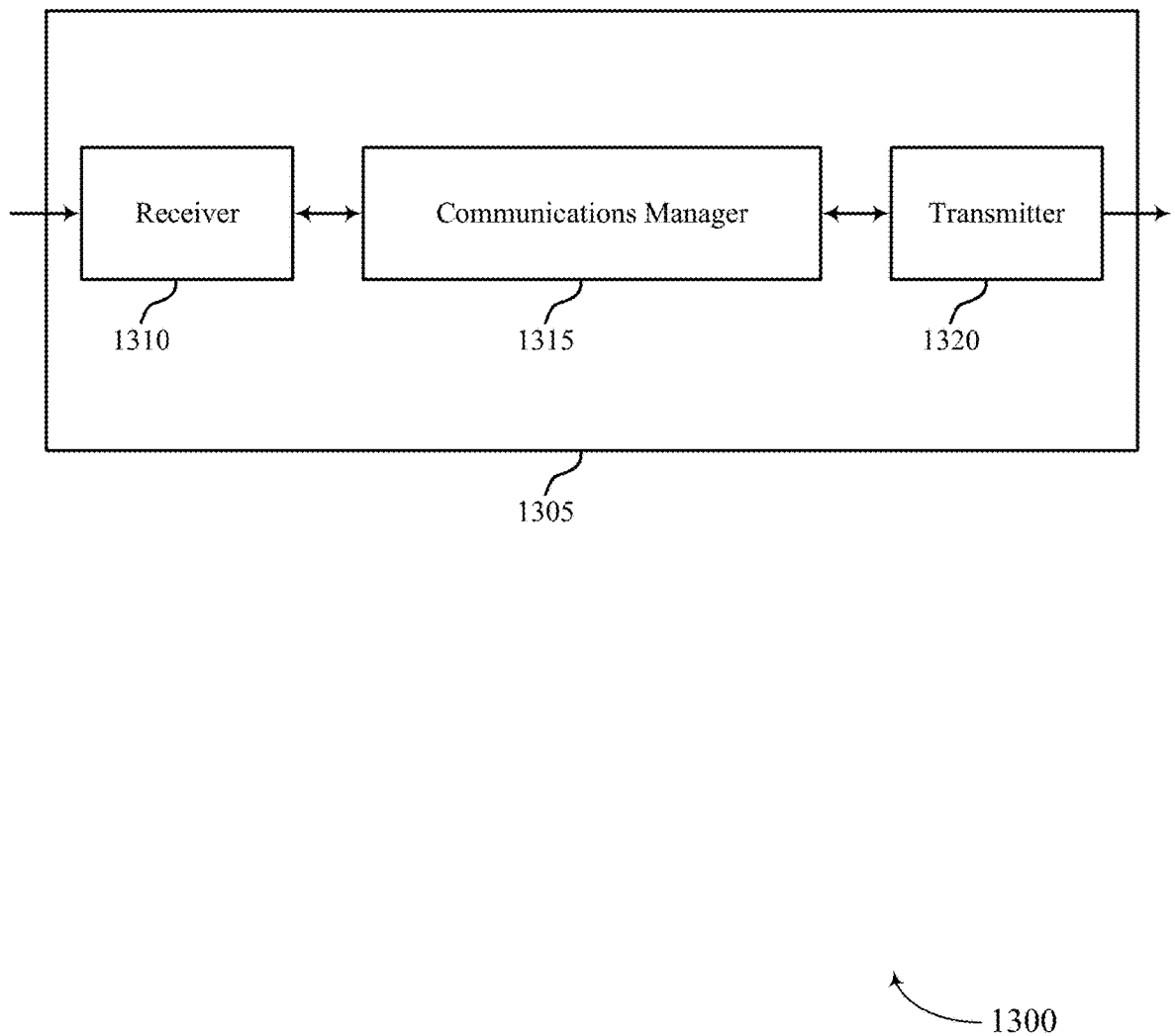
FIGS. 13 and 14 show block diagrams of devices that support beam switching robustness in unlicensed radio frequency spectrum band in accordance with one or more aspects of the present disclosure.

FIG. 13 shows a block diagram 1300 of a device 1305 that supports beam switching robustness in unlicensed radio frequency spectrum band in accordance with one or more aspects of the present disclosure. The device 1305 may be an example of aspects of a UE 115 as described herein. The device 1305 may include a receiver 1310, a communications manager 1315, and a transmitter 1320. The device 1305 may also include a processor. Each of these components may be in communication with one another (e.g., via one or more buses).

The receiver 1310 may receive information such as packets, user data, or control information associated with various information channels (e.g., control channels, data channels, and information related to beam switching robustness in unlicensed radio frequency spectrum band, etc.). Information may be passed on to other components of the device 1305. The receiver 1310 may be an example of aspects of the transceiver 1620 described with reference to FIG. 16. The receiver 1310 may utilize a single antenna or a set of antennas.

The communications manager 1315 may receive a first signal identifying a beam switch occasion for a UE, receive a second signal identifying the beam switch occasion for the UE based on receiving the first signal, transmit a third signal acknowledging the beam switch occasion during an acknowledgment opportunity based on the second signal, and perform a beam switch during the beam switch occasion based on transmitting the third signal. The communications manager 1315 may also receive a first signal identifying a beam switch occasion for a UE, transmit a second signal acknowledging the beam switch occasion during an available acknowledgment opportunity of a set of acknowledgment opportunities, and perform a beam switch during the beam switch occasion based on transmitting the second signal. The communications manager 1315 may be an example of aspects of the communications manager 1610 described herein.

The communications manager 1315, or its sub-components, may be implemented in hardware, code (e.g., software or firmware) executed by a processor, or any combination thereof. If implemented in code executed by a processor, the functions of the communications manager 1315, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 1315, or its sub-components, may be physically located at various positions, including being distributed such that portions of functions are implemented at different physical locations by one or more physical components. In some examples, the communications manager 1315, or its sub-components, may be a separate and distinct component in accordance with one or more aspects of the present disclosure. In some examples, the communications manager 1315, or its sub-components, may be combined with one or more other hardware components, including but not limited to an input/output (I/O) component, a transceiver, a network server, another computing device, one or more other components described in the present disclosure, or a combination thereof in accordance with one or more aspects of the present disclosure. The transmitter 1320 may transmit signals generated by other components of the device 1305. In some examples, the transmitter 1320 may be collocated with a receiver 1310 in a transceiver module. For example, the transmitter 1320 may be an example of aspects of the transceiver 1620 described with reference to FIG. 16. The transmitter 1320 may utilize a single antenna or a set of antennas.

Figure 14:
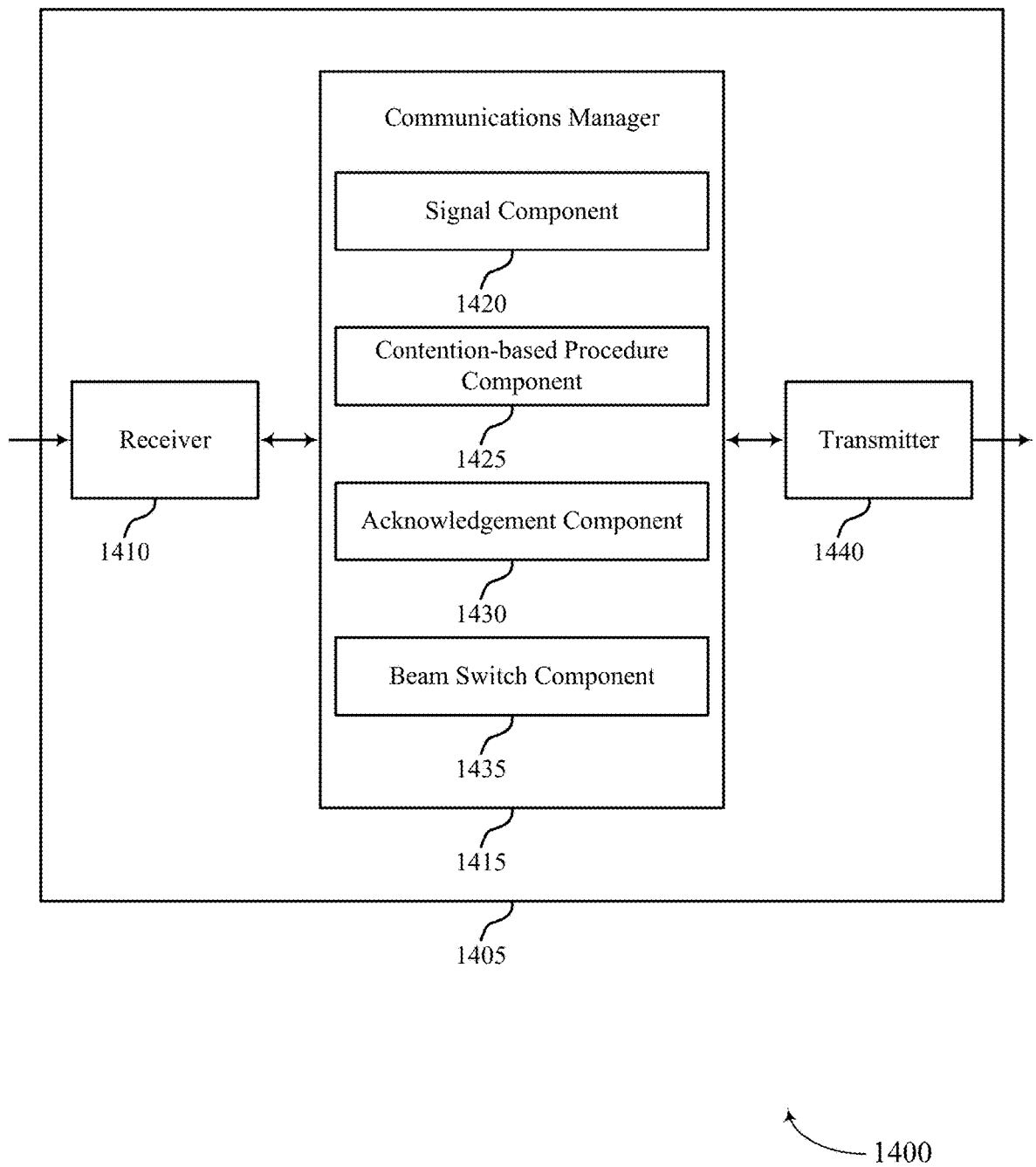

FIG. 14 shows a block diagram 1400 of a device 1405 that supports beam switching robustness in unlicensed radio frequency spectrum band in accordance with one or more aspects of the present disclosure. The device 1405 may be an example of aspects of a device 1305, or a UE 115 as described herein. The device 1405 may include a receiver 1410, a communications manager 1415, and a transmitter 1440. The device 1405 may also include a processor. Each of these components may be in communication with one another (e.g., via one or more buses).

The receiver 1410 may receive information such as packets, user data, or control information associated with various information channels (e.g., control channels, data channels, and information related to beam switching robustness in unlicensed radio frequency spectrum band, etc.). Information may be passed on to other components of the device 1405. The receiver 1410 may be an example of aspects of the transceiver 1620 described with reference to FIG. 16. The receiver 1410 may utilize a single antenna or a set of antennas. The communications manager 1415 may be an example of aspects of the communications manager 1315 as described herein. The communications manager 1415 may include a signal component 1420, a contention-based procedure component 1425, an acknowledgement component 1430, and a beam switch component 1435. The communications manager 1415 may be an example of aspects of the communications manager 1610 described herein.

The signal component 1420 may receive a first signal identifying a beam switch occasion for a UE operating in an unlicensed radio frequency spectrum band and receive a second signal identifying the beam switch occasion for the UE based on an outcome of the contention-based procedure. The contention-based procedure component 1425 may perform a contention-based procedure in response to receiving the first signal. The acknowledgement component 1430 may transmit a third signal acknowledging the beam switch occasion during an acknowledgment opportunity based on the second signal. The beam switch component 1435 may perform a beam switch during the beam switch occasion based on transmitting the third signal.

The signal component 1420 may receive a first signal identifying a beam switch occasion for a UE. The acknowledgement component 1430 may transmit a second signal acknowledging the beam switch occasion during an available acknowledgment opportunity of a set of acknowledgment opportunities. The beam switch component 1435 may perform a beam switch during the beam switch occasion based on transmitting the second signal. The transmitter 1440 may transmit signals generated by other components of the device 1405. In some examples, the transmitter 1440 may be collocated with a receiver 1410 in a transceiver module. For example, the transmitter 1440 may be an example of aspects of the transceiver 1620 described with reference to FIG. 16. The transmitter 1440 may utilize a single antenna or a set of antennas.

Figure 15:
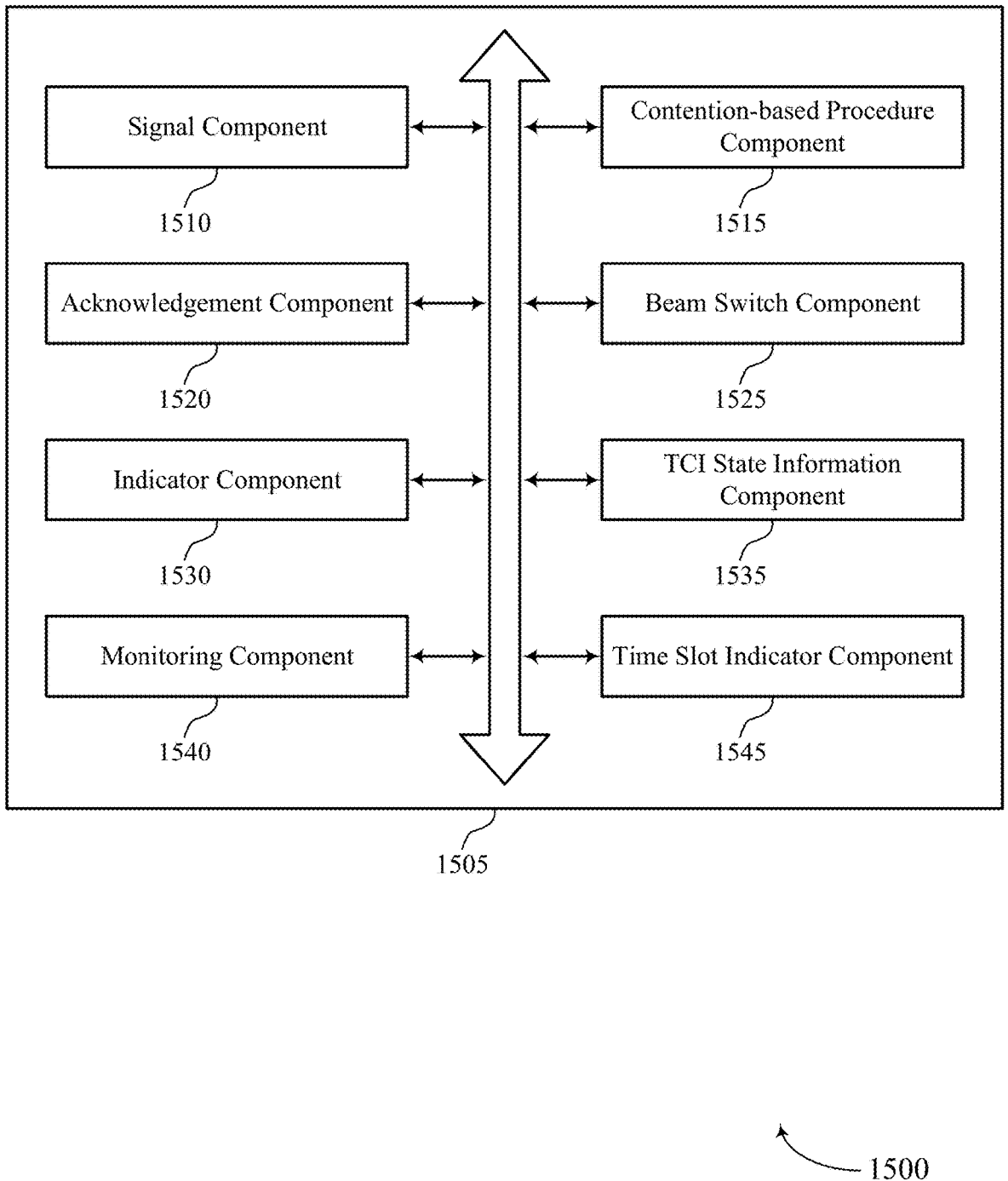
FIG. 15 shows a block diagram of a communications manager that supports beam switching robustness in unlicensed radio frequency spectrum band in accordance with one or more aspects of the present disclosure.

FIG. 15 shows a block diagram 1500 of a communications manager 1505 that supports beam switching robustness in unlicensed radio frequency spectrum band in accordance with one or more aspects of the present disclosure. The communications manager 1505 may be an example of aspects of a communications manager 1315, a communications manager 1415, or a communications manager 1610 described herein. The communications manager 1505 may include a signal component 1510, a contention-based procedure component 1515, an acknowledgement component 1520, a beam switch component 1525, an indicator component 1530, a TCI state information component 1535, a monitoring component 1540, and a time slot indicator component 1545. Each of these modules may communicate, directly or indirectly, with one another (e.g., via one or more buses).

The signal component 1510 may receive a first signal identifying a beam switch occasion for a UE. In some examples, the signal component 1510 may receive a second signal identifying the beam switch occasion for the UE based on receiving the first signal. In some examples, the signal component 1510 may receive a first signal identifying a beam switch occasion for a UE. In some cases, the second signal identifying the beam switch occasion for the UE includes a retransmission of the first signal identifying the beam switch occasion for the UE. In some cases, the second signal identifying the beam switch occasion for the UE includes an indicator associated with the first signal identifying the beam switch occasion for the UE. In some cases, the first signal includes a MAC layer control element.

The contention-based procedure component 1515 may perform a contention-based procedure in response to receiving the first signal. The acknowledgement component 1520 may transmit a third signal acknowledging the beam switch occasion during an acknowledgment opportunity based on the second signal. In some examples, the acknowledgement component 1520 may transmit a second signal acknowledging the beam switch occasion during an available acknowledgment opportunity of a set of acknowledgment opportunities. In some examples, the acknowledgement component 1520 may operate in an unlicensed radio frequency spectrum band, perform a contention-based procedure in response to receiving the first signal, and identify the acknowledgment opportunity based on the outcome of the contention-based procedure, where transmitting the third signal acknowledging the beam switch occasion is based on identifying the acknowledgment opportunity. In some examples, the acknowledgement component 1520 may determine that the UE is not clear to transmit the third signal acknowledging the beam switch occasion during a second acknowledgment opportunity, where the second acknowledgment opportunity occurs prior than the acknowledgment opportunity.

In some examples, the acknowledgement component 1520 may operate in an unlicensed radio frequency spectrum band, perform a contention-based procedure in response to receiving the first signal, and transmit a fourth signal including a negative acknowledgment of the beam switch occasion during a second acknowledgment opportunity based on the first signal and the contention-based procedure, where receiving the second signal is based on transmitting the fourth signal including the negative acknowledgment. In some examples, the acknowledgement component 1520 may operate in an unlicensed radio frequency spectrum band, perform a contention-based procedure in response to receiving the first signal, and transmit a fourth signal acknowledging the beam switch occasion during a second acknowledgment opportunity based on the first signal and the contention-based procedure, where the fourth signal is transmitted prior to receiving the second signal. In some examples, the acknowledgement component 1520 may identify the available acknowledgment opportunity based on the monitoring, where transmitting the second signal acknowledging the beam switch occasion is based on identifying the available acknowledgment opportunity.

In some examples, the acknowledgement component 1520 may determine that the UE is not clear to transmit the second signal acknowledging the beam switch occasion during a first acknowledgment opportunity of the set of acknowledgment opportunities, where the first acknowledgment opportunity occurs prior than the available acknowledgment opportunity. In some examples, the acknowledgement component 1520 may transmit a third signal acknowledging the beam switch occasion during a second available acknowledgment opportunity of the set of acknowledgment opportunities, where the second available acknowledgment opportunity occurs a predefined time interval after the available acknowledgment opportunity.

The beam switch component 1525 may perform a beam switch during the beam switch occasion based on transmitting the third signal. In some examples, the beam switch component 1525 may perform a beam switch during the beam switch occasion based on transmitting the second signal. In some examples, the beam switch component 1525 may perform the beam switch during the beam switch occasion based on transmitting the fourth signal. In some examples, the beam switch component 1525 may determine the beam switch occasion based on a value of the indicator associated with the second signal. In some examples, the beam switch component 1525 may determine that the beam switch occasion is to occur at a predefined time interval after transmitting the fourth signal, based on the value of the indicator associated with the second signal. In some examples, the second signal may be zero.

In some examples, the beam switch component 1525 may determine that the beam switch occasion is to occur at a predefined time interval after transmitting the third signal, based on the value of the indicator associated with the second signal being one. In some cases, the predefined time interval is three milliseconds. In some cases, the predefined time interval is greater than or equal to three milliseconds. In some cases, the beam switch occasion is at least three milliseconds after transmitting the second signal acknowledging the beam switch occasion. The indicator component 1530 may identify an indicator associated with the second signal. The TCI state information component 1535 may receive from a base station, a request for a TCI state information associated with multiple channels. In some examples, the TCI state information component 1535 may transmit a report including the TCI state information to the base station, where performing the beam switch during the beam switch occasion is based on the report. In some examples, transmitting the report includes transmitting the report via a MAC layer control element.

In some examples, the TCI state information component 1535 may receive from a base station, a request for a TCI state information associated with multiple channels. In some examples, the TCI state information component 1535 may transmit a report including the TCI state information to the base station, where performing the beam switch during the beam switch occasion is based on the report. In some examples, transmitting the report includes transmitting the report via a MAC layer control element. In some cases, the TCI state information associated with the multiple channels includes at least one of a TCI state information associated with a CORESET, a TCI state information associated with a PDSCH, a spatial relation information associated with a PUSCH or a PUCCH, or a combination thereof.

The monitoring component 1540 may monitor the unlicensed radio frequency spectrum band using a contention-based procedure. The time slot indicator component 1545 may transmit a time slot indicator associated with the available acknowledgment opportunity, where transmitting the second signal acknowledging the beam switch occasion includes transmitting the time slot indicator. In some examples, transmitting a time slot indicator associated with the available acknowledgment opportunity, where transmitting the third signal acknowledging the beam switch occasion includes transmitting the time slot indicator.

Figure 16:
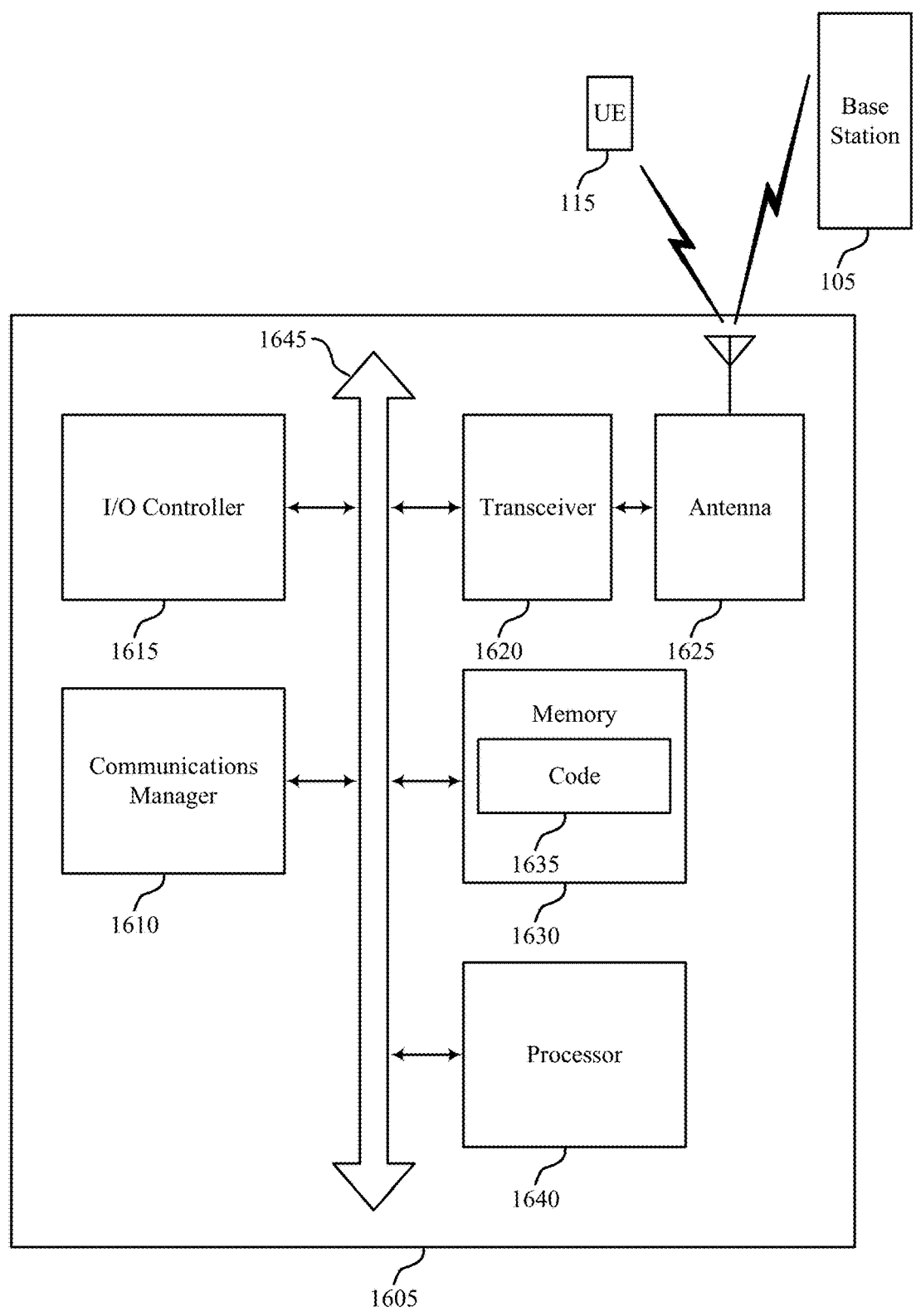
FIG. 16 shows a diagram of a system including a device that supports beam switching robustness in unlicensed radio frequency spectrum band in accordance with one or more aspects of the present disclosure.

FIG. 16 shows a diagram of a system 1600 including a device 1605 that supports beam switching robustness in unlicensed radio frequency spectrum band in accordance with one or more aspects of the present disclosure. The device 1605 may be an example of or include the components of device 1305, device 1405, or a UE 115 as described herein. The device 1605 may include components for bi-directional voice and data communications including components for transmitting and receiving communications, including a communications manager 1610, an I/O controller 1615, a transceiver 1620, an antenna 1625, memory 1630, and a processor 1640. These components may be in electronic communication via one or more buses (e.g., bus 1645).

The communications manager 1610 may receive a first signal identifying a beam switch occasion for a UE, receive a second signal identifying the beam switch occasion for the UE based on receiving the first signal, transmit a third signal acknowledging the beam switch occasion during an acknowledgment opportunity based on the second signal, and perform a beam switch during the beam switch occasion based on transmitting the third signal. The communications manager 1610 may also receive a first signal identifying a beam switch occasion for a UE operating in an unlicensed radio frequency spectrum band, transmit a second signal acknowledging the beam switch occasion during an available acknowledgment opportunity of a set of acknowledgment opportunities, and perform a beam switch during the beam switch occasion based on transmitting the second signal.

The I/O controller 1615 may manage input and output signals for the device 1605. The I/O controller 1615 may also manage peripherals not integrated into the device 1605. In some cases, the I/O controller 1615 may represent a physical connection or port to an external peripheral. In some cases, the I/O controller 1615 may utilize an operating system such as iOS®, ANDROID®, MS-DOS®, MS-WINDOWS®, OS/2®, UNIX®, LINUX®, or another known operating system. In other cases, the I/O controller 1615 may represent or interact with a modem, a keyboard, a mouse, a touchscreen, or a similar device. In some cases, the I/O controller 1615 may be implemented as part of a processor. In some cases, a user may interact with the device 1605 via the I/O controller 1615 or via hardware components controlled by the I/O controller 1615.

The transceiver 1620 may communicate bi-directionally, via one or more antennas, wired, or wireless links as described herein. For example, the transceiver 1620 may represent a wireless transceiver and may communicate bi-directionally with another wireless transceiver. The transceiver 1620 may also include a modem to modulate the packets and provide the modulated packets to the antennas for transmission, and to demodulate packets received from the antennas. In some cases, the wireless device may include a single antenna 1625. However, in some cases the device may have more than one antenna 1625, which may be capable of concurrently transmitting or receiving multiple wireless transmissions.

The memory 1630 may include random-access memory (RAM) and read-only memory (ROM). The memory 1630 may store computer-readable, computer-executable code 1635 including instructions that, when executed, cause the processor to perform various functions described herein. In some cases, the memory 1630 may contain, among other things, a basic input/output system (BIOS) which may control basic hardware or software operation such as the interaction with peripheral components or devices. The processor 1640 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In other cases, a memory controller may be integrated into the processor 1640. The processor 1640 may be configured to execute computer-readable instructions stored in a memory (e.g., the memory 1630) to cause the device 1605 to perform various functions (e.g., functions or tasks supporting beam switching robustness in unlicensed radio frequency spectrum band).

The code 1635 may include instructions to implement aspects of the present disclosure, including instructions to support wireless communications. The code 1635 may be stored in a non-transitory computer-readable medium such as system memory or other type of memory. In some cases, the code 1635 may not be directly executable by the processor 1640 but may cause a computer (e.g., when compiled and executed) to perform functions described herein.

Figure 17:
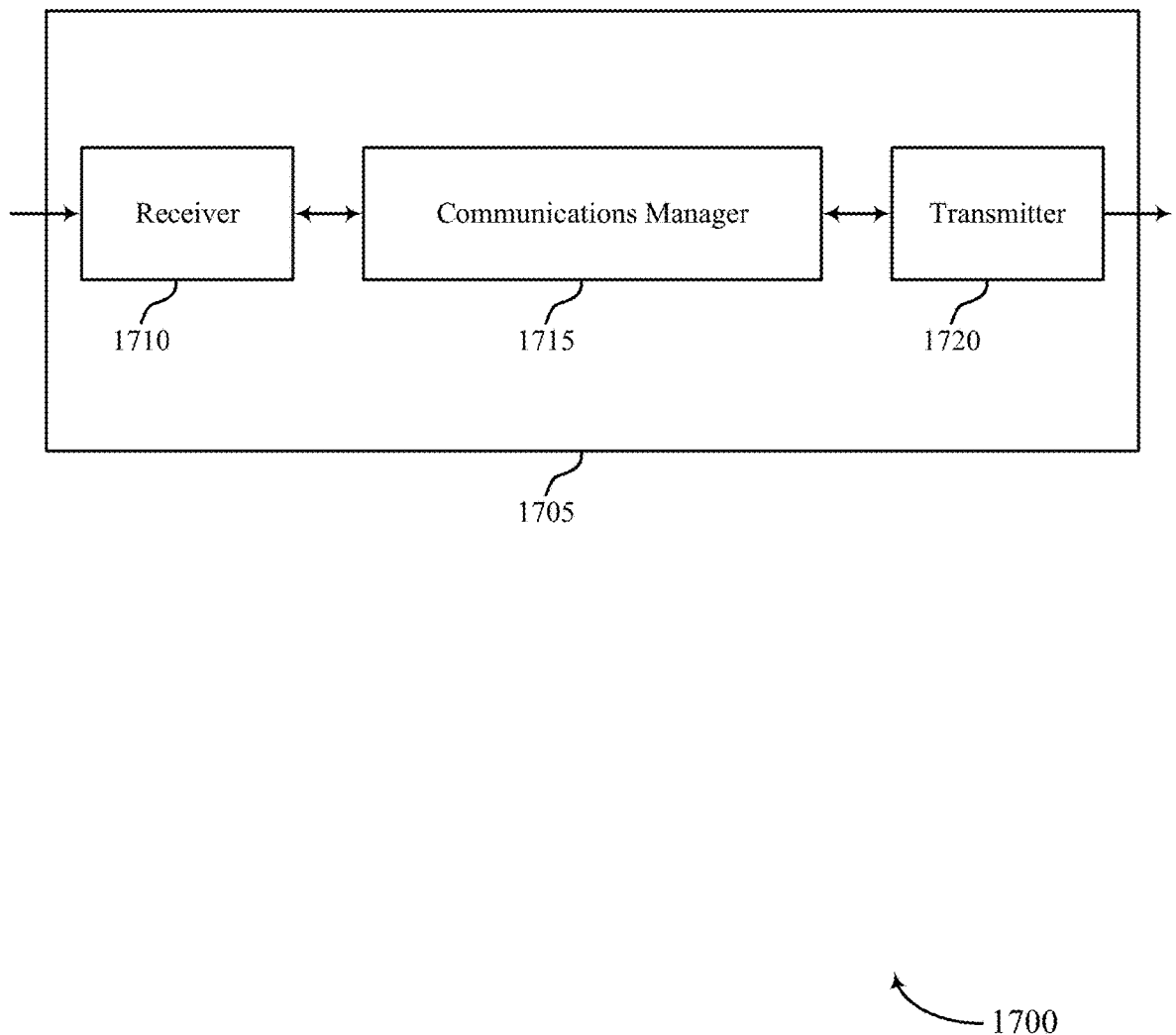
FIGS. 17 and 18 show block diagrams of devices that support beam switching robustness in unlicensed radio frequency spectrum band in accordance with one or more aspects of the present disclosure.

FIG. 17 shows a block diagram 1700 of a device 1705 that supports beam switching robustness in unlicensed radio frequency spectrum band in accordance with one or more aspects of the present disclosure. The device 1705 may be an example of aspects of a base station 105 as described herein. The device 1705 may include a receiver 1710, a communications manager 1715, and a transmitter 1720. The device 1705 may also include a processor. Each of these components may be in communication with one another (e.g., via one or more buses). The receiver 1710 may receive information such as packets, user data, or control information associated with various information channels (e.g., control channels, data channels, and information related to beam switching robustness in unlicensed radio frequency spectrum band, etc.). Information may be passed on to other components of the device 1705. The receiver 1710 may be an example of aspects of the transceiver 2020 described with reference to FIG. 20. The receiver 1710 may utilize a single antenna or a set of antennas.

The communications manager 1715 may transmit a first signal identifying a beam switch occasion for a UE, transmit a second signal identifying the beam switch occasion for the UE based on transmitting the first signal, receive a third signal acknowledging the beam switch occasion during an acknowledgment opportunity based on the second signal, and perform a beam switch during the beam switch occasion based on receiving the third signal. The communications manager 1715 may also configure a set of acknowledgment opportunities for a UE operating in an unlicensed radio frequency spectrum band, transmit a first signal identifying a beam switch occasion for the UE, receive a second signal acknowledging the beam switch occasion during an available acknowledgment opportunity of the configured set of acknowledgment opportunities, and perform a beam switch during the beam switch occasion based on receiving the second signal. The communications manager 1715 may be an example of aspects of the communications manager 2010 described herein.

The communications manager 1715, or its sub-components, may be implemented in hardware, code (e.g., software or firmware) executed by a processor, or any combination thereof. If implemented in code executed by a processor, the functions of the communications manager 1715, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1715, or its sub-components, may be physically located at various positions, including being distributed such that portions of functions are implemented at different physical locations by one or more physical components. In some examples, the communications manager 1715, or its sub-components, may be a separate and distinct component in accordance with one or more aspects of the present disclosure. In some examples, the communications manager 1715, or its sub-components, may be combined with one or more other hardware components, including but not limited to an input/output (I/O) component, a transceiver, a network server, another computing device, one or more other components described in the present disclosure, or a combination thereof in accordance with one or more aspects of the present disclosure. The transmitter 1720 may transmit signals generated by other components of the device 1705. In some examples, the transmitter 1720 may be collocated with a receiver 1710 in a transceiver module. For example, the transmitter 1720 may be an example of aspects of the transceiver 2020 described with reference to FIG. 20. The transmitter 1720 may utilize a single antenna or a set of antennas.

Figure 18:
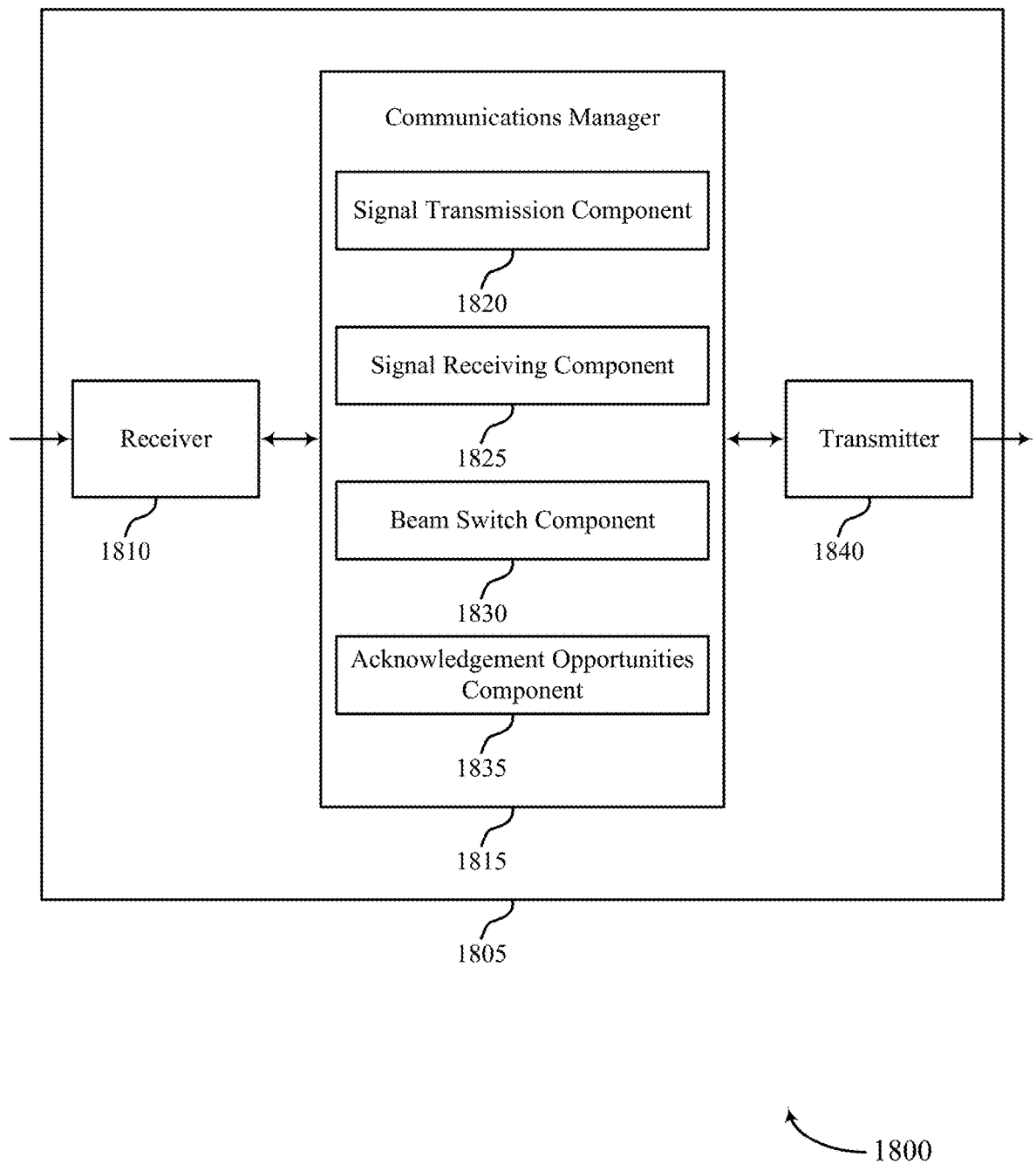

FIG. 18 shows a block diagram 1800 of a device 1805 that supports beam switching robustness in unlicensed radio frequency spectrum band in accordance with one or more aspects of the present disclosure. The device 1805 may be an example of aspects of a device 1705, or a base station 105 as described herein. The device 1805 may include a receiver 1810, a communications manager 1815, and a transmitter 1840. The device 1805 may also include a processor. Each of these components may be in communication with one another (e.g., via one or more buses).

The receiver 1810 may receive information such as packets, user data, or control information associated with various information channels (e.g., control channels, data channels, and information related to beam switching robustness in unlicensed radio frequency spectrum band, etc.). Information may be passed on to other components of the device 1805. The receiver 1810 may be an example of aspects of the transceiver 2020 described with reference to FIG. 20. The receiver 1810 may utilize a single antenna or a set of antennas. The communications manager 1815 may be an example of aspects of the communications manager 1715 as described herein. The communications manager 1815 may include a signal transmission component 1820, a signal receiving component 1825, a beam switch component 1830, and an acknowledgement opportunities component 1835. The communications manager 1815 may be an example of aspects of the communications manager 2010 described herein.

The signal transmission component 1820 may transmit a first signal identifying a beam switch occasion for a UE and transmit a second signal identifying the beam switch occasion for the UE based on transmitting the first signal. The signal receiving component 1825 may receive a third signal acknowledging the beam switch occasion during an acknowledgment opportunity based on the second signal. The beam switch component 1830 may perform a beam switch during the beam switch occasion based on receiving the third signal. The acknowledgement opportunities component 1835 may configure a set of acknowledgment opportunities for a UE operating in an unlicensed radio frequency spectrum band. The signal transmission component 1820 may transmit a first signal identifying a beam switch occasion for the UE.

The signal receiving component 1825 may receive a second signal acknowledging the beam switch occasion during an available acknowledgment opportunity of the configured set of acknowledgment opportunities. The beam switch component 1830 may perform a beam switch during the beam switch occasion based on receiving the second signal. The transmitter 1840 may transmit signals generated by other components of the device 1805. In some examples, the transmitter 1840 may be collocated with a receiver 1810 in a transceiver module. For example, the transmitter 1840 may be an example of aspects of the transceiver 2020 described with reference to FIG. 20. The transmitter 1840 may utilize a single antenna or a set of antennas.

Figure 19:
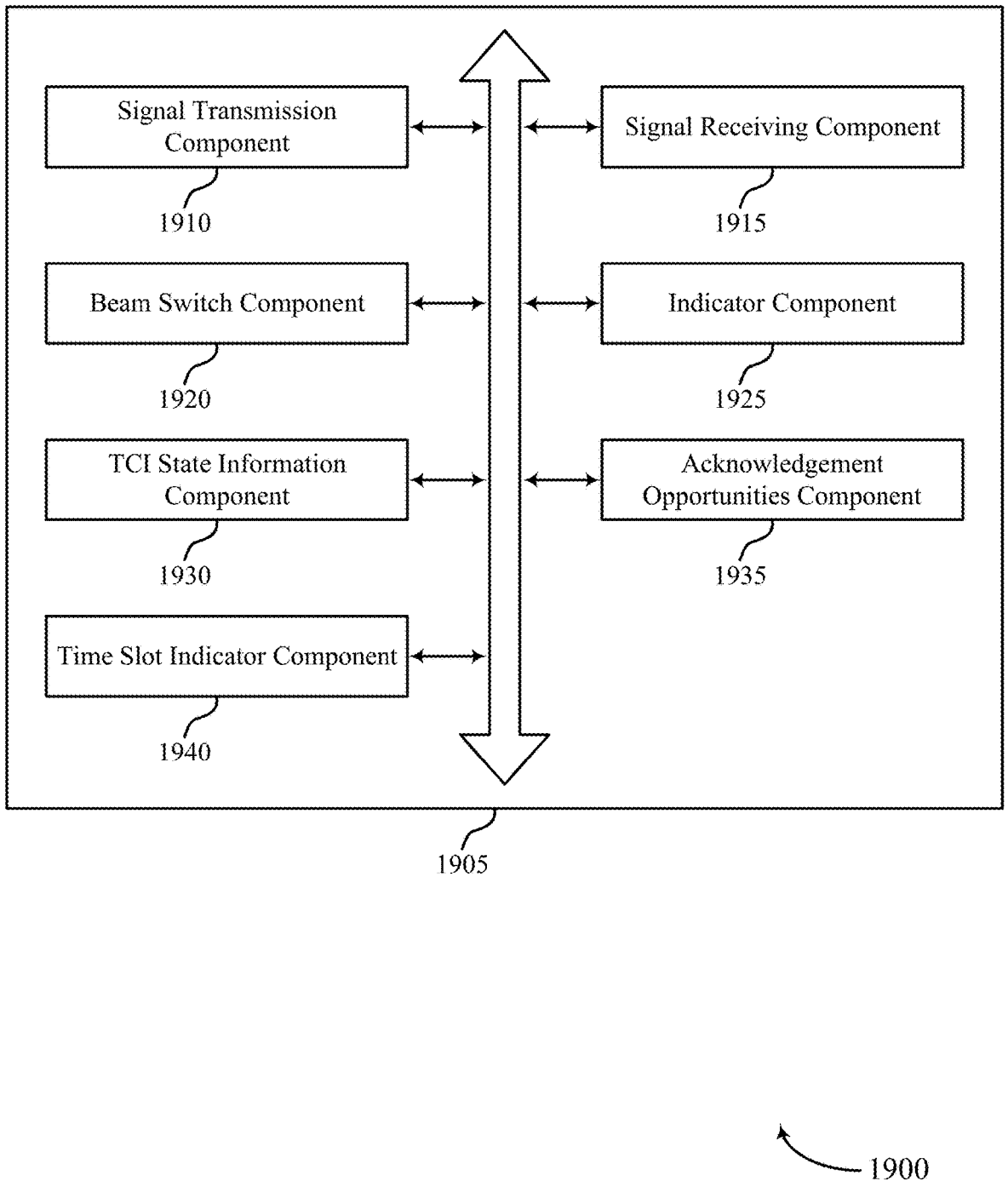
FIG. 19 shows a block diagram of a communications manager that supports beam switching robustness in unlicensed radio frequency spectrum band in accordance with one or more aspects of the present disclosure.

FIG. 19 shows a block diagram 1900 of a communications manager 1905 that supports beam switching robustness in unlicensed radio frequency spectrum band in accordance with one or more aspects of the present disclosure. The communications manager 1905 may be an example of aspects of a communications manager 1715, a communications manager 1815, or a communications manager 2010 described herein. The communications manager 1905 may include a signal transmission component 1910, a signal receiving component 1915, a beam switch component 1920, an indicator component 1925, a TCI state information component 1930, an acknowledgement opportunities component 1935, and a time slot indicator component 1940. Each of these modules may communicate, directly or indirectly, with one another (e.g., via one or more buses).

The signal transmission component 1910 may transmit a first signal identifying a beam switch occasion for a UE. In some examples, the signal transmission component 1910 may transmit a second signal identifying the beam switch occasion for the UE based on transmitting the first signal. In some examples, the signal transmission component 1910 may transmit a first signal identifying a beam switch occasion for the UE. In some cases, the second signal identifying the beam switch occasion for the UE includes a retransmission of the first signal identifying the beam switch occasion for the UE. In some cases, the second signal identifying the beam switch occasion for the UE includes an indicator associated with the first signal identifying the beam switch occasion for the UE. In some cases, the first signal includes a MAC layer control element.

The signal receiving component 1915 may receive a third signal acknowledging the beam switch occasion during an acknowledgment opportunity based on the second signal. In some examples, the signal receiving component 1915 may receive a second signal acknowledging the beam switch occasion during an available acknowledgment opportunity of the configured set of acknowledgment opportunities. In some examples, the signal receiving component 1915 may receive a fourth signal including a negative acknowledgment of the beam switch occasion during a second acknowledgment opportunity based on the first signal and the contention-based procedure, where the fourth signal is received prior to transmitting the second signal.

In some examples, the signal receiving component 1915 may fail to receive a fourth signal acknowledging the beam switch occasion during a second acknowledgment opportunity based on the first signal and the contention-based procedure, where the second acknowledgment opportunity occurs prior to transmitting the second signal. In some examples, the signal receiving component 1915 may receive a third signal acknowledging the beam switch occasion during a second available acknowledgment opportunity of the set of acknowledgment opportunities, where the second available acknowledgment opportunity occurs a predefined time interval after the available acknowledgment opportunity.

In some cases, the acknowledgment opportunity is identified by the UE based on the outcome of the contention-based procedure. In some cases, the beam switch occasion is at least three milliseconds after receiving the third signal acknowledging the beam switch occasion. In some cases, the available acknowledgment opportunity is identified by the UE based on monitoring the unlicensed radio frequency spectrum band using a contention-based procedure. In some cases, the beam switch occasion is at least three milliseconds after receiving the second signal acknowledging the beam switch occasion.

The beam switch component 1920 may perform a beam switch during the beam switch occasion based on receiving the third signal. In some examples, the beam switch component 1920 may perform a beam switch during the beam switch occasion based on receiving the second signal. The acknowledgement opportunities component 1935 may configure a set of acknowledgment opportunities for a UE operating in an unlicensed radio frequency spectrum band. The indicator component 1925 may transmit an indicator associated with the second signal, where the beam switch occasion is based on a value of the indicator associated with the second signal.

The TCI state information component 1930 may transmit to the UE, a request for a TCI state information associated with multiple channels. In some examples, the TCI state information component 1930 may receive from the UE, a report including the TCI state information, where performing the beam switch during the beam switch occasion is based on the report. In some examples, receiving the report includes receiving the report via a MAC layer control element. In some examples, the TCI state information component 1930 may transmit to the UE, a request for a TCI state information associated with multiple channels. In some examples, the TCI state information component 1930 may receive from the UE, a report including the TCI state information, where performing the beam switch during the beam switch occasion is based on the report. In some examples, receiving the report includes receiving the report via a MAC layer control element. In some cases, the TCI state information associated with the multiple channels includes at least one of a TCI state information associated with a CORESET, a TCI state information associated with a PDSCH, a spatial relation information associated with a PUSCH or a PUCCH, or a combination thereof.

The time slot indicator component 1940 may receive a time slot indicator associated with the available acknowledgment opportunity, where receiving the second signal acknowledging the beam switch occasion includes receiving the time slot indicator. In some examples, receiving a time slot indicator associated with the available acknowledgment opportunity, where receiving the third signal acknowledging the beam switch occasion includes receiving the time slot indicator.

Figure 20:
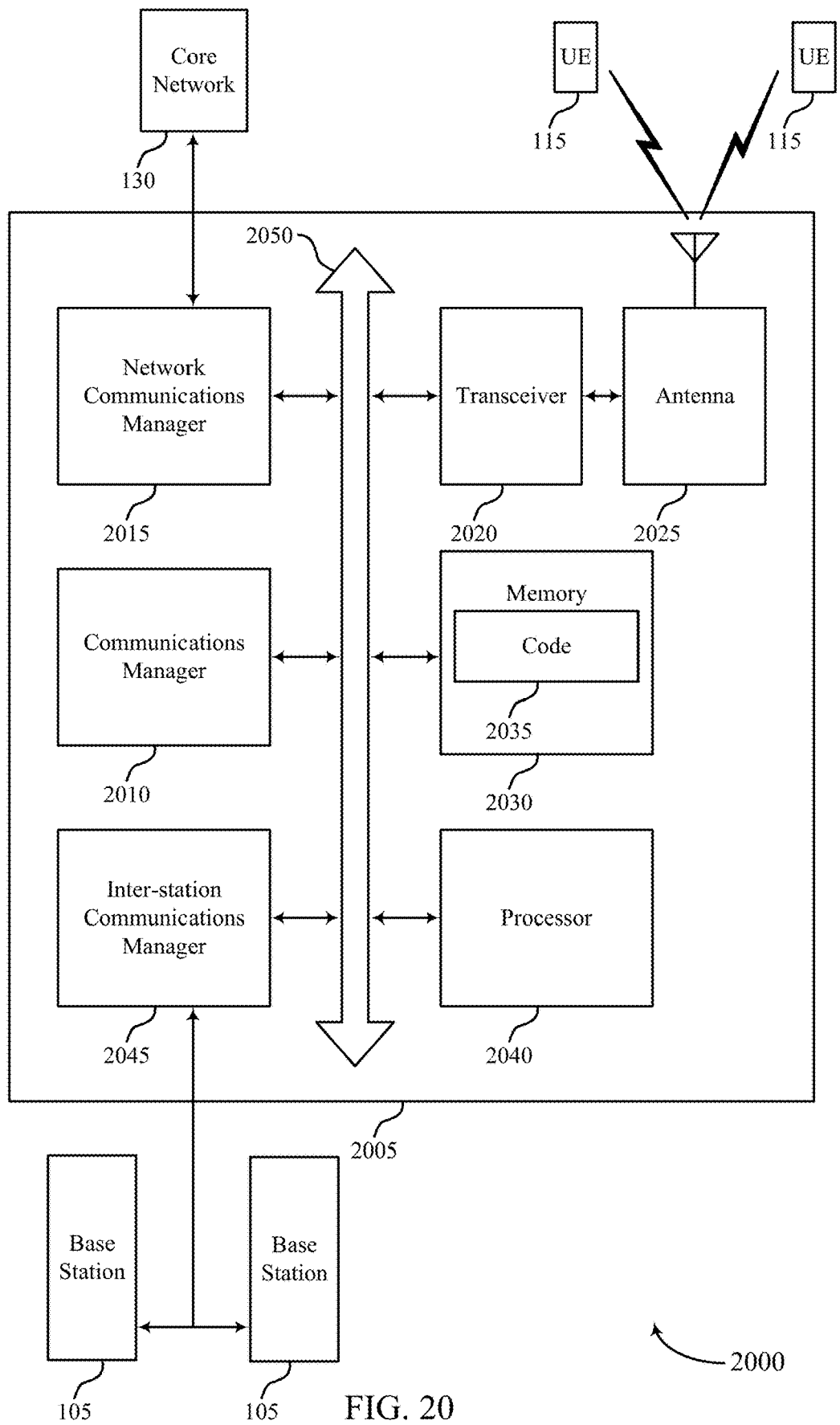
FIG. 20 shows a diagram of a system including a device that supports beam switching robustness in unlicensed radio frequency spectrum band in accordance with one or more aspects of the present disclosure.

FIG. 20 shows a diagram of a system 2000 including a device 2005 that supports beam switching robustness in unlicensed radio frequency spectrum band in accordance with one or more aspects of the present disclosure. The device 2005 may be an example of or include the components of device 1705, device 1805, or a base station 105 as described herein. The device 2005 may include components for bi-directional voice and data communications including components for transmitting and receiving communications, including a communications manager 2010, a network communications manager 2015, a transceiver 2020, an antenna 2025, memory 2030, a processor 2040, and an inter-station communications manager 2045. These components may be in electronic communication via one or more buses (e.g., bus 2050).

The communications manager 2010 may transmit a first signal identifying a beam switch occasion for a UE, transmit a second signal identifying the beam switch occasion for the UE based on transmitting the first signal, receive a third signal acknowledging the beam switch occasion during an acknowledgment opportunity based on the second signal, and perform a beam switch during the beam switch occasion based on receiving the third signal. The communications manager 2010 may also configure a set of acknowledgment opportunities for a UE operating in an unlicensed radio frequency spectrum band, transmit a first signal identifying a beam switch occasion for the UE, receive a second signal acknowledging the beam switch occasion during an available acknowledgment opportunity of the configured set of acknowledgment opportunities, and perform a beam switch during the beam switch occasion based on receiving the second signal.

The network communications manager 2015 may manage communications with the core network (e.g., via one or more wired backhaul links). For example, the network communications manager 2015 may manage the transfer of data communications for client devices, such as one or more UEs 115. The transceiver 2020 may communicate bi-directionally, via one or more antennas, wired, or wireless links as described herein. For example, the transceiver 2020 may represent a wireless transceiver and may communicate bi-directionally with another wireless transceiver. The transceiver 2020 may also include a modem to modulate the packets and provide the modulated packets to the antennas for transmission, and to demodulate packets received from the antennas.

In some cases, the wireless device may include a single antenna 2025. However, in some cases the device may have more than one antenna 2025, which may be capable of concurrently transmitting or receiving multiple wireless transmissions. The memory 2030 may include RAM, ROM, or a combination thereof. The memory 2030 may store computer-readable code 2035 including instructions that, when executed by a processor (e.g., the processor 2040) cause the device to perform various functions described herein. In some cases, the memory 2030 may contain, among other things, a BIOS which may control basic hardware or software operation such as the interaction with peripheral components or devices.

The processor 2040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 2040 may be configured to operate a memory array using a memory controller. In some cases, a memory controller may be integrated into processor 2040. The processor 2040 may be configured to execute computer-readable instructions stored in a memory (e.g., the memory 2030) to cause the device 2005 to perform various functions (e.g., functions or tasks supporting beam switching robustness in unlicensed radio frequency spectrum band).

The inter-station communications manager 2045 may manage communications with other base station 105, and may include a controller or scheduler for controlling communications with UEs 115 in cooperation with other base stations 105. For example, the inter-station communications manager 2045 may coordinate scheduling for transmissions to UEs 115 for various interference mitigation techniques such as beamforming or joint transmission. In some examples, the inter-station communications manager 2045 may provide an X2 interface within an LTE/LTE-A wireless communication network technology to provide communication between base stations 105. The code 2035 may include instructions to implement aspects of the present disclosure, including instructions to support wireless communications. The code 2035 may be stored in a non-transitory computer-readable medium such as system memory or other type of memory. In some cases, the code 2035 may not be directly executable by the processor 2040 but may cause a computer (e.g., when compiled and executed) to perform functions described herein.

Figure 21:
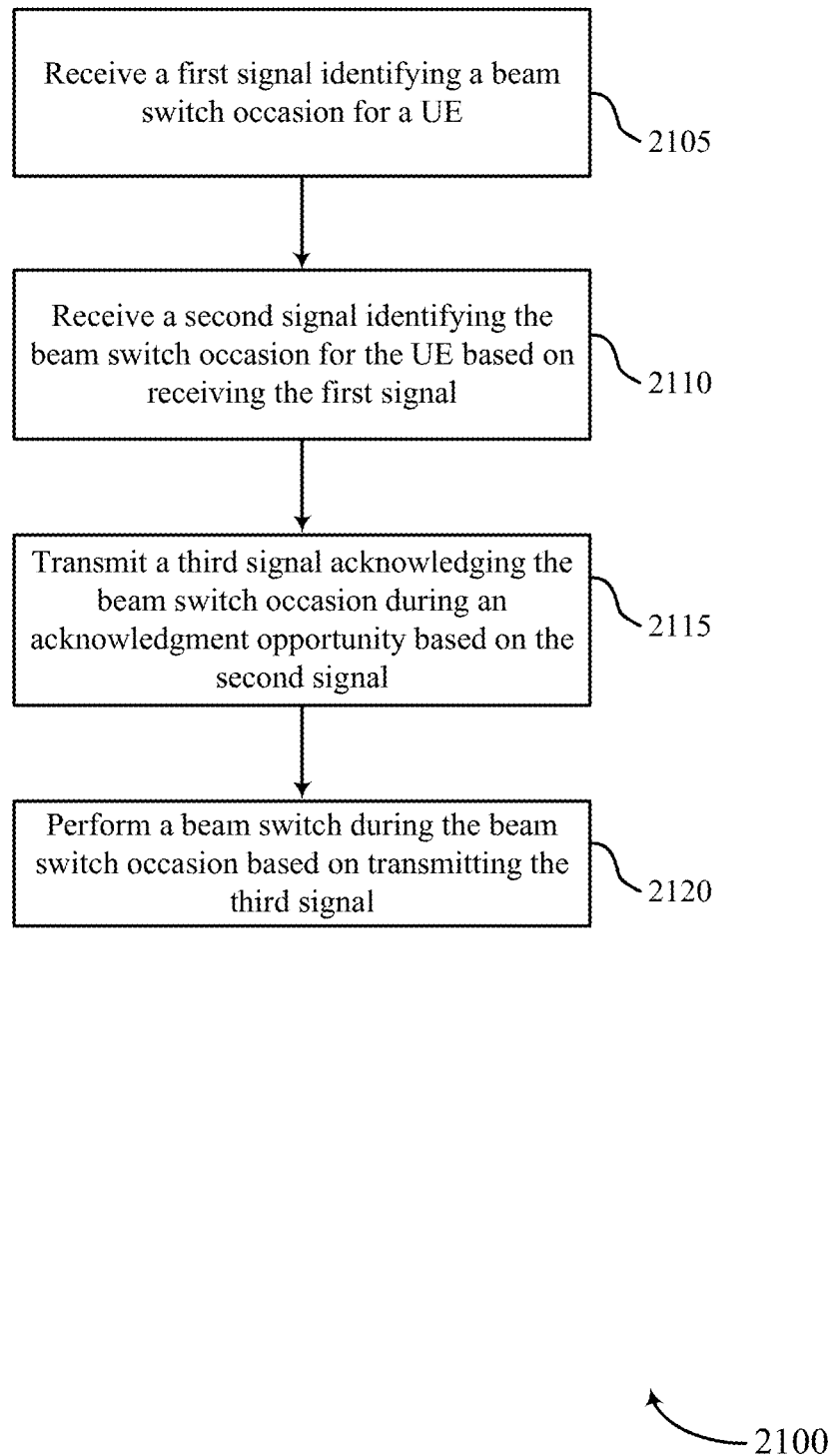
FIGS. 21 through 27 show flowcharts illustrating methods that support beam switching robustness in unlicensed radio frequency spectrum band in accordance with one or more aspects of the present disclosure.

FIG. 21 shows a flowchart illustrating a method 2100 that supports beam switching robustness in unlicensed radio frequency spectrum band in accordance with one or more aspects of the present disclosure. The operations of method 2100 may be implemented by a UE 115 or its components as described herein. For example, the operations of method 2100 may be performed by a communications manager as described with reference to FIGS. 13 through 16. In some examples, a UE may execute a set of instructions to control the functional elements of the UE to perform the functions described herein. Additionally or alternatively, a UE may perform aspects of the functions described herein using special-purpose hardware.

At 2105, the UE may receive a first signal identifying a beam switch occasion for a UE. The operations of 2105 may be performed according to the methods described herein. Additionally or alternatively, the UE may perform a contention-based procedure in response to receiving the first signal. In some examples, aspects of the operations of 2105 may operate in an unlicensed radio frequency spectrum band and/or may be performed by a signal component as described with reference to FIGS. 13 through 16. At 2110, the UE may receive a second signal identifying the beam switch occasion for the UE based on receiving the first signal. Additionally or alternatively, at 2110 the UE may receive a second signal identifying the beam switch occasion for the UE based on an outcome of the contention-based procedure. The operations of 2110 may be performed according to the methods described herein. In some examples, aspects of the operations of 2110 may be performed by a signal component as described with reference to FIGS. 13 through 16.

At 2115, the UE may transmit a third signal acknowledging the beam switch occasion during an acknowledgment opportunity based on the second signal. The operations of 2115 may be performed according to the methods described herein. In some examples, aspects of the operations of 2115 may be performed by an acknowledgement component as described with reference to FIGS. 13 through 16. At 2120, the UE may perform a beam switch during the beam switch occasion based on transmitting the third signal. The operations of 2120 may be performed according to the methods described herein. In some examples, aspects of the operations of 2120 may be performed by a beam switch component as described with reference to FIGS. 13 through 16.

Figure 22:
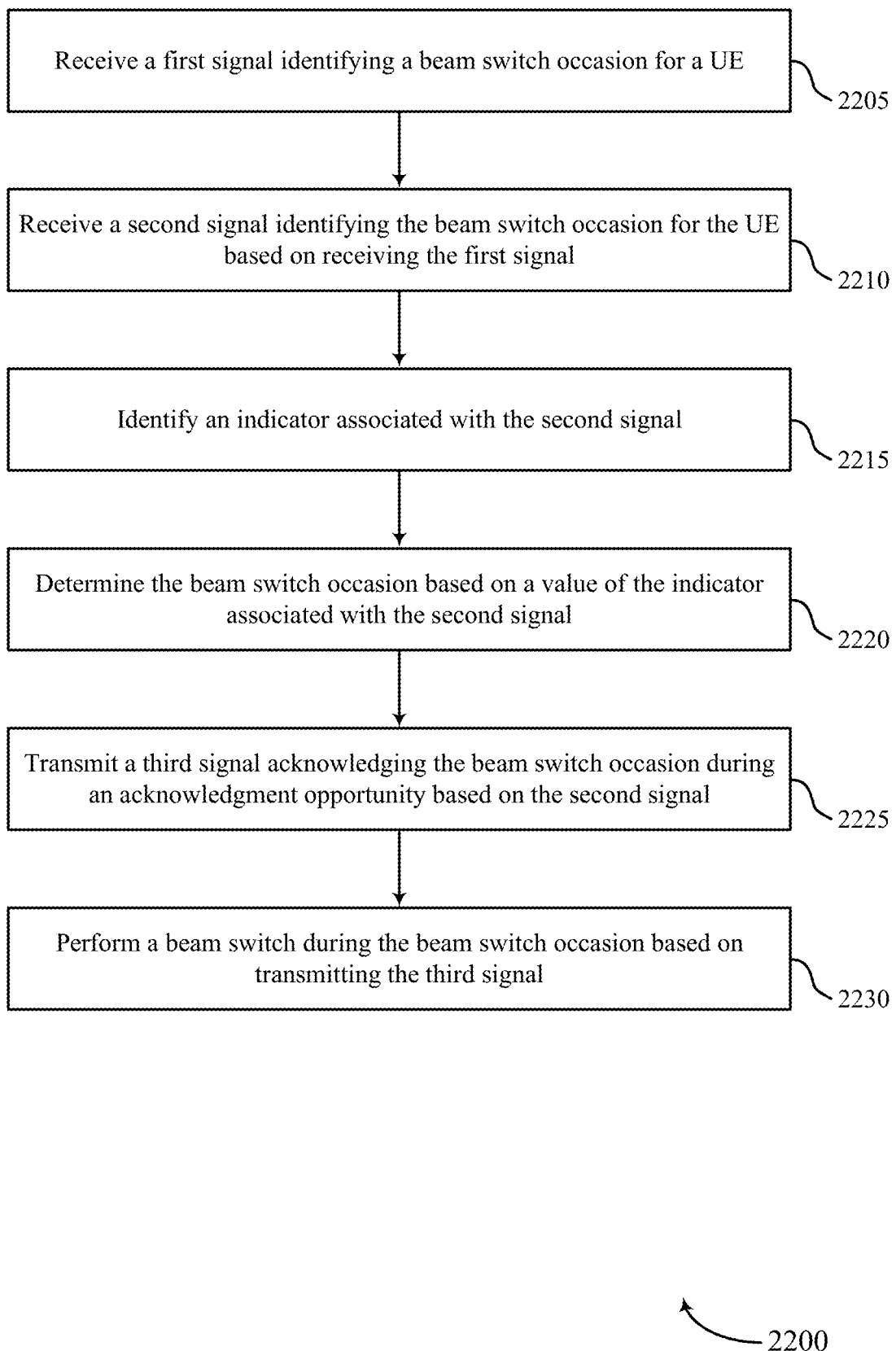

FIG. 22 shows a flowchart illustrating a method 2200 that supports beam switching robustness in unlicensed radio frequency spectrum band in accordance with one or more aspects of the present disclosure. The operations of method 2200 may be implemented by a UE 115 or its components as described herein. For example, the operations of method 2200 may be performed by a communications manager as described with reference to FIGS. 13 through 16. In some examples, a UE may execute a set of instructions to control the functional elements of the UE to perform the functions described herein. Additionally or alternatively, a UE may perform aspects of the functions described herein using special-purpose hardware.

At 2205, the UE may receive a first signal identifying a beam switch occasion for a UE. The operations of 2205 may be performed according to the methods described herein. In some examples, aspects of the operations of 2205 may operate in an unlicensed radio frequency spectrum band and/or may be performed by a signal component as described with reference to FIGS. 13 through 16. Additionally or alternatively, the UE may perform a contention-based procedure in response to receiving the first signal. At 2210, the UE may receive a second signal identifying the beam switch occasion for the UE based on an outcome of the contention-based procedure. The operations of 2210 may be performed according to the methods described herein. In some examples, aspects of the operations of 2210 may be performed by a signal component as described with reference to FIGS. 13 through 16. At 2215, the UE may identify an indicator associated with the second signal. The operations of 2215 may be performed according to the methods described herein. In some examples, aspects of the operations of 2215 may be performed by an indicator component as described with reference to FIGS. 13 through 16.

At 2220, the UE may determine the beam switch occasion based on a value of the indicator associated with the second signal. The operations of 2220 may be performed according to the methods described herein. In some examples, aspects of the operations of 2220 may be performed by a beam switch component as described with reference to FIGS. 13 through 16. At 2225, the UE may transmit a third signal acknowledging the beam switch occasion during an acknowledgment opportunity based on the second signal. The operations of 2225 may be performed according to the methods described herein. In some examples, aspects of the operations of 2225 may be performed by an acknowledgement component as described with reference to FIGS. 13 through 16. At 2230, the UE may perform a beam switch during the beam switch occasion based on transmitting the third signal. The operations of 2230 may be performed according to the methods described herein. In some examples, aspects of the operations of 2230 may be performed by a beam switch component as described with reference to FIGS. 13 through 16.

Figure 23:
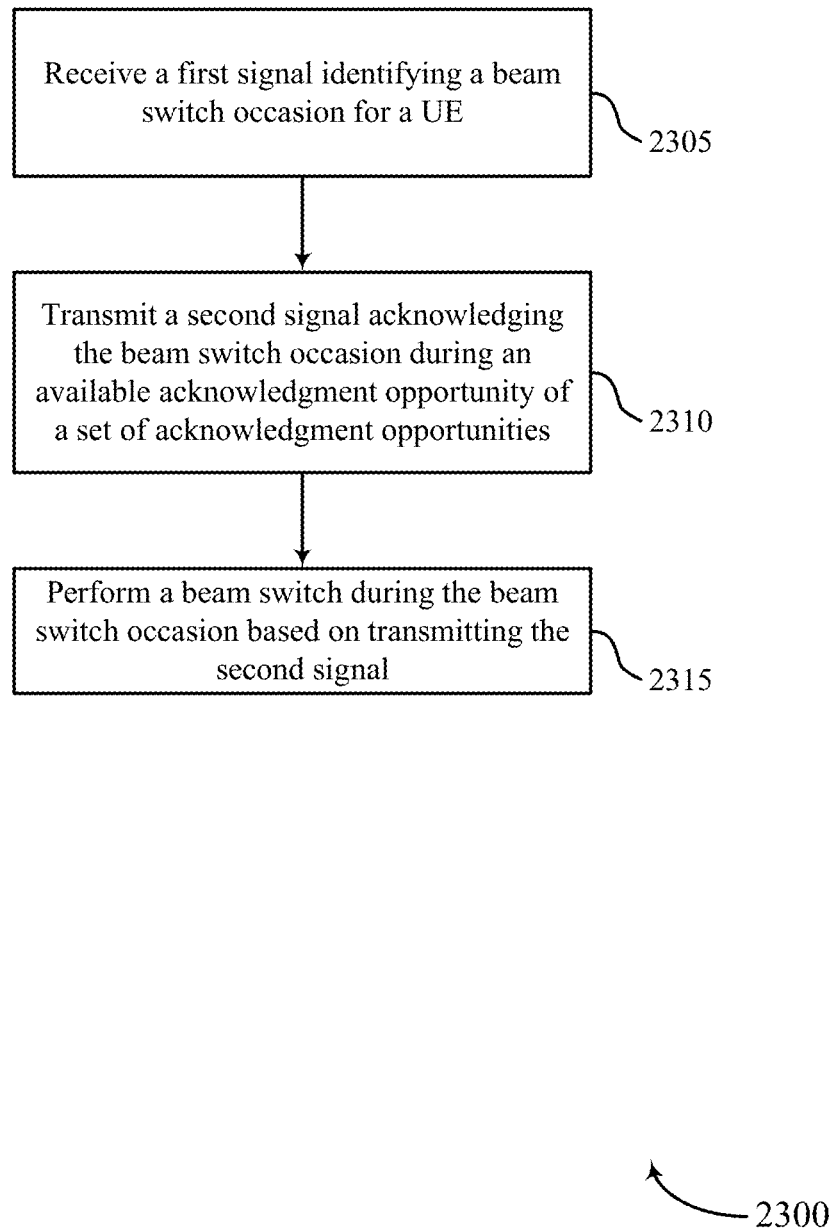

FIG. 23 shows a flowchart illustrating a method 2300 that supports beam switching robustness in unlicensed radio frequency spectrum band in accordance with one or more aspects of the present disclosure. The operations of method 2300 may be implemented by a UE 115 or its components as described herein. For example, the operations of method 2300 may be performed by a communications manager as described with reference to FIGS. 13 through 16. In some examples, a UE may execute a set of instructions to control the functional elements of the UE to perform the functions described herein. Additionally or alternatively, a UE may perform aspects of the functions described herein using special-purpose hardware. At 2305, the UE may receive a first signal identifying a beam switch occasion for a UE. The operations of 2305 may be performed according to the methods described herein. In some examples, aspects of the operations of 2305 may be performed by a signal component as described with reference to FIGS. 13 through 16.

At 2310, the UE may transmit a second signal acknowledging the beam switch occasion during an available acknowledgment opportunity of a set of acknowledgment opportunities. The operations of 2310 may be performed according to the methods described herein. In some examples, aspects of the operations of 2310 may be performed by an acknowledgement component as described with reference to FIGS. 13 through 16. At 2315, the UE may perform a beam switch during the beam switch occasion based on transmitting the second signal. The operations of 2315 may be performed according to the methods described herein. In some examples, aspects of the operations of 2315 may be performed by a beam switch component as described with reference to FIGS. 13 through 16.

Figure 24:
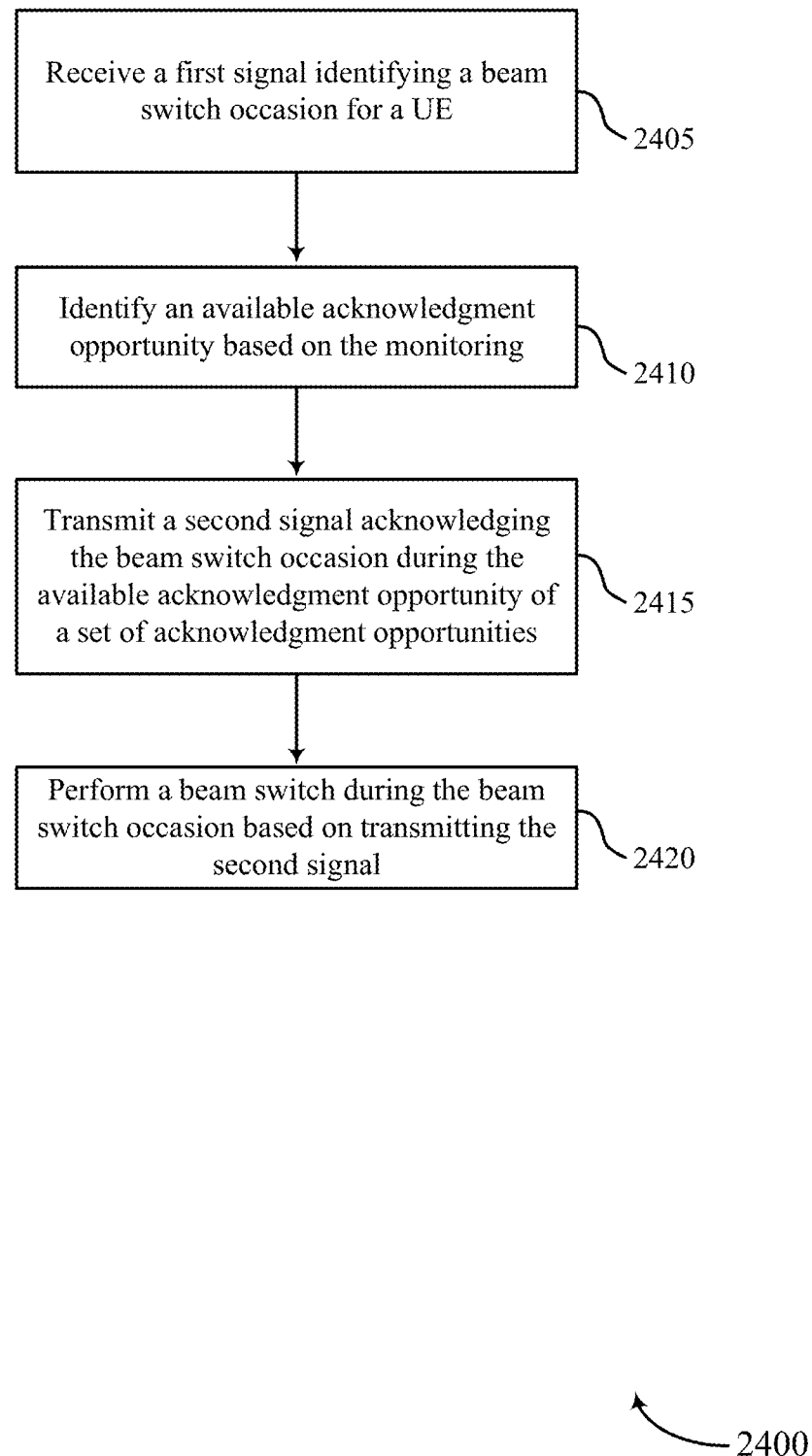

FIG. 24 shows a flowchart illustrating a method 2400 that supports beam switching robustness in unlicensed radio frequency spectrum band in accordance with one or more aspects of the present disclosure. The operations of method 2400 may be implemented by a UE 115 or its components as described herein. For example, the operations of method 2400 may be performed by a communications manager as described with reference to FIGS. 13 through 16. In some examples, a UE may execute a set of instructions to control the functional elements of the UE to perform the functions described herein. Additionally or alternatively, a UE may perform aspects of the functions described herein using special-purpose hardware. At 2405, the UE may receive a first signal identifying a beam switch occasion for a UE. The operations of 2405 may be performed according to the methods described herein. In some examples, aspects of the operations of 2405 may be performed by a signal component as described with reference to FIGS. 13 through 16. Additionally or alternatively, the UE may monitor the unlicensed radio frequency spectrum band using a contention-based procedure by a monitoring component. At 2410, the UE may identify an available acknowledgment opportunity based on the monitoring. The operations of 2410 may be performed according to the methods described herein. In some examples, aspects of the operations of 2410 may be performed by an acknowledgement component as described with reference to FIGS. 13 through 16.

At 2415, the UE may transmit a second signal acknowledging the beam switch occasion during the available acknowledgment opportunity of a set of acknowledgment opportunities. In some cases, transmitting the second signal acknowledging the beam switch occasion is based on identifying the available acknowledgment opportunity. The operations of 2415 may be performed according to the methods described herein. In some examples, aspects of the operations of 2415 may be performed by an acknowledgement component as described with reference to FIGS. 13 through 16. At 2420, the UE may perform a beam switch during the beam switch occasion based on transmitting the second signal. The operations of 2420 may be performed according to the methods described herein. In some examples, aspects of the operations of 2420 may be performed by a beam switch component as described with reference to FIGS. 13 through 16.

Figure 25:
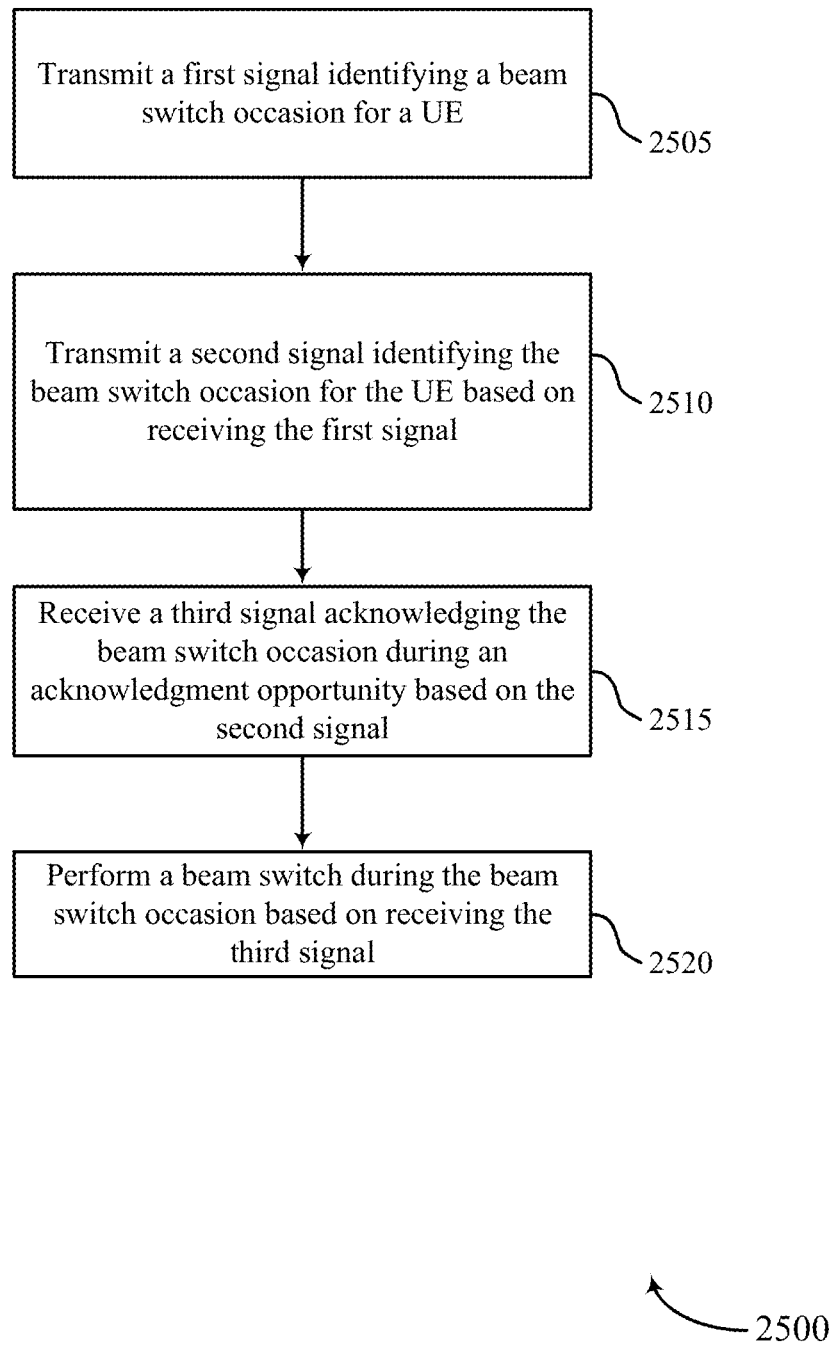

FIG. 25 shows a flowchart illustrating a method 2500 that supports beam switching robustness in unlicensed radio frequency spectrum band in accordance with one or more aspects of the present disclosure. The operations of method 2500 may be implemented by a base station 105 or its components as described herein. For example, the operations of method 2500 may be performed by a communications manager as described with reference to FIGS. 17 through 20. In some examples, a base station may execute a set of instructions to control the functional elements of the base station to perform the functions described herein. Additionally or alternatively, a base station may perform aspects of the functions described herein using special-purpose hardware.

At 2505, the base station may transmit a first signal identifying a beam switch occasion for a UE. The operations of 2505 may be performed according to the methods described herein. In some examples, aspects of the operations of 2505 may be performed by a signal transmission component as described with reference to FIGS. 17 through 20. Additionally or alternatively, the base station may transmit a first signal identifying a beam switch occasion for a UE operating in an unlicensed radio frequency spectrum band. At 2510, the base station may transmit a second signal identifying the beam switch occasion for the UE based on receiving the first signal. Additionally or alternatively, the base station may transmit a second signal identifying the beam switch occasion for the UE based on an outcome of a contention-based procedure. In some cases, the contention-based procedure is performed at the UE based on the first signal. The operations of 2510 may be performed according to the methods described herein. In some examples, aspects of the operations of 2510 may be performed by a signal transmission component as described with reference to FIGS. 17 through 20.

At 2515, the base station may receive a third signal acknowledging the beam switch occasion during an acknowledgment opportunity based on the second signal. The operations of 2515 may be performed according to the methods described herein. In some examples, aspects of the operations of 2515 may be performed by a signal receiving component as described with reference to FIGS. 17 through 20. At 2520, the base station may perform a beam switch during the beam switch occasion based on receiving the third signal. The operations of 2520 may be performed according to the methods described herein. In some examples, aspects of the operations of 2520 may be performed by a beam switch component as described with reference to FIGS. 17 through 20.

Figure 26:
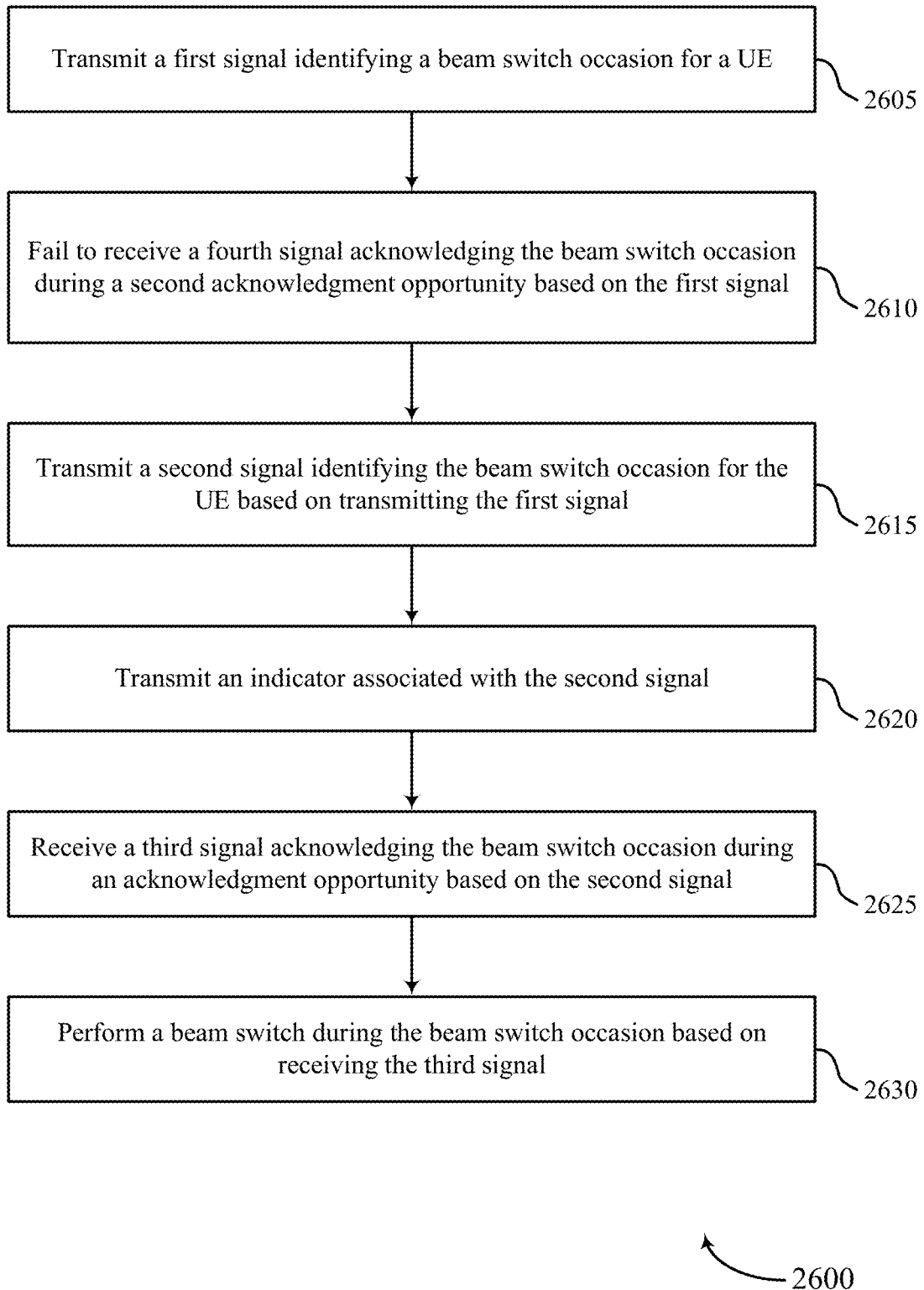

FIG. 26 shows a flowchart illustrating a method 2600 that supports beam switching robustness in unlicensed radio frequency spectrum band in accordance with one or more aspects of the present disclosure. The operations of method 2600 may be implemented by a base station 105 or its components as described herein. For example, the operations of method 2600 may be performed by a communications manager as described with reference to FIGS. 17 through 20. In some examples, a base station may execute a set of instructions to control the functional elements of the base station to perform the functions described herein. Additionally or alternatively, a base station may perform aspects of the functions described herein using special-purpose hardware.

At 2605, the base station may transmit a first signal identifying a beam switch occasion for a UE. Additionally or alternatively, the base station may transmit a first signal identifying a beam switch occasion for a UE operating in an unlicensed radio frequency spectrum band. The operations of 2605 may be performed according to the methods described herein. In some examples, aspects of the operations of 2605 may be performed by a signal transmission component as described with reference to FIGS. 17 through 20. At 2610, the base station may fail to receive a fourth signal acknowledging the beam switch occasion during a second acknowledgment opportunity based on the first signal and the contention-based procedure. In some cases, the second acknowledgment opportunity occurs prior to transmitting the second signal. The operations of 2610 may be performed according to the methods described herein. In some examples, aspects of the operations of 2610 may be performed by a signal receiving component as described with reference to FIGS. 17 through 20.

At 2615, the base station may transmit a second signal identifying the beam switch occasion for the UE based on an outcome of a contention-based procedure. In some cases, the contention-based procedure may be performed at the UE based on the first signal. The operations of 2615 may be performed according to the methods described herein. In some examples, aspects of the operations of 2615 may be performed by a signal transmission component as described with reference to FIGS. 17 through 20. At 2620, the base station may transmit an indicator associated with the second signal. In some cases, the beam switch occasion is based on a value of the indicator associated with the second signal. The operations of 2620 may be performed according to the methods described herein. In some examples, aspects of the operations of 2620 may be performed by an indicator component as described with reference to FIGS. 17 through 20.

At 2625, the base station may receive a third signal acknowledging the beam switch occasion during an acknowledgment opportunity based on the second signal. The operations of 2625 may be performed according to the methods described herein. In some examples, aspects of the operations of 2625 may be performed by a signal receiving component as described with reference to FIGS. 17 through 20. At 2630, the base station may perform a beam switch during the beam switch occasion based on receiving the third signal. The operations of 2630 may be performed according to the methods described herein. In some examples, aspects of the operations of 2630 may be performed by a beam switch component as described with reference to FIGS. 17 through 20.

Figure 27:
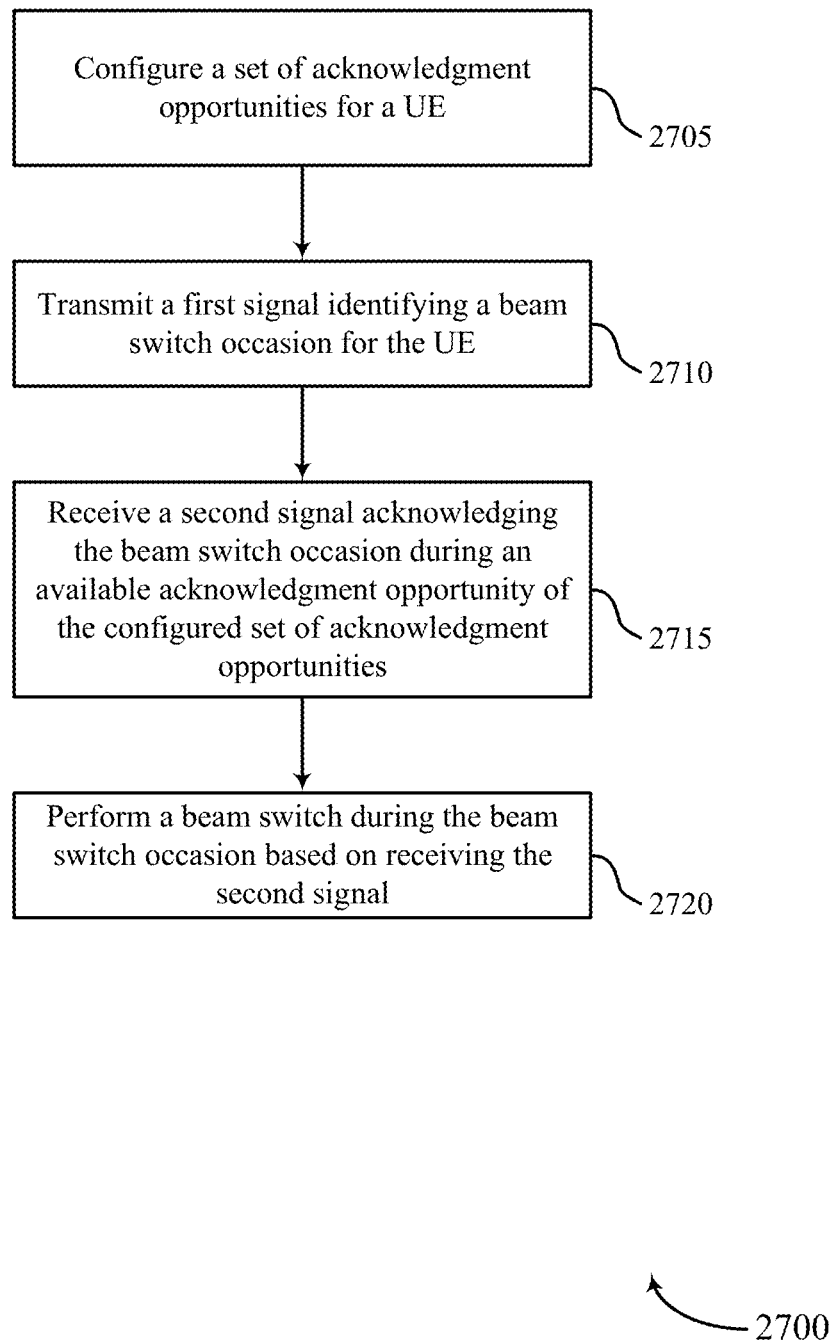

FIG. 27 shows a flowchart illustrating a method 2700 that supports beam switching robustness in unlicensed radio frequency spectrum band in accordance with one or more aspects of the present disclosure. The operations of method 2700 may be implemented by a base station 105 or its components as described herein. For example, the operations of method 2700 may be performed by a communications manager as described with reference to FIGS. 17 through 20. In some examples, a base station may execute a set of instructions to control the functional elements of the base station to perform the functions described herein. Additionally or alternatively, a base station may perform aspects of the functions described herein using special-purpose hardware.

At 2705, the base station may configure a set of acknowledgment opportunities for a UE. Additionally or alternatively, the base station may configure a set of acknowledgment opportunities for the UE operating in an unlicensed radio frequency spectrum band. The operations of 2705 may be performed according to the methods described herein. In some examples, aspects of the operations of 2705 may be performed by an acknowledgement opportunities component as described with reference to FIGS. 17 through 20. At 2710, the base station may transmit a first signal identifying a beam switch occasion for the UE. The operations of 2710 may be performed according to the methods described herein. In some examples, aspects of the operations of 2710 may be performed by a signal transmission component as described with reference to FIGS. 17 through 20.

At 2715, the base station may receive a second signal acknowledging the beam switch occasion during an available acknowledgment opportunity of the configured set of acknowledgment opportunities. The operations of 2715 may be performed according to the methods described herein. In some examples, aspects of the operations of 2715 may be performed by a signal receiving component as described with reference to FIGS. 17 through 20. At 2720, the base station may perform a beam switch during the beam switch occasion based on receiving the second signal. The operations of 2720 may be performed according to the methods described herein. In some examples, aspects of the operations of 2720 may be performed by a beam switch component as described with reference to FIGS. 17 through 20.

It should be noted that the methods described herein describe possible implementations, and that the operations and the operations may be rearranged or otherwise modified and that other implementations are possible. Further, aspects from two or more of the methods may be combined.

Example 1

A method for wireless communication, comprising: receiving a first signal identifying a beam switch occasion for a UE; receiving a second signal identifying the beam switch occasion for the UE based at least in part on receiving the first signal; transmitting a third signal acknowledging the beam switch occasion during an acknowledgment opportunity based at least in part on the second signal; and performing a beam switch during the beam switch occasion based at least in part on transmitting the third signal.

Example 2

The method of example 1, wherein the second signal identifying the beam switch occasion for the UE comprises a retransmission of the first signal identifying the beam switch occasion for the UE.

Example 3

The method of any of examples 1 or 2, wherein the second signal identifying the beam switch occasion for the UE comprises an indicator associated with the first signal identifying the beam switch occasion for the UE.

Example 4

The method of any of examples 1 to 3, further comprising: operating in an unlicensed radio frequency spectrum band; performing a contention-based procedure in response to receiving the first signal; and identifying the acknowledgment opportunity based at least in part on the outcome of the contention-based procedure, wherein transmitting the third signal acknowledging the beam switch occasion is based at least in part on identifying the acknowledgment opportunity.

Example 5

The method of any of example 4, wherein identifying the acknowledgment opportunity further comprises: determining that the UE is not clear to transmit the third signal acknowledging the beam switch occasion during a second acknowledgment opportunity, wherein the second acknowledgment opportunity occurs prior than the acknowledgment opportunity.

Example 6

The method of any of examples 1 to 5, further comprising: operating in an unlicensed radio frequency spectrum band; performing a contention-based procedure in response to receiving the first signal; and transmitting a fourth signal comprising a negative acknowledgment of the beam switch occasion during a second acknowledgment opportunity based at least in part on the first signal and the contention-based procedure, wherein receiving the second signal is based at least in part on transmitting the fourth signal comprising the negative acknowledgment.

Example 7

The method of any of examples 1 to 6, further comprising: operating in an unlicensed radio frequency spectrum band; performing a contention-based procedure in response to receiving the first signal; transmitting a fourth signal acknowledging the beam switch occasion during a second acknowledgment opportunity based at least in part on the first signal and the contention-based procedure, wherein the fourth signal is transmitted prior to receiving the second signal; and performing the beam switch during the beam switch occasion based at least in part on transmitting the fourth signal.

Example 8

The method of any of examples 1 to 7, further comprising: identifying an indicator associated with the second signal;

and determining the beam switch occasion based at least in part on a value of the indicator associated with the second signal.

Example 9

The method of any of examples 1 to 8, further comprising: determining that the beam switch occasion is to occur at a predefined time interval after transmitting the fourth signal, based at least in part on the value of the indicator associated with the second signal.

Example 10

The method of any of examples 1 to 9, further comprising: determining that the beam switch occasion is to occur at a predefined time interval after transmitting the third signal, based at least in part on the value of the indicator associated with the second signal being one.

Example 11

The method of any of examples 1 to 10, wherein the predefined time interval is greater than or equal to three milliseconds.

Example 12

The method of any of examples 1 to 11, wherein the first signal comprises a MAC layer control element.

Example 13

The method of any of examples 1 to 12, further comprising: receiving from a base station, a request for a TCI state information associated with multiple channels; and transmitting a report comprising the TCI state information to the base station, wherein performing the beam switch during the beam switch occasion is based at least in part on the report.

Example 14

The method of any of examples 1 to 13, wherein the TCI state information associated with the multiple channels comprises at least one of a TCI state information associated with a CORESET, a TCI state information associated with a PDSCH, a spatial relation information associated with a PUSCH or a PUCCH, or a combination thereof.

Example 15

The method of any of examples 1 to 13, wherein: transmitting the report comprises transmitting the report via a MAC layer control element.

Example 16

A method for wireless communication, comprising: receiving a first signal identifying a beam switch occasion for a UE; transmitting a second signal acknowledging the beam switch occasion during an available acknowledgment opportunity of a set of acknowledgment opportunities; and performing a beam switch during the beam switch occasion based at least in part on transmitting the second signal.

Example 17

The method of example 16, further comprising: operating in an unlicensed radio frequency spectrum band; monitoring the unlicensed radio frequency spectrum band using a contention-based procedure; and identifying the available acknowledgment opportunity based at least in part on the monitoring, wherein transmitting the second signal acknowledging the beam switch occasion is based at least in part on identifying the available acknowledgment opportunity.

Example 18

The method of any of examples 16 or 17, wherein identifying the available acknowledgment opportunity further comprises: determining that the UE is not clear to transmit the second signal acknowledging the beam switch occasion during a first acknowledgment opportunity of the set of acknowledgment opportunities, wherein the first acknowledgment opportunity occurs prior than the available acknowledgment opportunity.

Example 19

The method of any of examples 16 to 18, further comprising: transmitting a time slot indicator associated with the available acknowledgment opportunity, wherein transmitting the second signal acknowledging the beam switch occasion comprises transmitting the time slot indicator.

Example 20

The method of any of examples 16 to 19, further comprising: transmitting a third signal acknowledging the beam switch occasion during a second available acknowledgment opportunity of the set of acknowledgment opportunities, wherein the second available acknowledgment opportunity occurs a predefined time interval after the available acknowledgment opportunity.

Example 21

The method of example 20, further comprising: transmitting a time slot indicator associated with the available acknowledgment opportunity, wherein transmitting the third signal acknowledging the beam switch occasion comprises transmitting the time slot indicator.

Example 22

The method of any of examples 16 to 21, wherein the first signal comprises a MAC layer control element.

Example 23

The method of any of examples 16 to 22, wherein the beam switch occasion is at least three milliseconds after transmitting the second signal acknowledging the beam switch occasion.

Example 24

The method of any of examples 16 to 23, further comprising: receiving from a base station, a request for a TCI state information associated with multiple channels; and transmitting a report comprising the TCI state information to the base station, wherein performing the beam switch during the beam switch occasion is based at least in part on the report.

Example 25

The method of example 24, wherein the TCI state information associated with the multiple channels comprises at least one of a TCI state information associated with a CORESET, a TCI state information associated with a PDSCH, a spatial relation information associated with a PUSCH or a PUCCH, or a combination thereof.

Example 26

The method of any of examples 24 or 25, wherein: transmitting the report comprises transmitting the report via a MAC layer control element.

Example 27

A method for wireless communication, comprising: transmitting a first signal identifying a beam switch occasion for a UE; transmitting a second signal identifying the beam switch occasion for the UE based at least in part on transmitting the first signal; receiving a third signal acknowledging the beam switch occasion during an acknowledgment opportunity based at least in part on the second signal; and performing a beam switch during the beam switch occasion based at least in part on receiving the third signal.

Example 28

The method of example 27, wherein the second signal identifying the beam switch occasion for the UE comprises a retransmission of the first signal identifying the beam switch occasion for the UE.

Example 29

The method of any of examples 27 or 28, wherein the second signal identifying the beam switch occasion for the UE comprises an indicator associated with the first signal identifying the beam switch occasion for the UE.

Example 30

The method of any of examples 27 to 29, further comprising: operating in an unlicensed radio frequency spectrum band; performing a contention-based procedure based at least in part on first signal; and identifying, by the UE, the acknowledgment opportunity based at least in part on the outcome of the contention-based procedure.

Example 31

The method of any of examples 27 to 30, further comprising: operating in an unlicensed radio frequency spectrum band; performing a contention-based procedure based at least in part on first signal; and receiving a fourth signal comprising a negative acknowledgment of the beam switch occasion during a second acknowledgment opportunity based at least in part on the first signal and the contention-based procedure, wherein the fourth signal is received prior to transmitting the second signal.

Example 32

The method of any of examples 27 to 31, further comprising: operating in an unlicensed radio frequency spectrum band; performing a contention-based procedure based at least in part on first signal; and failing to receive a fourth signal acknowledging the beam switch occasion during a second acknowledgment opportunity based at least in part on the first signal and the contention-based procedure, wherein the second acknowledgment opportunity occurs prior to transmitting the second signal.

Example 33

The method of example 32, further comprising: transmitting an indicator associated with the second signal, wherein the beam switch occasion is based at least in part on a value of the indicator associated with the second signal.

Example 34

The method of any of examples 27 to 33, wherein the beam switch occasion is at least three milliseconds after receiving the third signal acknowledging the beam switch occasion.

Example 35

The method of any of examples 27 to 34, wherein the first signal comprises a MAC layer control element.

Example 36

The method of any of examples 27 to 35, further comprising: transmitting to the UE, a request for a TCI state information associated with multiple channels; and receiving from the UE, a report comprising the TCI state information, wherein performing the beam switch during the beam switch occasion is based at least in part on the report.

Example 37

The method of example 36, wherein the TCI state information associated with the multiple channels comprises at least one of a TCI state information associated with a CORESET, a TCI state information associated with a PDSCH, a spatial relation information associated with a PUSCH or a PUCCH, or a combination thereof.

Example 38

The method of any of examples 36 or 37, wherein: receiving the report comprises receiving the report via a MAC layer control element.

Example 39

A method for wireless communication, comprising: configuring a set of acknowledgment opportunities for a UE operating in an unlicensed radio frequency spectrum band; transmitting a first signal identifying a beam switch occasion for the UE; receiving a second signal acknowledging the beam switch occasion during an available acknowledgment opportunity of the configured set of acknowledgment opportunities; and performing a beam switch during the beam switch occasion based at least in part on receiving the second signal.

Example 40

The method of example 39, further comprising: operating in an unlicensed radio frequency spectrum band; performing a contention-based procedure based at least in part on first signal; and identifying, by the UE, the available acknowledgment opportunity based at least in part on monitoring the unlicensed radio frequency spectrum band using a contention-based procedure.

Example 41

The method of examples 39 or 40, further comprising: receiving a time slot indicator associated with the available acknowledgment opportunity, wherein receiving the second signal acknowledging the beam switch occasion comprises receiving the time slot indicator.

Example 42

The method of any of examples 39 to 41, further comprising: receiving a third signal acknowledging the beam switch occasion during a second available acknowledgment opportunity of the set of acknowledgment opportunities, wherein the second available acknowledgment opportunity occurs a predefined time interval after the available acknowledgment opportunity.

Example 43

The method of example 42, further comprising: receiving a time slot indicator associated with the available acknowledgment opportunity, wherein receiving the third signal acknowledging the beam switch occasion comprises receiving the time slot indicator.

Example 44

The method of any of examples 39 to 43, wherein the first signal comprises a MAC layer control element.

Example 45

The method of examples 39 to 44, wherein the beam switch occasion is at least three milliseconds after receiving the second signal acknowledging the beam switch occasion.

Example 46

The method of examples 39 to 45, further comprising: transmitting to the UE, a request for a TCI state information associated with multiple channels; and receiving from the UE, a report comprising the TCI state information, wherein performing the beam switch during the beam switch occasion is based at least in part on the report.

Example 47

The method of example 46, wherein the TCI state information associated with the multiple channels comprises at least one of a TCI state information associated with a CORESET, a TCI state information associated with a PDSCH, a spatial relation information associated with a PUSCH or a PUCCH, or a combination thereof.

Example 48

The method of examples 46 or 47, wherein: receiving the report comprises receiving the report via a MAC layer control element.

Example 49

An apparatus for wireless communication, comprising: a processor; and memory coupled to the processor, the processor and memory configured to: perform a method of any of examples 1 to 15.

Example 50

An apparatus for wireless communication, comprising: a processor; and memory coupled to the processor, the processor and memory configured to: perform a method of any of examples 16 to 26.

Example 51

An apparatus for wireless communication, comprising: a processor; and memory coupled to the processor, the processor and memory configured to: perform a method of any of examples 27 to 38.

Example 52

An apparatus for wireless communication, comprising: a processor; and memory coupled to the processor, the processor and memory configured to: perform a method of any of examples 39 to 48.

Example 53

A non-transitory computer-readable medium storing code for wireless communications, the code comprising instructions executable by a processor to perform a method of any of examples 1 to 15.

Example 54

A non-transitory computer-readable medium storing code for wireless communications, the code comprising instructions executable by a processor to perform a method of any of examples 16 to 26.

Example 55

A non-transitory computer-readable medium storing code for wireless communications, the code comprising instructions executable by a processor to perform a method of any of examples 27 to 38.

Example 56

A non-transitory computer-readable medium storing code for wireless communications, the code comprising instructions executable by a processor to perform a method of any of examples 39 to 48.

Example 57

An apparatus for wireless communication, comprising: means for perform a method of any of examples 1 to 15.

Example 58

An apparatus for wireless communication, comprising: means for perform a method of any of examples 16 to 26.

Example 59

An apparatus for wireless communication, comprising: means for perform a method of any of examples 27 to 38.

Example 60

An apparatus for wireless communication, comprising: means for perform a method of any of examples 39 to 48.

Techniques described herein may be used for various wireless communications systems such as CDMA, TDMA, FDMA, OFDMA, single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers. A gNB for a macro cell may be referred to as a macro gNB. A gNB for a small cell may be referred to as a small cell gNB, a pico gNB, a femto gNB, or a home gNB. A gNB may support one or multiple (e.g., two, three, four, and the like) cells (e.g., component carriers).

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary operation that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   receiving a first signal identifying a beam switch occasion for a user equipment (UE);
   receiving a second signal identifying the beam switch occasion for the UE based at least in part on receiving the first signal;
   transmitting a third signal acknowledging the beam switch occasion during an acknowledgment opportunity based at least in part on the second signal; and
   performing a beam switch during the beam switch occasion based at least in part on transmitting the third signal.

2. The method of claim 1, wherein the second signal identifying the beam switch occasion for the UE comprises a retransmission of the first signal identifying the beam switch occasion for the UE.

3. The method of claim 1, wherein the second signal identifying the beam switch occasion for the UE comprises an indicator associated with the first signal identifying the beam switch occasion for the UE.

4. The method of claim 1, further comprising:
   operating in an unlicensed radio frequency spectrum band;
   performing a contention-based procedure in response to receiving the first signal; and
   identifying the acknowledgment opportunity based at least in part on an outcome of the contention-based procedure, wherein transmitting the third signal acknowledging the beam switch occasion is based at least in part on identifying the acknowledgment opportunity.

5. The method of claim 4, wherein identifying the acknowledgment opportunity further comprises:
   determining that the UE is not clear to transmit the third signal acknowledging the beam switch occasion during a second acknowledgment opportunity, wherein the second acknowledgment opportunity occurs prior to the acknowledgment opportunity.

6. The method of claim 1, further comprising:
   operating in an unlicensed radio frequency spectrum band;
   performing a contention-based procedure in response to receiving the first signal; and
   transmitting an additional signal comprising a negative acknowledgment of the beam switch occasion during a second acknowledgment opportunity based at least in part on the first signal and the contention-based procedure, wherein receiving the second signal is based at least in part on transmitting the additional signal comprising the negative acknowledgment.

7. The method of claim 1, further comprising:
   operating in an unlicensed radio frequency spectrum band;
   performing a contention-based procedure in response to receiving the first signal;
   transmitting an additional signal acknowledging the beam switch occasion during a second acknowledgment opportunity based at least in part on the first signal and the contention-based procedure, wherein the additional signal is transmitted prior to receiving the second signal; and
   performing the beam switch during the beam switch occasion based at least in part on transmitting the additional signal.

8. The method of claim 1, further comprising:
   identifying an indicator associated with the second signal; and
   determining the beam switch occasion based at least in part on a value of the indicator associated with the second signal.

9. The method of claim 1, further comprising:
   determining that the beam switch occasion is to occur at a predefined time interval after transmitting an additional signal, based at least in part on a value of an indicator associated with the second signal.

10. The method of claim 1, further comprising:
    determining that the beam switch occasion is to occur at a predefined time interval after transmitting the third signal, based at least in part on a value of an indicator associated with the second signal being one.

11. The method of claim 10, wherein the predefined time interval is greater than or equal to three milliseconds.

12. The method of claim 1, wherein the first signal comprises a medium access control (MAC) layer control element.

13. The method of claim 1, further comprising:
receiving from a base station, a request for a transmission configuration indicator (TCI) state information associated with multiple channels; and
transmitting a report comprising the TCI state information to the base station, wherein performing the beam switch during the beam switch occasion is based at least in part on the report.

14. The method of claim 13, wherein the TCI state information associated with the multiple channels comprises at least one of a TCI state information associated with a control resource set (CORESET), a TCI state information associated with a physical downlink shared channel (PDSCH), a spatial relation information associated with a physical uplink shared channel (PUSCH) or a physical uplink control channel (PUCCH), or a combination thereof.

15. The method of claim 13, wherein:
transmitting the report comprises transmitting the report via a medium access control (MAC) layer control element.

16. A method for wireless communication, comprising:
receiving a first signal identifying a beam switch occasion for a user equipment (UE);
transmitting a second signal acknowledging the beam switch occasion during an available acknowledgment opportunity of a set of acknowledgment opportunities; and
performing a beam switch during the beam switch occasion based at least in part on transmitting the second signal.

17. The method of claim 16, further comprising:
operating in an unlicensed radio frequency spectrum band;
monitoring the unlicensed radio frequency spectrum band using a contention-based procedure; and
identifying the available acknowledgment opportunity based at least in part on the monitoring, wherein transmitting the second signal acknowledging the beam switch occasion is based at least in part on identifying the available acknowledgment opportunity.

18. The method of claim 17, wherein identifying the available acknowledgment opportunity further comprises:
determining that the UE is not clear to transmit the second signal acknowledging the beam switch occasion during a first acknowledgment opportunity of the set of acknowledgment opportunities, wherein the first acknowledgment opportunity occurs prior to the available acknowledgment opportunity.

19. The method of claim 16, further comprising:
transmitting a time slot indicator associated with the available acknowledgment opportunity, wherein transmitting the second signal acknowledging the beam switch occasion comprises transmitting the time slot indicator.

20. The method of claim 16, further comprising:
transmitting a third signal acknowledging the beam switch occasion during a second available acknowledgment opportunity of the set of acknowledgment opportunities, wherein the second available acknowledgment opportunity occurs a predefined time interval after the available acknowledgment opportunity.

21. The method of claim 20, further comprising:
transmitting a time slot indicator associated with the available acknowledgment opportunity, wherein transmitting the third signal acknowledging the beam switch occasion comprises transmitting the time slot indicator.

22. The method of claim 16, wherein the first signal comprises a medium access control (MAC) layer control element.

23. The method of claim 16, wherein the beam switch occasion is at least three milliseconds after transmitting the second signal acknowledging the beam switch occasion.

24. The method of claim 16, further comprising:
receiving from a base station, a request for a transmission configuration indicator (TCI) state information associated with multiple channels; and
transmitting a report comprising the TCI state information to the base station, wherein performing the beam switch during the beam switch occasion is based at least in part on the report.

25. The method of claim 24, wherein the TCI state information associated with the multiple channels comprises at least one of a TCI state information associated with a control resource set (CORESET), a TCI state information associated with a physical downlink shared channel (PDSCH), a spatial relation information associated with a physical uplink shared channel (PUSCH) or a physical uplink control channel (PUCCH), or a combination thereof.

26. The method of claim 24, wherein:
transmitting the report comprises transmitting the report via a medium access control (MAC) layer control element.

27. A method for wireless communication, comprising:
transmitting a first signal identifying a beam switch occasion for a user equipment (UE);
transmitting a second signal identifying the beam switch occasion for the UE based at least in part on transmitting the first signal;
receiving a third signal acknowledging the beam switch occasion during an acknowledgment opportunity based at least in part on the second signal; and
performing a beam switch during the beam switch occasion based at least in part on receiving the third signal.

28. The method of claim 27, wherein the second signal identifying the beam switch occasion for the UE comprises a retransmission of the first signal identifying the beam switch occasion for the UE.

29. The method of claim 27, wherein the second signal identifying the beam switch occasion for the UE comprises an indicator associated with the first signal identifying the beam switch occasion for the UE.

30. The method of claim 27, further comprising:
operating in an unlicensed radio frequency spectrum band;
performing a contention-based procedure based at least in part on the first signal; and
identifying, by the UE, the acknowledgment opportunity based at least in part on an outcome of the contention-based procedure.

31. The method of claim 27, further comprising:
operating in an unlicensed radio frequency spectrum band;
performing a contention-based procedure based at least in part on the first signal; and
receiving an additional signal comprising a negative acknowledgment of the beam switch occasion during a second acknowledgment opportunity based at least in part on the first signal and the contention-based procedure, wherein the additional signal is received prior to transmitting the second signal.

32. The method of claim 27, further comprising:
operating in an unlicensed radio frequency spectrum band;
performing a contention-based procedure based at least in part on the first signal; and
failing to receive an additional signal acknowledging the beam switch occasion during a second acknowledgment opportunity based at least in part on the first signal and the contention-based procedure, wherein the second acknowledgment opportunity occurs prior to transmitting the second signal.

33. The method of claim 32, further comprising:
transmitting an indicator associated with the second signal, wherein the beam switch occasion is based at least in part on a value of the indicator associated with the second signal.

34. The method of claim 27, wherein the beam switch occasion is at least three milliseconds after receiving the third signal acknowledging the beam switch occasion.

35. The method of claim 27, wherein the first signal comprises a medium access control (MAC) layer control element.

36. The method of claim 27, further comprising:
transmitting to the UE, a request for a transmission configuration indicator (TCI) state information associated with multiple channels; and
receiving from the UE, a report comprising the TCI state information, wherein performing the beam switch during the beam switch occasion is based at least in part on the report.

37. The method of claim 36, wherein the TCI state information associated with the multiple channels comprises at least one of a TCI state information associated with a control resource set (CORESET), a TCI state information associated with a physical downlink shared channel (PDSCH), a spatial relation information associated with a physical uplink shared channel (PUSCH) or a physical uplink control channel (PUCCH), or a combination thereof.

38. The method of claim 36, wherein:
receiving the report comprises receiving the report via a medium access control (MAC) layer control element.

39. A method for wireless communication, comprising:
configuring a set of acknowledgment opportunities for a user equipment (UE);
transmitting a first signal identifying a beam switch occasion for the UE;
receiving a second signal acknowledging the beam switch occasion during an available acknowledgment opportunity of the configured set of acknowledgment opportunities; and
performing a beam switch during the beam switch occasion based at least in part on receiving the second signal.

40. The method of claim 39, further comprising:
operating in an unlicensed radio frequency spectrum band;
performing a contention-based procedure based at least in part on the first signal; and
identifying, by the UE, the available acknowledgment opportunity based at least in part on monitoring the unlicensed radio frequency spectrum band using the contention-based procedure.

41. The method of claim 39, further comprising:
receiving a time slot indicator associated with the available acknowledgment opportunity, wherein receiving the second signal acknowledging the beam switch occasion comprises receiving the time slot indicator.

42. The method of claim 39, further comprising:
receiving a third signal acknowledging the beam switch occasion during a second available acknowledgment opportunity of the set of acknowledgment opportunities, wherein the second available acknowledgment opportunity occurs a predefined time interval after the available acknowledgment opportunity.

43. The method of claim 42, further comprising:
receiving a time slot indicator associated with the available acknowledgment opportunity, wherein receiving the third signal acknowledging the beam switch occasion comprises receiving the time slot indicator.

44. The method of claim 39, wherein the first signal comprises a medium access control (MAC) layer control element.

45. The method of claim 39, wherein the beam switch occasion is at least three milliseconds after receiving the second signal acknowledging the beam switch occasion.

46. The method of claim 39, further comprising:
transmitting to the UE, a request for a transmission configuration indicator (TCI) state information associated with multiple channels; and
receiving from the UE, a report comprising the TCI state information, wherein performing the beam switch during the beam switch occasion is based at least in part on the report.

47. The method of claim 46, wherein the TCI state information associated with the multiple channels comprises at least one of a TCI state information associated with a control resource set (CORESET), a TCI state information associated with a physical downlink shared channel (PDSCH), a spatial relation information associated with a physical uplink shared channel (PUSCH) or a physical uplink control channel (PUCCH), or a combination thereof.

48. The method of claim 46, wherein:
receiving the report comprises receiving the report via a medium access control (MAC) layer control element.

49. An apparatus for wireless communication, comprising: a processor; and memory coupled to the processor, the processor and memory configured to:
receive a first signal identifying a beam switch occasion for a user equipment (UE);
receive a second signal identifying the beam switch occasion for the UE based at least in part on receiving the first signal;
transmit a third signal acknowledging the beam switch occasion during an acknowledgment opportunity based at least in part on the second signal; and
perform a beam switch during the beam switch occasion based at least in part on transmitting the third signal.

50. The apparatus of claim 49, wherein the second signal identifying the beam switch occasion for the UE comprises a retransmission of the first signal identifying the beam switch occasion for the UE.

51. The apparatus of claim 49, wherein the second signal identifying the beam switch occasion for the UE comprises an indicator associated with the first signal identifying the beam switch occasion for the UE.

52. The apparatus of claim 51, wherein the processor and memory are further configured to:
operate in an unlicensed radio frequency spectrum band;
perform a contention-based procedure in response to receiving the first signal; and identify the acknowledgment opportunity based at least in part on an outcome of the contention-based procedure, wherein transmitting the third signal acknowledging the beam switch occasion is based at least in part on identifying the acknowledgment opportunity.

53. The apparatus of claim 49, wherein in identifying the acknowledgment opportunity, the processor and memory are configured to:
determine that the UE is not clear to transmit the third signal acknowledging the beam switch occasion during a second acknowledgment opportunity, wherein the second acknowledgment opportunity occurs prior to the acknowledgment opportunity.

54. The apparatus of claim 49, wherein the processor and memory are further configured to:
operate in an unlicensed radio frequency spectrum band;
perform a contention-based procedure in response to receiving the first signal;
transmit an additional signal comprising a negative acknowledgment of the beam switch occasion during a second acknowledgment opportunity based at least in part on the first signal and the contention-based procedure, wherein receiving the second signal is based at least in part on transmitting the additional signal comprising the negative acknowledgment.

55. The apparatus of claim 49, wherein the processor and memory are further configured to:
operate in an unlicensed radio frequency spectrum band;
perform a contention-based procedure in response to receiving the first signal;
transmit an additional signal acknowledging the beam switch occasion during a second acknowledgment opportunity based at least in part on the first signal and the contention-based procedure, wherein the additional signal is transmitted prior to receiving the second signal; and
perform the beam switch during the beam switch occasion based at least in part on transmitting the additional signal.

56. The apparatus of claim 49, wherein the processor and memory are further configured to:
identify an indicator associated with the second signal; and
determine the beam switch occasion based at least in part on a value of the indicator associated with the second signal.

57. The apparatus of claim 49, wherein the processor and memory are further configured to:
determine that the beam switch occasion is to occur at a predefined time interval after transmitting an additional signal, based at least in part on a value of an indicator associated with the second signal.

58. The apparatus of claim 49, wherein the processor and memory are further configured to:
determine that the beam switch occasion is to occur at a predefined time interval after transmitting the third signal, based at least in part on a value of an indicator associated with the second signal being one.

59. The apparatus of claim 58, wherein the predefined time interval is greater than or equal to three milliseconds.

60. The apparatus of claim 49, wherein the first signal comprises a medium access control (MAC) layer control element.

61. The apparatus of claim 49, further comprising an antenna panel, wherein the processor, the memory and the antenna panel are further configured to:
receive from a base station, a request for a transmission configuration indicator (TCI) state information associated with multiple channels; and
transmit a report comprising the TCI state information to the base station, wherein performing the beam switch during the beam switch occasion is based at least in part on the report.

62. The apparatus of claim 49, wherein the TCI state information associated with multiple channels comprises at least one of a TCI state information associated with a control resource set (CORESET), a TCI state information associated with a physical downlink shared channel (PDSCH), a spatial relation information associated with a physical uplink shared channel (PUSCH) or a physical uplink control channel (PUCCH), or a combination thereof.

63. The apparatus of claim 61, wherein the processor and memory are further configured to:
transmit the report via a medium access control (MAC) layer control element.

64. An apparatus for wireless communication, comprising: a processor; and memory coupled to the processor, the processor and memory configured to:
receive a first signal identifying a beam switch occasion for a user equipment (UE);
transmit a second signal acknowledging the beam switch occasion during an available acknowledgment opportunity of a set of acknowledgment opportunities; and
perform a beam switch during the beam switch occasion based at least in part on transmitting the second signal.

65. The apparatus of claim 64, wherein the processor and memory are further configured to:
operate in an unlicensed radio frequency spectrum band;
monitor the unlicensed radio frequency spectrum band using a contention-based procedure; and
identify the available acknowledgment opportunity based at least in part on the monitoring, wherein transmitting the second signal acknowledging the beam switch occasion is based at least in part on identifying the available acknowledgment opportunity.

66. The apparatus of claim 65, wherein in identifying the available acknowledgment opportunity, the processor and memory are configured to:
determine that the UE is not clear to transmit the second signal acknowledging the beam switch occasion during a first acknowledgment opportunity of the set of acknowledgment opportunities, wherein the first acknowledgment opportunity occurs prior to the available acknowledgment opportunity.

67. The apparatus of claim 64, further comprising an antenna panel, wherein the processor, the memory and the antenna panel are further configured to:
transmit a time slot indicator associated with the available acknowledgment opportunity, wherein transmitting the second signal acknowledging the beam switch occasion comprises transmitting the time slot indicator.

68. The apparatus of claim 64, wherein the processor and memory are further configured to:
transmit a third signal acknowledging the beam switch occasion during a second available acknowledgment opportunity of the set of acknowledgment opportunities, wherein the second available acknowledgment opportunity occurs a predefined time interval after the available acknowledgment opportunity.

69. The apparatus of claim 68, wherein the processor and memory are further configured to:
transmit a time slot indicator associated with the available acknowledgment opportunity, wherein transmitting the third signal acknowledging the beam switch occasion comprises transmitting the time slot indicator.

70. The apparatus of claim 64, wherein the first signal comprises a medium access control (MAC) layer control element.

71. The apparatus of claim 64, wherein the beam switch occasion is at least three milliseconds after transmitting the second signal acknowledging the beam switch occasion.

72. The apparatus of claim 64, wherein the processor and memory are further configured to:
receive from a base station, a request for a transmission configuration indicator (TCI) state information associated with multiple channels; and
transmit a report comprising the TCI state information to the base station, wherein performing the beam switch during the beam switch occasion is based at least in part on the report.

73. The apparatus of claim 72, wherein the TCI state information associated with the multiple channels comprises at least one of a TCI state information associated with a control resource set (CORESET), a TCI state information associated with a physical downlink shared channel (PDSCH), a spatial relation information associated with a physical uplink shared channel (PUSCH) or a physical uplink control channel (PUCCH), or a combination thereof.

74. The apparatus of claim 64, wherein the processor and memory are further configured to:
transmit a report via a medium access control (MAC) layer control element.

75. An apparatus for wireless communication, comprising: a processor; and memory coupled to the processor, the processor and memory configured to:
transmit a first signal identifying a beam switch occasion for a user equipment (UE);
transmit a second signal identifying the beam switch occasion for the UE based at least in part on transmitting the first signal;
receive a third signal acknowledging the beam switch occasion during an acknowledgment opportunity based at least in part on the second signal; and
perform a beam switch during the beam switch occasion based at least in part on receiving the third signal.

76. The apparatus of claim 75, wherein the second signal identifying the beam switch occasion for the UE comprises a retransmission of the first signal identifying the beam switch occasion for the UE.

77. The apparatus of claim 75, wherein the second signal identifying the beam switch occasion for the UE comprises an indicator associated with the first signal identifying the beam switch occasion for the UE.

78. The apparatus of claim 75, wherein the processor and memory are further configured to:
operate in an unlicensed radio frequency spectrum band;
perform a contention-based procedure based at least in part on the first signal; and
identify, by the UE, the acknowledgment opportunity based at least in part on an outcome of the contention-based procedure.

79. The apparatus of claim 75, wherein the processor and memory are further configured to:
operate in an unlicensed radio frequency spectrum band;
perform a contention-based procedure based at least in part on the first signal; and
receive an additional signal comprising a negative acknowledgment of the beam switch occasion during a second acknowledgment opportunity based at least in part on the first signal and the contention-based procedure, wherein the additional signal is received prior to transmitting the second signal.

80. The apparatus of claim 75, wherein the processor and memory are further configured to:
operate in an unlicensed radio frequency spectrum band;
perform a contention-based procedure based at least in part on the first signal; and
fail to receive an additional signal acknowledging the beam switch occasion during a second acknowledgment opportunity based at least in part on the first signal and the contention-based procedure, wherein the second acknowledgment opportunity occurs prior to transmitting the second signal.

81. The apparatus of claim 80, wherein the processor and memory are further configured to:
transmit an indicator associated with the second signal, wherein the beam switch occasion is based at least in part on a value of the indicator associated with the second signal.

82. The apparatus of claim 75, wherein the beam switch occasion is at least three milliseconds after receiving the third signal acknowledging the beam switch occasion.

83. The apparatus of claim 75, wherein the first signal comprises a medium access control (MAC) layer control element.

84. The apparatus of claim 75, further comprising an antenna panel, wherein the processor, the memory and the antenna panel are further configured to:
transmit to the UE, a request for a transmission configuration indicator (TCI) state information associated with multiple channels; and
receive from the UE, a report comprising the TCI state information, wherein performing the beam switch during the beam switch occasion is based at least in part on the report.

85. The apparatus of claim 84, wherein the TCI state information associated with the multiple channels comprises at least one of a TCI state information associated with a control resource set (CORESET), a TCI state information associated with a physical downlink shared channel (PDSCH), a spatial relation information associated with a physical uplink shared channel (PUSCH) or a physical uplink control channel (PUCCH), or a combination thereof.

86. The apparatus of claim 84, wherein the processor and memory are further configured to:
receive the report via a medium access control (MAC) layer control element.

87. An apparatus for wireless communication, comprising: a processor; and memory coupled to the processor, the processor and memory configured to:
configure a set of acknowledgment opportunities for a user equipment (UE);
transmit a first signal identifying a beam switch occasion for the UE;
receive a second signal acknowledging the beam switch occasion during an available acknowledgment opportunity of the configured set of acknowledgment opportunities; and
perform a beam switch during the beam switch occasion based at least in part on receiving the second signal.

88. The apparatus of claim 87, wherein the processor and memory are further configured to:
  operate in an unlicensed radio frequency spectrum band;
  perform a contention-based procedure based at least in part on the first signal; and
  identify, by the UE, the available acknowledgment opportunity based at least in part on monitoring the unlicensed radio frequency spectrum band using the contention-based procedure.

89. The apparatus of claim 87, further comprising an antenna panel, wherein the processor, the memory and the antenna panel are further configured to:
  receive a time slot indicator associated with the available acknowledgment opportunity, wherein receiving the second signal acknowledging the beam switch occasion comprises receiving the time slot indicator.

90. The apparatus of claim 87, wherein the processor and memory are further configured to:
  receive a third signal acknowledging the beam switch occasion during a second available acknowledgment opportunity of the set of acknowledgment opportunities, wherein the second available acknowledgment opportunity occurs a predefined time interval after the available acknowledgment opportunity.

91. The apparatus of claim 90, wherein the processor and memory are further configured to:
  receive a time slot indicator associated with the available acknowledgment opportunity, wherein receiving the third signal acknowledging the beam switch occasion comprises receiving the time slot indicator.

92. The apparatus of claim 87, wherein the first signal comprises a medium access control (MAC) layer control element.

93. The apparatus of claim 87, wherein the beam switch occasion is at least three milliseconds after receiving the second signal acknowledging the beam switch occasion.

94. The apparatus of claim 87, wherein the processor and memory are further configured to:
  transmit to the UE, a request for a transmission configuration indicator (TCI) state information associated with multiple channels; and
  receive from the UE, a report comprising the TCI state information, wherein performing the beam switch during the beam switch occasion is based at least in part on the report.

95. The apparatus of claim 94, wherein the TCI state information associated with the multiple channels comprises at least one of a TCI state information associated with a control resource set (CORESET), a TCI state information associated with a physical downlink shared channel (PDSCH), a spatial relation information associated with a physical uplink shared channel (PUSCH) or a physical uplink control channel (PUCCH), or a combination thereof.

96. The apparatus of claim 94, wherein the processor and memory are further configured to:
  receive the report comprises receiving the report via a medium access control (MAC) layer control element.

97. A non-transitory computer-readable medium storing code for wireless communication, the code comprising instructions executable by a processor to:
  receive a first signal identifying a beam switch occasion for a user equipment (UE);
  receive a second signal identifying the beam switch occasion for the UE based at least in part on receiving the first signal;
  transmit a third signal acknowledging the beam switch occasion during an acknowledgment opportunity based at least in part on the second signal; and
  perform a beam switch during the beam switch occasion based at least in part on transmitting the third signal.

98. A non-transitory computer-readable medium storing code for wireless communication, the code comprising instructions executable by a processor to:
  receive a first signal identifying a beam switch occasion for a user equipment (UE);
  transmit a second signal acknowledging the beam switch occasion during an available acknowledgment opportunity of a set of acknowledgment opportunities; and
  perform a beam switch during the beam switch occasion based at least in part on transmitting the second signal.

99. A non-transitory computer-readable medium storing code for wireless communication, the code comprising instructions executable by a processor to:
  transmit a first signal identifying a beam switch occasion for a user equipment (UE);
  transmit a second signal identifying the beam switch occasion for the UE based at least in part on transmitting the first signal;
  receive a third signal acknowledging the beam switch occasion during an acknowledgment opportunity based at least in part on the second signal; and
  perform a beam switch during the beam switch occasion based at least in part on receiving the third signal.

100. A non-transitory computer-readable medium storing code for wireless communication, the code comprising instructions executable by a processor to:
  configure a set of acknowledgment opportunities for a user equipment (UE);
  transmit a first signal identifying a beam switch occasion for the UE;
  receive a second signal acknowledging the beam switch occasion during an available acknowledgment opportunity of the configured set of acknowledgment opportunities; and
  perform a beam switch during the beam switch occasion based at least in part on receiving the second signal.

101. An apparatus for wireless communication, comprising:
  means for receiving a first signal identifying a beam switch occasion for a user equipment (UE);
  means for receiving a second signal identifying the beam switch occasion for the UE based at least in part on receiving the first signal;
  means for transmitting a third signal acknowledging the beam switch occasion during an acknowledgment opportunity based at least in part on the second signal; and
  means for performing a beam switch during the beam switch occasion based at least in part on transmitting the third signal.

102. An apparatus for wireless communication, comprising:
  means for receiving a first signal identifying a beam switch occasion for a user equipment (UE);
  means for transmitting a second signal acknowledging the beam switch occasion during an available acknowledgment opportunity of a set of acknowledgment opportunities; and
  means for performing a beam switch during the beam switch occasion based at least in part on transmitting the second signal.

103. An apparatus for wireless communication, comprising:
- means for transmitting a first signal identifying a beam switch occasion for a user equipment (UE);
- means for transmitting a second signal identifying the beam switch occasion for the UE based at least in part on transmitting the first signal;
- means for receiving a third signal acknowledging the beam switch occasion during an acknowledgment opportunity based at least in part on the second signal; and
- means for performing a beam switch during the beam switch occasion based at least in part on receiving the third signal.

104. An apparatus for wireless communication, comprising:
- means for configuring a set of acknowledgment opportunities for a user equipment (UE) operating in an unlicensed radio frequency spectrum band;
- means for transmitting a first signal identifying a beam switch occasion for the UE;
- means for receiving a second signal acknowledging the beam switch occasion during an available acknowledgment opportunity of the configured set of acknowledgment opportunities; and
- means for performing a beam switch during the beam switch occasion based at least in part on receiving the second signal.

* * * * *